(12) United States Patent
Mayer et al.

(10) Patent No.: US 11,529,765 B2
(45) Date of Patent: Dec. 20, 2022

(54) BONDING OBJECTS TOGETHER

(71) Applicant: MultiMaterial-Welding AG, Stansstad (CH)

(72) Inventors: Jörg Mayer, Niederlenz (CH); Patrick Mooser, Biel (CH); Gregor Eckhard, Rüschlikon (CH)

(73) Assignee: MULTIMATERIAL-WELDING AG, Biel/Bienne (CH)

( * ) Notice: Subject to any disclaimer, the term of this patent is extended or adjusted under 35 U.S.C. 154(b) by 0 days.

(21) Appl. No.: 16/495,176

(22) PCT Filed: Mar. 20, 2018

(86) PCT No.: PCT/EP2018/057082
§ 371 (c)(1),
(2) Date: Sep. 18, 2019

(87) PCT Pub. No.: WO2018/172385
PCT Pub. Date: Sep. 27, 2018

(65) Prior Publication Data
US 2020/0016843 A1    Jan. 16, 2020

(30) Foreign Application Priority Data

Mar. 20, 2017 (CH) .................................. 00363/17
Sep. 27, 2017 (CH) .................................. 01183/17

(51) Int. Cl.
*B29C 65/08* (2006.01)
*F16B 5/01* (2006.01)
(Continued)

(52) U.S. Cl.
CPC ........ *B29C 66/30221* (2013.01); *B29C 65/08* (2013.01); *B29C 66/1122* (2013.01);
(Continued)

(58) Field of Classification Search
CPC .............. B29C 66/30221; B29C 65/08; B29C 66/8322; B29C 66/1122; B29C 66/81433;
(Continued)

(56) References Cited

U.S. PATENT DOCUMENTS 6,703,129 B1 * 3/2004 Kakehi ............. B29C 66/30326
428/409
10,406,757 B2 * 9/2019 Lehmann .............. B29C 66/727
(Continued)

FOREIGN PATENT DOCUMENTS

DE    10 2011 080 923    2/2013
EP         1 072 391       1/2001
(Continued)

OTHER PUBLICATIONS

Switzerland Search Report dated Sep. 19, 2017, Application No. CH 3632017, 3 pages.
(Continued)

*Primary Examiner* — Tahseen Khan
(74) *Attorney, Agent, or Firm* — Rankin, Hill & Clark LLP

(57) ABSTRACT

A method of bonding a first object to a second object includes the steps of: providing the first object including thermoplastic material in a solid state, providing the second object including a proximal surface, applying a mechanical pressing force and a mechanical excitation capable to liquefy the thermoplastic material until a flow portion of the thermoplastic material is flowable and penetrates into structures of the second object, and stopping the mechanical excitation and letting the thermoplastic material resolidify to yield a positive-fit connection between the first and the second object. The second object has a region of low density, wherein the protrusion penetrates the region of low density at least partly before the thermoplastic material is made
(Continued)

flowable, and wherein the first object includes a protruding portion after the step of letting the thermoplastic material resolidify, the protruding portion at least partly penetrates the region of low density.

27 Claims, 19 Drawing Sheets

(51) Int. Cl.
| | |
|---|---|
| *B29C 65/00* | (2006.01) |
| *B32B 3/26* | (2006.01) |
| *B32B 3/30* | (2006.01) |
| *B32B 7/02* | (2019.01) |
| *B32B 15/085* | (2006.01) |
| *B32B 15/20* | (2006.01) |
| *B29L 31/30* | (2006.01) |

(52) U.S. Cl.
CPC .. *B29C 66/30223* (2013.01); *B29C 66/30326* (2013.01); *B29C 66/472* (2013.01); *B29C 66/474* (2013.01); *B29C 66/71* (2013.01); *B29C 66/727* (2013.01); *B29C 66/7212* (2013.01); *B29C 66/7313* (2013.01); *B29C 66/73921* (2013.01); *B29C 66/81429* (2013.01); *B29C 66/81431* (2013.01); *B29C 66/81433* (2013.01); *B29C 66/8322* (2013.01); *B29C 66/919* (2013.01); *B29C 66/9513* (2013.01); *B29C 66/9517* (2013.01); *B32B 3/266* (2013.01); *B32B 3/30* (2013.01); *B32B 7/02* (2013.01); *B32B 15/085* (2013.01); *B32B 15/20* (2013.01); *B29L 2031/3041* (2013.01); *B32B 2605/003* (2013.01)

(58) Field of Classification Search
CPC ........ B29C 66/30223; B29C 66/30326; B32B 7/02; B32B 3/266; B32B 15/085

USPC .......................................................... 428/99
See application file for complete search history.

(56) References Cited

U.S. PATENT DOCUMENTS

| | | | | |
|---|---|---|---|---|
| 2009/0131947 | A1* | 5/2009 | Aeschlimann | ....... A61C 8/0033 606/93 |
| 2015/0306817 | A1* | 10/2015 | Lehmann | ................ B29C 65/08 156/73.5 |
| 2016/0311153 | A1* | 10/2016 | Mayer | .................... B29C 66/712 |
| 2016/0341234 | A1* | 11/2016 | Germann | ............... B21J 15/147 |
| 2017/0305073 | A1* | 10/2017 | Lehmann | |
| 2018/0104905 | A1* | 4/2018 | Mayer | ................ B29C 66/30325 |
| 2019/0126562 | A1* | 5/2019 | Mayer | ................. B29C 65/7437 |

FOREIGN PATENT DOCUMENTS

| | | | | |
|---|---|---|---|---|
| EP | 1072391 | A2 * | 1/2001 | ........... B29C 66/474 |
| JP | 5-147109 | | 6/1993 | |
| WO | 00/79137 | | 12/2000 | |
| WO | 2007/109855 | | 10/2007 | |
| WO | 2014/085942 | | 6/2014 | |
| WO | WO-2015117253 | A1 * | 8/2015 | ............. B29C 65/08 |
| WO | 2016/198545 | | 12/2016 | |
| WO | 2016/198547 | | 12/2016 | |

OTHER PUBLICATIONS

International Preliminary Report on Patentability dated Sep. 24, 2019 (Sep. 24, 2019), Application No. PCT/EP2018/057082, 7 pages.
EJOT®, "EJOT® EPPsys RSD, Secure fastening solutions for foamed components" 2010, 2 pages.
English translation of Japanese Office Action dated Feb. 1, 2022, Application No. 2019-551554, 7 pages.

* cited by examiner

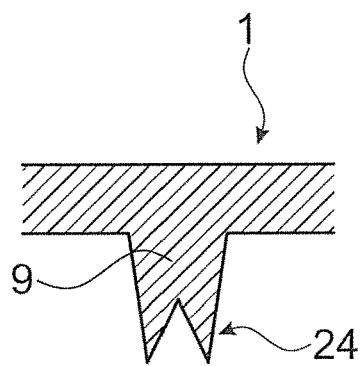
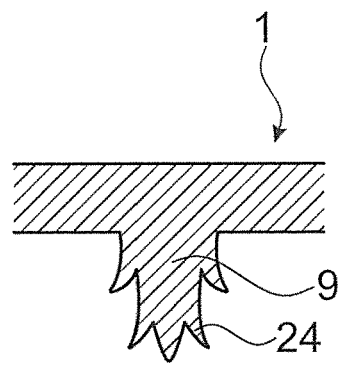
Fig. 17d    Fig. 17e
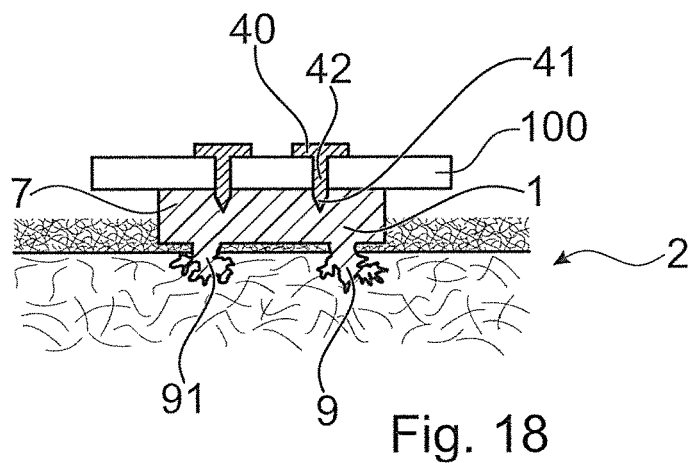
Fig. 18
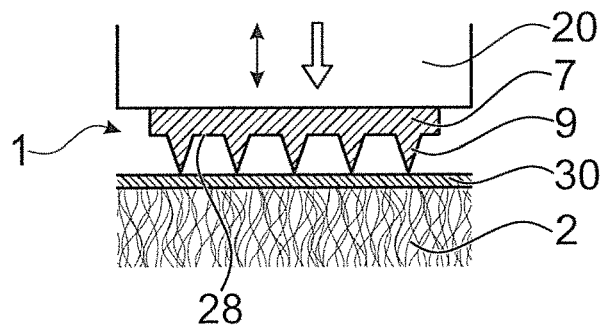
Fig. 19a
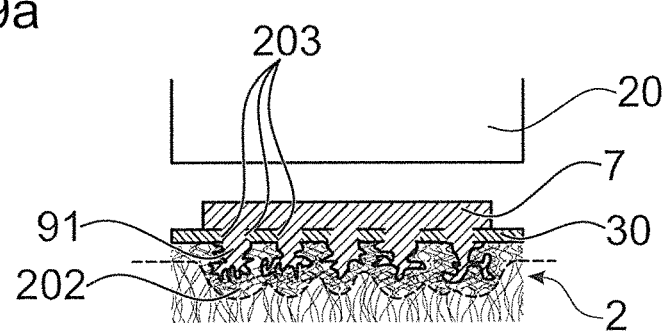
Fig. 19b

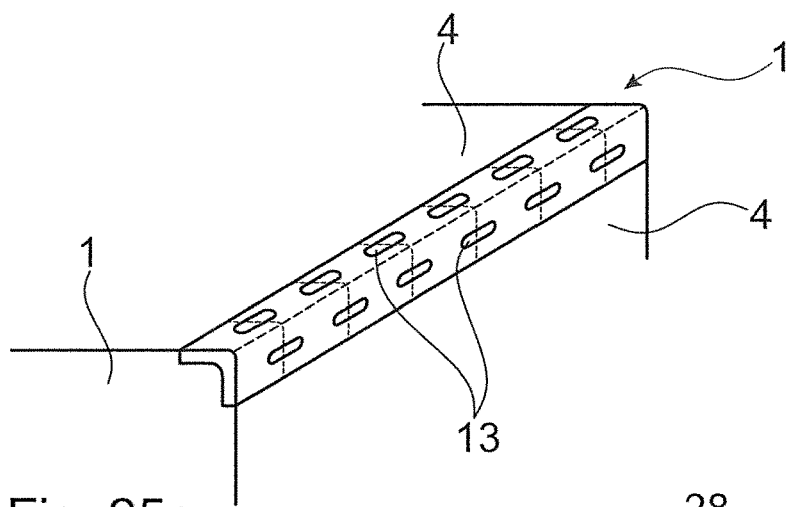
Fig. 25a
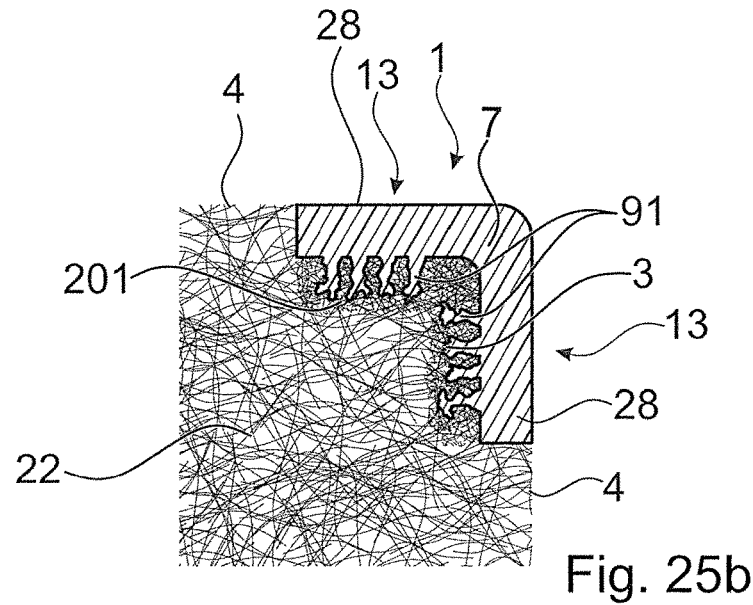
Fig. 25b
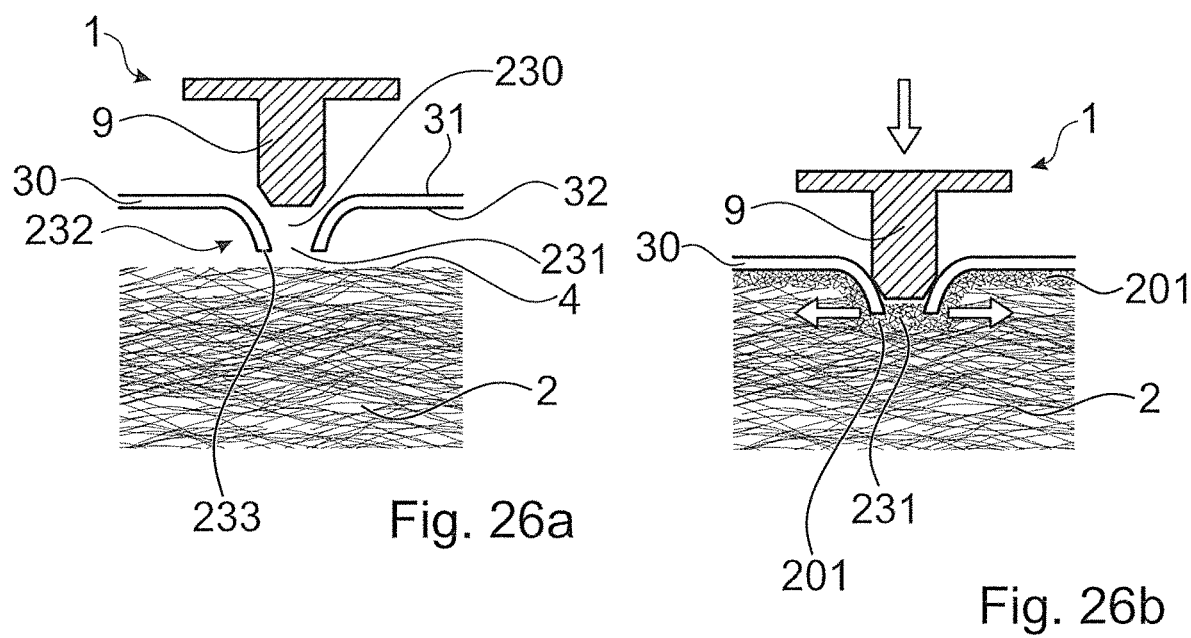
Fig. 26a
Fig. 26b

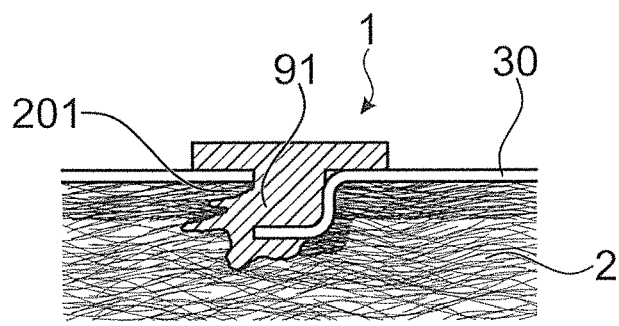
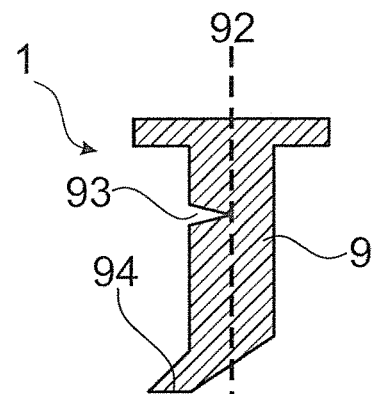
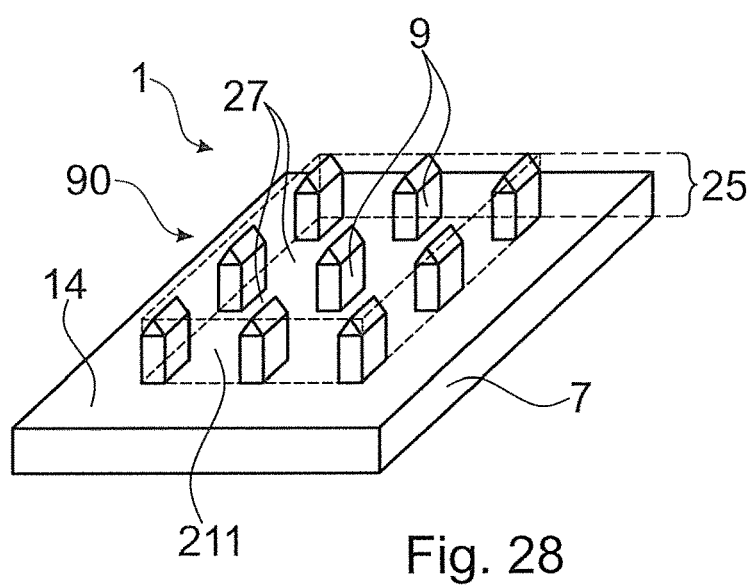
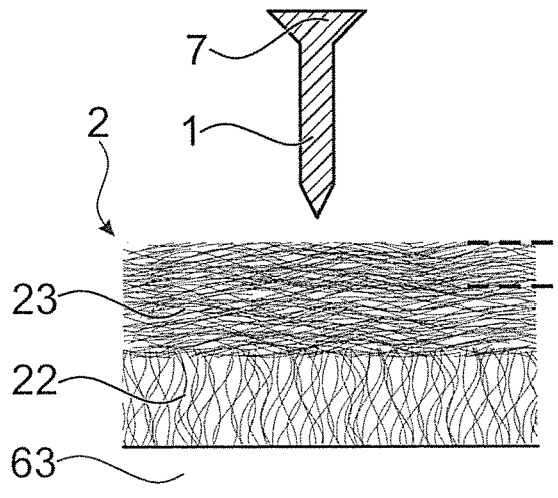
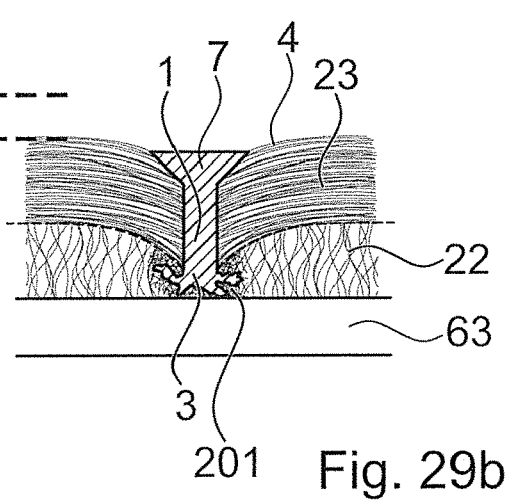

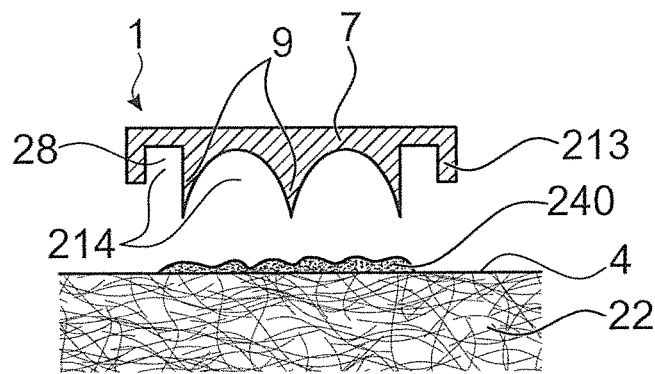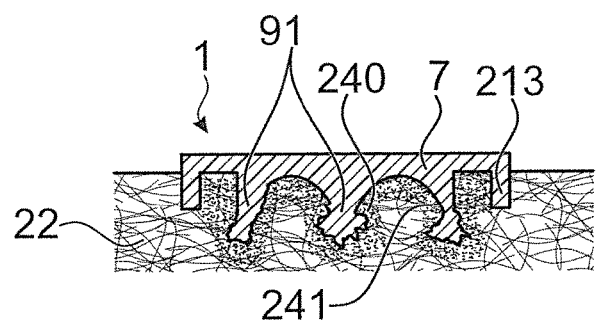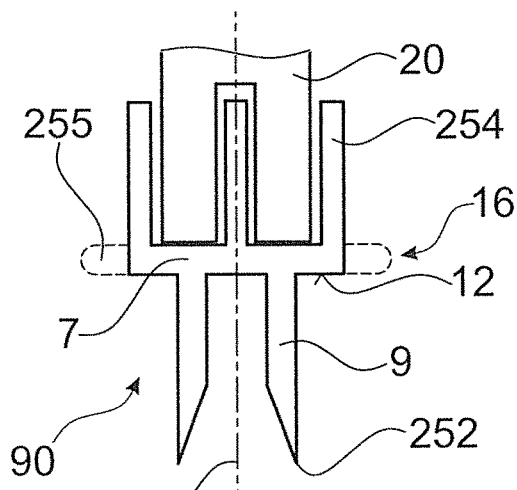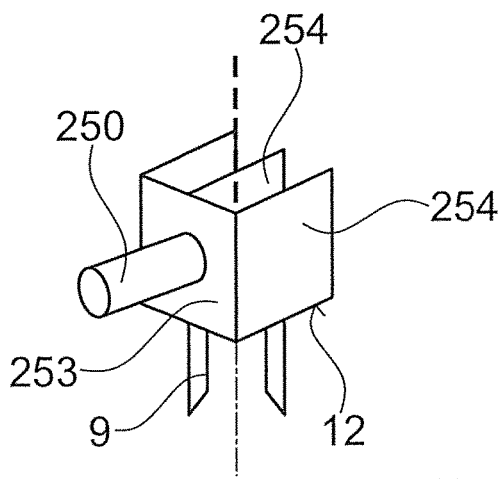

BONDING OBJECTS TOGETHER

BACKGROUND OF THE INVENTION

Field of the Invention

The invention is in the fields of mechanical engineering and construction, especially mechanical construction, for example automotive engineering.

Description of Related Art

Devices used or produced in automotive, aviation and other industries include surfaces that need to fulfil physical demands given by the user or authorities. Such demands concern optical, acoustic, thermal and mechanical properties, in particular. For example, the quality and value of a device is linked to the visual impression given by exterior surfaces, the generation of noise due to vibration of or within the device needs to be limited and/or adapted, and the surface needs to generate a specific feeling and/or a specific resistance against degradation due to use of the device.

Covers that are attached to the surfaces are one approach to meet the demands. Thereby, two methods to attach the cover to the surface directly or to attach a connector to the cover with which the cover can be attached to the surface have prevailed.

A first method uses adhesives. However, adhesives are disadvantageous in terms of long term stability. In particular, if an adhesive is used for the attachment of a cover with or to a porous and/or fibrous surface for example, the stability can be poor because the outmost portions of the fibers and/or pores are embedded in the adhesive and contribute to the bonding, only.

Further, the use of adhesive is time consuming (e.g., due to hardening processes), needs generally the treatment of an extensive area and can be limited to certain body geometries as it is the case for friction welding, for example.

A second method uses fasteners that penetrate the cover, usually. Rivets, nails and screws are examples of such fasteners. The use of fasteners as well as related approaches that are based on through going holes produced during the attachment or pre-drilled are disadvantageous in terms of optical and acoustic properties, at least.

Hence, there is need for alternative methods to bond objects together, in particular to bond covers with specific physical properties to surfaces of devices such as vehicles and machines.

SUMMARY OF THE INVENTION

It is an object of the present invention to provide a method for bonding objects together, the method overcoming disadvantages of prior art methods.

In particular, it is an object of the invention to provide a method for bonding a first object to a second object wherein one of the objects has a specific density profile. The density profile results from demands concerning for at least one of acoustic (e.g., damping) properties, thermal (e.g., insulating) properties, mechanical properties and optical properties, for example.

The mechanical properties can include the generation of a specific, e.g., soft, feeling and/or a high resistance against degradation due to frequent use. The optical properties can rely on the demand for a surface that is unaffected by the bonding of the first object to the second object.

A method according to the invention is suitable for bonding a first object to a second object. In its basic embodiment, the method includes the steps of:
  Providing the first object, wherein the first object extends between a proximal end and a distal end, wherein the first object includes thermoplastic material in a solid state.
  Providing the second object including a proximal surface.
  Applying a mechanical pressing force and a mechanical excitation capable to liquefy the thermoplastic material to at least one of the first and second object until a flow portion of the thermoplastic material is flowable and penetrates into structures of the second object.
  Stopping the mechanical excitation and letting the thermoplastic material resolidify to yield a positive-fit connection between the first and the second object.

The method in its basic embodiment is characterized in that the second object provided includes a region of low density and in that the distal end penetrates the region of low density at least partly before the thermoplastic material is made flowable.

The region of low density that is at least partly penetrated by the distal end before the thermoplastic material is made flowable is not necessarily the region of lowest density of the second object. This also means that the first object is not necessarily anchored in the region of lowest density of the second object.

For example, the region of low density that is at least partly penetrated by the distal end can form a base for a region of even lower density that forms for example an exposed surface of the first object. Such embodiments can be present in cases in which a part of a car body forms part of the first object and a cover forms the second object, for example.

Preferred embodiments can include at least one of the following features:
  The step of applying the mechanical excitation includes applying mechanical oscillations along an axis that runs at an angle to the proximal surface and the proximal surface of the second object provided is of low density. In this embodiment at least, the region of low density extends normal to, this means distally from, the proximal surface. The region of low density can be a proximal region of low density. The proximal region of low density can include the proximal surface.
  The first object provided includes a first object body and at least one protrusion distally of the first object body, wherein the protrusion forms the distal end and includes the thermoplastic material in a solid state.
  In this embodiment, it is the protrusion (or a plurality of protrusions) that penetrates the region of low density at least partly before the thermoplastic material is made flowable. Further the first object includes a protruding portion after the step of letting the thermoplastic material resolidify, wherein the protruding portion penetrates the region of low density at least partly.
  A step of changing a compressive strength of the region of low density at least locally. In this context, the term "compressive strength" is referred to the maximal force per square millimetre generated by an area before the area is displaced, this means before the material defining the area is (further) compressed. Hence, the compressive strength can also be seen as a resistance against further compression or as a stiffness.
  The compressive strength corresponds to the stress as measured in a stress-strain experiment, for example.

The change in compressive strength (stress) can be such that the mechanical pressing force and the mechanical excitation applied can cause the liquefaction of the thermoplastic material. In other words, the region of low density can be such that it is not able to provide the compressive strength needed to liquefy the thermoplastic material in the step of applying the mechanical pressing force and the mechanical excitation without a change of the compressive strength.

The step of changing the compressive strength of the region of low density at least locally can be carried out until a critical compressive strength is generated, this means until the compressive strength needed to liquefy the thermoplastic material with the mechanical pressing force and the mechanical excitation applied is reached.

The change of the compressive strength needed to cause liquefaction of the thermoplastic material in the step of applying the mechanical pressing force and the mechanical excitation can depend on the mechanical pressing force and the mechanical excitation applied.

In particular, the change in compressive strength is an increase in compressive strength.

In many embodiments, the increase in compressive strength is caused by an at least local compression of the region of low density. In other words, the method can include a step of compressing the region of low density at least locally.

In particular, the compressive strength can depend on a densification of the region of low density, wherein the densification is caused by the compression.

The region of low density can be compressed by the mechanical pressing force applied for liquefying the thermoplastic material.

In the step of applying the mechanical pressing force and the mechanical excitation for liquefying the thermoplastic material, the mechanical excitation can be applied, this means switched on, after the compression of the region of low density has caused an increase of the compressive strength that is sufficient for the liquefaction of the thermoplastic material with the mechanical pressing force and the mechanical excitation applied.

The step of changing the compressive strength of the region of low density at least locally or the step of compressing the region of low density at least locally can make the method suitable for bonding the first object to the second object by the positive-fit connection between the first and second object, wherein the positive-fit connection is established in a region of the second object that corresponds to the region of low density before bonding the first object to the second object.

In embodiments, the region of low density is formed by an essentially incoherent material, this means a material including constituents that interact weakly only, for example when exposed to an external force such as a compressing force.

A material including or consisting of fibers that are under the applied force movable relative to each other to some extend is an example of an incoherent material.

There is no need that the weak interaction between the constituents is present in the second object as provided. Rather, the weak interaction can be a result of a force acting on the second object during the method. Such a force can cause a breakup of the connection between the constituents. For example, the material can include fibers that have locally been connected by a binder material, e.g., a resin powder or melt-fibers combined with a heat treatment, to define a specified density of the material.

In many embodiments, the distal end penetrating into or through the second object is a protrusion or a plurality of protrusions.

In this text, any relative arrangement within objects, items, devices, etc., and any relative arrangement between objects, items, devices etc. is given relative to an origin situated in the middle of the first object. When not otherwise stated, the surface of an object that is arranged closest to the origin is called the proximal surface of the object and a corresponding surface of the object, for example a corresponding surface arranged on the opposite side of the object, is called the distal surface. In the case of the first object, the surface directed to a proximal surface of another object to which the first object is to be set in contact and/or—as the case may be—to be bonded is called the distal surface of the first object. In other words, proximal surfaces are always set in contact and/or—as the case may be—bonded to distal surfaces during the method. Consequently, the protrusion(s) is/are arranged distally on the first object.

In many embodiments, a protruding portion means that there is a portion of the protrusion left after the step of letting the thermoplastic material resolidify, wherein the portion, this means the protruding portion, is not restricted to the outmost region of the second object, but extends into the volume of the second object. Being left means that the material defining the protruding portion has not penetrate into the structures of the second object.

How far the protruding portion penetrates into the second object depends on the application. However, the penetration depths of the protruding portion normal to the proximal surface of the second object is often larger than an extension of the protruding portion in a direction parallel to the proximal surface of the second object. This means, the ratio between the extension normal to the proximal surface and the extension parallel to the proximal surface is at least 1, in particular between 1 and 5, for example between 1.5 and 4 or between 2 and 3.

Slightly different definitions of the protruding portion and/or other features that characterise the protrusion portion are given below.

In this text, a surface or region of low density means that it is at least one of porous, fibrous and soft and/or that it includes a plurality of structures, voids, openings etc. The structures, voids and/or openings are capable for damping, in particular acoustic damping and/or vibration damping, for example.

In embodiments, in particular in embodiments of the method including the step of compressing the region of low density as described below in detail, the region of low density is compressible along an axis along which the mechanical pressing force is applied during the step of applying the mechanical pressing force and the mechanical excitation. The compression can lead to a reduction of a thickness of the region of low density by 10-90%, for example, wherein the thickness is measured along the axis at which the mechanical pressing force is applied. In particular, the thickness can be reduced by 30-90%, for example by 60-80%, or by 20-80%, for example by 30-70%.

A compression ratio is another measure for the compression of the region of low density. In particular, the compression ratio is an appropriate measure when local compression is considered. The compression ratio in the region of the protrusion can be between 1.1 and 10, in particular between 1.25 and 5, for example between 1.4 and 3.3.

The material or material composition forming the region of low density can be such that it can be locally compressed. For example, a local mechanical load, e.g., generated by the protrusion of the first object or a protruding region of an item attached to the second object, can cause the local compression of the region of low density.

The local and/or a "global" compression of the region of low density can be an elastic compression or predominantly elastic compression. This means, the compression relaxes (disappears) after removing the mechanical load causing the compression or relaxes mostly. In other words: the second object provided can be elastically deformable. The applicability of the bonding method also to second objects that are elastically compressible is an important advantage over known bonding methods that base on hard, this means not compressible, objects or on objects including portions that deform plastically, this means irreversible, only, for example hollow core boards (HCB).

Hence, a surface or region of low density means in many embodiment not only a surface or region that is at least one of porous, fibrous and soft and/or that it includes a plurality of structures, voids, openings etc., but also a surface or region that is compressible, in particular elastically compressible. Further, the surface or region can be locally compressible, this means compressible in a way that it can include regions that are compressed differently.

The compression can lead to an increase in compressive strength.

In embodiments, the second object may consist of a second object composition and the structures of the second object may be formed inherently by the composition. For example, the structures can be pores, voids, channels etc.

For example, the second object can include or consist of fibers, textiles, foam, porous materials, cardboard etc. It can be formed by a sequence of layers, wherein some of the layers can be at least one of rigid, non-compressible, dense (this means a low concentration of pores, voids, channels, etc.), and load-bearing. The second object and/or layers that form the second object can have a composition that is position dependent. In addition or alternatively, the sequence of layers can be position dependent.

In particular in embodiments of the method resulting in the protruding portion after the step of letting the thermoplastic material resolidify, the structures are such that a deep-effective anchoring, this means an anchoring in the volume of the second object and not only on its surface, is possible. However, one can envisage embodiments in which there is no need for specific structures for deep-effective anchoring. The embodiment including a proximal top layer as described below or embodiments aiming for the attachment of a third object as described below, wherein the third object guarantees that the protruding portion protrudes at least partly into the region of low density are example of such embodiments.

In addition or alternatively, one can also envisage to generate the structures of the second object, for example by roughening surfaces of the second object and/or by using a production process for the second object that generates such structures.

The mechanical excitation can set in after, prior to or at the same time of applying the mechanical pressing force. A mechanical pressing force that sets in prior to the mechanical excitation can be favourable in terms of bonding quality, in particular in terms of bonding depth and strength of the bonding generated. However, one can envisage configuration in which the mechanical excitation can help to optimize the penetration behaviour of the protrusion(s). Some of these configurations are discussed below.

The mechanical pressing force can last for a time sufficient for resolidification of the thermoplastic material after stopping the mechanical excitation.

The mechanical pressing force can vary during the step of applying the mechanical pressing force and the mechanical excitation and—as the case may be—during resolidification of the thermoplastic material.

The thermoplastic material of the first object is capable of being made flowable by absorption of the mechanical energy generated by the mechanical excitation, in particular mechanical oscillations/vibrations while the objects are pressed against each other. For example, the mechanical vibration energy can be coupled through the first and/or second object to an interface generated by thermoplastic material of the first object and material of the second object. At the interface, external and possibly also internal friction will cause thermoplastic material to heat and become flowable. Flowable thermoplastic material will then be pressed into the structures of the second object due to the pressure applied.

Portions of the first and/or second object that form the interface can include a profile that may serve as energy director, i.e., the energy absorption and heat generation will automatically be focussed on or around the respective interface.

In an embodiment, the second object provided includes a density profile that increases as a function of the distance from the proximal surface. In particular, the density increases in a distal direction normal to the proximal surface.

The increase in density can be continuous or stepwise.

If the second object extends between the proximal surface and a distal surface, the density can increase over a limited range of the second object, only.

The region of low density can be located at the proximal surface, the region of low density can be located at the distal surface, or the region of low density can be located somewhere between the proximal and the distal surface.

One can also envisage a second region of low density, one located at the proximal surface and the other one located at the distal surface, for example.

In an embodiment, the second object includes the region of low density located at the proximal surface (i.e. the region of low density is a proximal region) and a further region of high density located distally of the region of low density.

The region of low density is then a region having a lower density than the region of high density (i.e. than the further region).

The term "high density" in the region of high density or a region of high density is used to express the density of the region relative to the density of another region, in particular the region of low density. However, this term does not necessarily mean that the region of "high density" does not include a plurality of structures, voids, openings, etc. It does also not mean that the region is not compressible or that there is no need to compress the region to generate a critical density and/or compressive strength (details below). Rather, the region can have all physical properties attributed to a region of low density, too. However, the second object includes at least one region that has a lower density than the region of "high density".

In another embodiment, the further region is arranged distally of the region of low density, wherein the region of low density is not located at the proximal surface.

Alternatively or in addition to the further region, the region of low density can have a density that increases as a function of the distance from the proximal surface.

In an embodiment, the second object provided includes a proximal top layer, wherein the region of low density is arranged distally of the proximal top layer, and wherein the method includes the step of forcing the protrusion through the proximal top layer before liquefaction of the thermoplastic material.

The proximal top layer can be an integral part of the second object, for example the cover layer in "hollow core"-like board, wherein the region of low density fills the core region at least partly, or a cover layer, such as a decorative and/or functional cover layer, for example made of (artificial) leather, or any other external cladding.

The proximal top layer can be provided in a further step of the method and be positioned on the proximal surface of the second object in yet a further step of the method. In particular, the proximal top layer can be a third object as described below, for example a metal sheet, a foil or a cover layer. However, it can also be a cover layer or cladding as mentioned above, for example.

The density of the proximal top layer is higher than the density of the region of low density, generally.

The proximal top layer can be the further region of high density.

The proximal top layer can contribute to any density profile of the second object discussed above or it can be in addition to such a density profile.

In particular, it can be in addition to any density profile of the region of low density and—if present—of the further region.

One can envisage configurations in which there is no need for a region of high density. For example, a mechanical pressing force can be applied such that the distal end penetrates the region of low density partly, in a first step. In a subsequent second step, the mechanical oscillations can be applied with such an amplitude that the thermoplastic material becomes flowable. In addition, the mechanical pressing force can be reduced in order to reduce the velocity with which the first object penetrates the second object.

Alternatively or in addition, the proximal top layer or any other layer arranged proximally of the region of low density can cause a warming of the thermoplastic material when the protrusion is pushed through the layer. The warming is not sufficient to liquefy the thermoplastic material, but it reduces the mechanical pressing force and the mechanical excitation needed in the step of applying a mechanical pressing force and a mechanical excitation capable to liquefy the thermoplastic material.

In embodiments including a second object with any density profile as described above and, as the case may be, including the proximal top layer, the distal end of the first object (often the protrusion(s)) penetrates the region of low density at least partly before the thermoplastic material is made flowable.

The density profile can be such that the density of the second object in the region of low density is not high enough to generate the pressure needed to liquefy the thermoplastic material. In particular, the density in the region of low density is not high enough to cause liquefaction of the thermoplastic material when the mechanical pressing force and the mechanical excitation is applied for less than 15 s or less than 10 s, for example less than 5 s or 2 s. In particular, the density is not high enough to cause liquefaction when the mechanical pressing force and the mechanical excitation is applied for 0.1 to 1 s, for example for 0.1 to 0.5 s.

Alternatively or in addition, the step of applying the mechanical excitation needed to liquefy the thermoplastic material sets in after penetration of the distal end of the first object through the region of low density.

In an embodiment that is applicable to any density profile of the second object and/or the region of low density, the method includes the step of compressing the region of low density at least locally such that a critical density needed for the liquefaction of the thermoplastic material is generated.

The critical density corresponds to the density at which the critical compressive strength is established.

The step of compressing the region of low density at least locally can be a substep of the step of applying the mechanical pressing force and the mechanical excitation capable to liquefy the thermoplastic material.

In particular, the step of compressing the region of low density at least locally to a critical density can be prior to the step of applying the mechanical excitation.

The critical density that needs to be established depends on the aimed duration of applying the mechanical pressing force and the mechanical excitation after which liquefaction should occur.

The compression can be a global compression and/or a local compression.

The global compression can be established by compressing the region of low density over a wider area and not only around the protrusion(s). For example, this can be done by the first object body, in particular by its distal surface or by a portion of it. In particular, the first object body can penetrate into the region of low density at least partly.

Alternatively, the global compression can be established in the same way by another object that is attached to the second object by the use of the first object.

The local compression can be established by the protrusion(s), for example by displacing the portion(s) of the region of low density into which the protrusion(s) are forced.

Experiments have shown that in particular incoherent materials, such as panels made from a fibrous material, show a surprising stress-strain behaviour when a force (load) is applied locally to such a material. "Locally" in this context means that the force (load) is applied to an area of an item formed by the incoherent material, the area being significantly smaller that a corresponding extension of the item.

The following behaviour has been found on a variety of items of incoherent materials when a pressing force is applied locally and normal to the item:

An approximately linear dependence of the stress on strain can be observed as soon as strain is applied to the item. The roughly linear dependence forms a first region of linear dependence. The linear dependence of the stress on strain in the first region can be approximated by a straight line having a first slope.

A transition region in which the dependence of stress on strain increases steadily follows the first region of linear dependence when strain is further increased.

A second region of approximately linear dependency of stress on strain follows the transition region when strain is even further increased. The roughly linear dependence of the stress on strain in the second region can be approximated by a straight line having a second slope, wherein the second slope is larger than the first slope.

The pressing force (load) was applied by an intender having a relevant surface area between 4 and 200 mm$^2$. However, there is no hint that the behaviour summarized above is restricted to this range of relevant surface areas.

Due to this behaviour, a broad range of incoherent materials are surprisingly suitable for use in bonding methods relying on the liquefaction of thermoplastic material by the use of a mechanical pressing force and a mechanical excitation, in particular vibrations. This is because a broad range of incoherent materials reach the stress level needed for liquefaction of the thermoplastic material, i.e., the critical compressive strength, due to the existence of the second region of linear dependency, only.

Hence, the step of compressing the region of low density can be such that the stress-strain behaviour of the material is in the second region of linear dependency.

The strain value at which the first and second slope cross in the stress-strain diagram is a characteristic value of the stress-strain behaviour observed.

The step of compressing the region of low density can be such that the material is compressed to the characteristic value, at least.

Alternatively or in addition, the characteristic value can define a lower threshold for applying, this means switching on, the mechanical excitation used in the step of applying the mechanical pressing force and the mechanical excitation capable to liquefy the thermoplastic material. In other words, the mechanical excitation can be switched on at an applied pressing force that causes the characteristic strain value.

Further, it has been observed that deformation of the panels is largely reversible as long as liquefied thermoplastic material that has been pressed into pores, openings, etc., of the panel does not prevent the panel from returning to its original shape.

However, there can be configurations in which the deformation of the region of low density is irreversible, for example if the energy coupled into the panel is high enough to cause a permanent densification. For example, the region of low density can include fibers that melt during the method.

Any permanent deformation can be advantageous in terms of bonding strength.

In particular with incoherent materials, the critical density can be established around the protrusion(s) only, for example by a local increase of the global compression by an amount sufficient to reach the critical density.

Regions of the second object different from the region of low density and/or the proximal top layer and/or at least a portion of any object (e.g., a third object, a cover layer, an external cladding) to be attached or attached to the second object can be compressible, too. Hence, these regions and/or objects can contribute to a density profile that is in favour for liquefaction of the thermoplastic material and that is established during the method of bonding the first object to the second object. In particular, liquefaction can take place in such regions and/or objects, too.

In addition, the distal end of the first object, in particular the protrusion(s), can include a structure designed and arranged to promote local compression of the second object when it is forced into the second object. In particular, it is the region of low density that is compressed at least locally when the structure is forced into the region of low density.

Forcing the first object into the second object can be done in a further step including a movement, in particular a (partly) penetrating movement, of the first object relative to the second object. Generally, the local compression is an effect generated by the design and arrangement of the structure and by the relative movement.

The structures designed and arranged to promote local compression can have at least one of the following effects besides the effect of compressing the region of low density locally (in other words of increasing the density locally):

Material of the second object, for example fibers, is pulled in distal direction when the first object is pushed into the region of low density. This can lead to the additional effect of felting, in particular if the second object includes fibers.

Material of the second object is embedded in the structures and hence in the protrusion(s). This leads to a more even distribution of load acting on the bonded first and second object in use.

The quality of the embedment can be increased if the second object includes thermoplastic material such that a weld is formed between the structure or the protrusion in general and the second object and/or such that the second object changes is structural properties. Embodiments including a weld are described in detail below.

For example, the first object can include at least one barb, for example a barb in the shape of a catching barb and/or a drag down barb. The barb can be significantly smaller than the protrusion or it can have a size such that the barb contributes to the overall shape of the protrusion. In the latter case, the cross-section of the protrusion in a plane perpendicular to a longitudinal axis of the protrusion (also called protrusion axis) can depend significantly on the shape of the barb and/or it can depend on the position of the plane due to the presence of the barb, for example.

Multiple tips arranged with or without offset along the protrusion axis are further examples of structure designed and arranged to promote local compression Such a barb or the structure in general can be arranged to increase the density faced by the penetrating distal end, for example by collecting fibers. In other words: the barb makes sure that the density in front of the distal end increases in dependence of the penetration depth of the distal end into the second object.

Such a barb can also be present in embodiment, in which the second object includes an increasing density profile.

In addition to a compression of the region of low density, a weld can be formed between the thermoplastic material and a compressed region surrounding the protrusion(s) by choosing the material of the region of low density accordingly.

Embodiments in which a weld is formed are described in detail below. For example, the region of low density can include thermoplastic fibers.

An advantage of the embodiment including the compression of the region of low density is that the region does not need to have a density needed to liquefy the thermoplastic material generally or at a specific position. Rather, the density can be low and/or homogeneous. As pointed out above, the needed density or density profile can be generated during the process of bonding the first object to the second object.

Independent of the exact density profile of the second object, the distal end or a portion of the distal end, for example at least one of a plurality of protrusion, can penetrate the second object from the proximal to the distal end. Bonding of the first object to the second object can then be established by the use of an anvil including a proximal surface with a head-forming recess. In this embodiment, the method includes the step of positioning the proximal surface of the anvil relative to the distal end of the second object such that the penetrating distal end of the first object enters the head-forming recess.

Examples of second objects having a region of low density, for example at a surface, and—as the case may be—an increasing density in a direction normal to the surface are panels, insulations, sheathings, fairings, trims, carriers, absorbers, and decors used in vehicles, such as automobiles, trains and planes, for example in the luggage compartment, in the interior of the vehicle or around a wheelhouse.

For example, the second object can include natural or synthetic fibers, for example cotton or polyester fibers. These fibers can be embedded in a plastic, in particular a thermoplastic material, wherein free ends of the fibers, this means portions of the fibers not embedded in the plastic, form the region of low density. The arrangement of fibers and plastic can be such that the density increases continuously starting from the proximal surface and—optionally—decreases again towards the distal surface. However, the arrangement of fibers and plastic can be such that the density is essentially constant in the region formed by the free ends of the fibers, i.e., in the region of low density and/or that the density is essentially constant in the region formed by the fibers embedded in the plastic. In particular, there can be an essentially step-like increase in density when entering the region formed by the fibers embedded in the plastic.

Another group of second objects including somewhere, in particular at or close to the proximal surface, an increase in density in a direction normal to its surface are panels, sheathings, fairings, trims and carriers including a functional layer attached to a core. For example, the functional layer can be at least one of soft, softening, damping and curbing, in particular by including a plurality of openings, voids, movable components and/or non-rigid components.

Another example are dashboards including a top layer, for example a top layer made of artificial leather, that is arranged on a foam, wherein the foam becomes more dense and rigid with increasing distance from the top layer. Such dashboards can be considered as examples of a second object including a proximal top layer, wherein the region of low density is arranged distally of the proximal top layer.

In a group of embodiments, the first object includes an element of a connecting device, such as a thread, a cable holder, an element of a snap lock or of a bayonet lock.

In embodiments, the first object is a connector. In particular, the first object can form or be the element of a connecting device.

In an embodiment, the method further includes the step of providing a further object including an attachment location adapted to the element of the connecting device and the step of connecting the bonded first and second object to the further object.

In particular, the further object can be the device to which the second object, e.g., the panel, sheathing, fairing, trim or carrier has to be mounted.

The attachment location can be a counterpart of the element of the connecting device comprised or formed by the first object.

In an embodiment, the method includes the step of providing the further object and the first object includes a first object body that is designed to form a connection with a further object. The first object body can be according to any one of the embodiments described below.

The further object can be a fixing element such as a nail, a screw, a rivet, etc.

The further object can be equipped to mount an object different from the first, second and further object to the first and/or second object.

In particular, the further object provided can include a distal end, for example a tapered distal end, and the connection between the first object body and the further object is generated by the distal end of the further object penetrating the first object body at least partly.

The method can include the further steps of positioning the distal end of the further object relative to the first object body and of applying a mechanical pressing force to at least one of the first, second or further object, wherein the mechanical pressing force is such that the distal end of the further object penetrates the first object body at least partly.

In particular, the further steps are performed after the step of stopping the mechanical excitation and letting the thermoplastic material resolidify, this means after bonding the first object to the second object.

For example, the first object can be a reinforcement element. Such a reinforcement element has the effect to increase the mechanical stability of the second object after being bonded to the second object. In other words: The first object is designed to reinforce the second object locally such that a reliable connection between the further object and the second object via the first object can be established.

The use of the first object as a reinforcement element is advantageous in particular when the density profile of the second object does not allow for a specific connection, for example a connection based on nails, screws, rivets etc., and/or the mechanical stability of the second object is such that various connection methods cannot be used for reliable connection, for example due to the second object being bendable. Connections based on nails, screws, rivets, but also methods based on adhesives are examples of connections that do not result in a reliable connection between the further object and the second object if the second object is bendable, for example.

In addition or alternatively, the connection between the first object body and the further object can be generated by the first object body including an element of a connection device as described above and by the further object including a related counter-element.

An important advantage of connecting and/or attaching an object different from the first and second object to the second object by the use of the first object acting as a connection location (i.e. by using a two-step process) is that the object can be removed again. This statement is true independent of the concrete realization of the connection and/or attachment. In particular, the first object can include an element of a connecting device or the first object body can be designed to form the connection.

In an embodiment, the first object body includes a proximal surface, a distal surface and a connection location. The connection location includes at least a portion of the proximal surface of the first object body. For example, the connection location or a part of it extends as a protrusion from the proximal surface portion or the connection location or a part of it is an opening in the first object body, wherein the proximal surface portion forms a mouth of the opening.

In this embodiment, the first object includes a protrusion region, in particular a protrusion region in any one of the embodiments described below, arranged at the distal surface of the first object body and a functional region, in particular a functional region in any one of the embodiments described below, that does not include any protrusions, wherein the functional region is opposite of the proximal surface portion comprised by the connection location.

In embodiments, the mechanical pressing force and the mechanical excitation are applied locally to the at least one of the first and second object. In other words, the first object is bonded to the second object at bonding locations that are separate from each other, i.e., the bonding is generated by the use of bonding points and not by a continuous extensive bonding area.

For example, the bonding locations can be round, elliptic, rectangular or square having a characteristic length that is significantly smaller than a characteristic extension over which the first and second object are to be bonded together. In particular, the characteristic length is between a few millimeters to a few centimeters, for example between 1 mm and 10 cm, in particular between 1 mm and 5 cm, for example 0.5 mm, 1 cm, 2 cm, 3 cm, 4 cm or 5 cm. However, one can envisage situations in which a characteristic length of more than 10 cm are needed, for example if the first object forms a closed or partly closed form with a central opening.

In such embodiments, the step of applying the mechanical pressing force and the mechanical excitation and the step of stopping the mechanical excitation and letting the thermoplastic material resolidify is repeated several times at different positions on at least one of the first or second object.

It is an advantage of this embodiment that there is no limitation concerning the shape of the first and second object as long as they can be arranged to form an assembly of the first and second object including bonding locations and as long as these locations are accessible for a tool used to apply the mechanical pressing force and the mechanical excitation.

In particular, there is no need that the first and/or second object is/are essentially flat. Rather, one or both of the objects can be curved. Further, there is no restriction concerning the position of the bonding location with respect to each. For example, there is no need that the bonding location are arranged on plane or on planes that run parallel to each other.

An example of a tool equipped to apply the mechanical pressing force and the mechanical excitation is a handheld sonotrode or a sonotrode mounted on a robot arm.

The number of times the step of applying the mechanical pressing force and the mechanical excitation and the step of stopping the mechanical excitation and letting the thermoplastic material resolidify is repeated depends on various parameters such as the shape and the material of the first and second object and the strength of the bond needed.

In embodiments, the axis along which the mechanical oscillations occur, is essentially perpendicular to the proximal surface.

In the case of separate bonding locations, the axis along which the mechanical oscillations occur, is essentially perpendicular to the portion of the proximal surface defining the bonding location.

The proximal end of the first object can include a coupling-in face equipped for receiving the mechanical pressure force and the mechanical excitation. The coupling-in face after the step of arranging the first and the second object relative to each other such that an assembly of the first and second object is formed can be arranged parallel to the proximal surface or the portion of the proximal surface defining the bonding location.

In an embodiment, the first object provided includes the coupling-in face and the method further includes the steps of providing a sonotrode including a coupling-out face adapted to the coupling-in face and of bringing the coupling-out face in contact with the coupling-in face prior to the step of applying the mechanical pressing force.

Alternatively, the second object, in particular a distal surface of the second object can include the coupling-in face. In other words: The mechanical pressing force and the mechanical excitation needed to liquefy the thermoplastic material can be applied to the distal surface of the second object.

In an embodiment, the first object, the second object and the sonotrode can be arranged relative to each other such that the second object is between the first object and the sonotrode and such that the proximal surface of the second object is in contact with the at least one protrusion or gets in contact with the at least one protrusion of the first object during the method.

For example, the first object can be formed by a part of a car body on which the at least one protrusion including the thermoplastic material is arranged. The second object can be a cover. The shape of the cover can be adapted to the shape of the car body and/or the arrangement of the first object(s). According to this exemplary embodiment, the second object is positioned on the first object and the sonotrode is applied on surface regions of the second object that are opposite to surface regions of the second object that are in contact with a protrusion.

The mechanical pressing force and the mechanical excitation can be applied to the distal surface of the second object by use of the sonotrode. In this embodiment of the method, the distal surface of the second object is an exposed, "proximal" surface for a user that operates the sonotrode due to the fact that the surfaces of the objects are defined relative to an origin in the middle of the first object.

In embodiments in which the sonotrode is applied to the second object, the method can include a step of compressing the second object, for example the step of compressing the region of low density. In particular, the compression can be such that the second object becomes capable to transmit the mechanical excitation applied to the distal surface of the second object.

The surprising stress-strain behaviour discussed above make a broad range of incoherent materials suitable for transmitting the mechanical excitation used in bonding methods relying on the liquefaction of thermoplastic material by the use of a mechanical pressing force and mechanical excitation, in particular vibrations. Again, this is because a broad range of incoherent materials reach the stress level needed for transmitting the mechanical excitation thanks to the existence of the second region of linear dependency, only.

Hence, the step of compressing the region of low density can be such that the stress-strain behaviour of the material is in the second region of linear dependency and/or such that the material is compressed to the characteristic strain-value given by the crossing of the first and second slope.

In embodiments in which the sonotrode is applied to the first object, the step of applying the mechanical pressing force and the mechanical excitation to the first/second object can be done by the sonotrode being pressed against the coupling-in face of the first object while the second object may be optionally held directly or indirectly by a support (that may be held directly against the second object at the lateral position at which the sonotrode acts, or that may be constituted by a framework of a more complex object that holds the second object; such complex framework may, for example, be a body of an item to be assembled, such as a car body).

Optionally, the method can further include the step of locking the first object to the sonotrode after the step of bringing the coupling-out face in contact with the coupling-in face.

A distal end of the sonotrode including the coupling-out face can include openings and recesses such that a proximal protrusion of the first object is unaffected by the use of the sonotrode.

The mentioned element of a connecting device is an example of a possible proximal protrusion of the first object.

The sonotrode can be a ring-sonotrode.

The distal end of the sonotrode, in particular the coupling-out face, and the extension of the first object, in particular the extension of the first object at its proximal end, for example the coupling-in face, can be such that the distal end of the sonotrode covers at least the proximal end of the first object during bonding.

However, it is also possible that the distal end of the sonotrode and the extension of the first object are such that the mechanical pressing force and the mechanical oscillations applied to the first object by the sonotrode are local, only.

One can also envisage to apply the mechanical pressing force and the mechanical excitation to a plurality of bonding locations simultaneously. For example, this can be done by a sonotrode including a distal coupling face that is adapted to the bonding locations to be established.

In an embodiment, the first object provided includes a protrusion region distally of the first object body, wherein the first object body includes a distal surface and wherein the protrusion region includes a plurality of protrusions that includes the thermoplastic material.

One can envisage that not all protrusions, but a multitude of protrusions for example, include a protruding portion after the step of stopping the mechanical excitation and letting the thermoplastic material resolidify.

Each protrusion includes an extension in distal direction and a thickness. For example, the extension in distal direction is the length of the protrusion if the longitudinal protrusion axis runs along the axis perpendicular to the distal surface.

The extension of the protrusions in distal direction can vary within the plurality of protrusions comprised in the protrusion region.

In particular, the first object can include at least one protrusion of a first kind including the thermoplastic material and at least one protrusion of a second kind including the thermoplastic material, wherein the extension in distal direction of the protrusion of the first kind is larger than the corresponding extension in distal direction of the protrusion of the second kind. Hence, the positive-fit connection established by the protrusion of the first kind is at a different distal position than the positive-fit connection established by the protrusion of the second kind.

Embodiments including a protrusion of the first kind and a protrusion of the second kind (and, as the case may be, protrusions of further kinds, this means of protrusions having an extension in distal direction that is different form the extension in distal direction of the protrusion of the first kind, the second kind and of each other) can include at least one of:

Extensions in distal direction of the protrusions are chosen such that the bonding of the first object to the second object is established by involving a larger volume of the second object compared to the bonding based on extensions with equal extension in distal direction.

Protrusions with large or larger extension in distal direction and with small or smaller extension in distal direction are arranged such that a subsequent processing step, for example a forming step, of an item including the first object that is bonded to the second object is possible.

Protrusions with large or larger extension in distal direction and with small or smaller extension in distal direction are arranged such that a bending strength and/or tension strength is optimized.

For example, protrusions with a large extension can be arranged on the distal surface next to a lateral edge or lateral edges of the first object body, wherein protrusions with a smaller extension can be arranged at the center of the distal surface of the first object body.

Protrusions with different extensions in distal direction that are optimized in terms of material costs, optionally in combination with an arrangement of the protrusions with different extensions in distal direction that is optimized for a specific application and the pulling/bending forces accompanied by the application.

Independent of the concrete embodiment of the method or the device (this means the first object), the protruding portion corresponds to the related protrusion after its deformation during the step of stopping the mechanical excitation and letting the thermoplastic material resolidify. Hence, it is located in the region of the initial protrusion with respect to the first object body. In particular, the protruding portion protrudes at the same position from the distal surface of the first object as the protrusion before applying the mechanical pressing force and the mechanical excitation.

For example, the protruding portion can be a portion of the protrusion that does not liquefy during the step of applying the mechanical pressing force and the mechanical excitation. However, the protruding portion can also be an accumulation of re-solidified material in a region relative to the first object at which a protrusion has been present before the step of applying the mechanical pressing force and the mechanical excitation.

An effect of protruding portion(s) after the step of stopping the mechanical excitation and letting the thermoplastic material resolidify is a bonding area that extends into the second object, this means that is not restricted to the surface area of the second object, only. In other words: a deep-effective anchorage is established. This increases the mechanical strength of the bond, in particular its mechanical load capability, significantly compared to bonds without protruding portions.

The protrusion(s) used in embodiments of the invention are not energy directors as described below. For example, the protrusion(s) are dimensioned along the axis perpendicular to the distal surface of the first object body such that they allow for deep-effective anchorage. This means that their extension along the axis perpendicular to the distal surface is larger than the corresponding extension of energy directors. Further, the protrusion(s) can form the protruding portion after the step of stopping the mechanical excitation and letting the thermoplastic material resolidify. Energy directors do not form such protruding portions because they define positions at which liquefaction sets in which also means that they disperse during the step of applying the mechanical pressing force and the mechanical excitation.

However, the protrusion(s) can include energy directors.

The protrusion(s) can be tapered and have any pointed and/or sharp form, such as a ridge or a tip, for example.

The protrusion(s) can also diminish in diameter in step-like manner or they can be constant in diameter The protrusion, some protrusions or all protrusions can include the structure designed and arranged to promote local compression mentioned above.

The protrusion or at least one of the protrusions can be asymmetric in shape. In particular, it can have a shape that is not rotation-symmetric with respect to an axis perpendicular to the distal surface of the first object body.

In an embodiment, the protrusion or at least one of the protrusions is at least one of:
- Equipped for defining a deformation direction during the step of applying the mechanical pressing force and the mechanical excitation.
  - For example, the protrusion can include a recess arranged such that the protrusion deforms in a specific direction when loaded and/or the protrusion can be bent away from the axis perpendicular to the distal surface of the first object body before the step of applying the mechanical pressing force and the mechanical excitation.
- Equipped for defining a direction into which liquefied thermoplastic material flows during the step of applying the mechanical pressing force and the mechanical excitation, and
- Including a protrusion axis that runs at an angle to the distal surface of the first object body, wherein the angle is not a right angle.

Each protrusion includes an extension in distal direction and a thickness, as mentioned above. The extension in distal direction is the length of the protrusion if a longitudinal protrusion axis runs along the axis perpendicular to the distal surface.

In an embodiment, the ratio between the extension in distal direction and the thickness is at least 1, in particular between 1 and 5, for example between 1.5 and 4 or between 2 and 3. In other words: the extension of the protrusion(s) along the axis perpendicular to the distal surfaces is larger than a thickness along a direction that is radial to the perpendicular axis.

In embodiments, the extension in distal direction of the protrusion(s) corresponds to 10%-80% of the corresponding thickness of the second object or—depending on the concrete realization of the second object—to 10%-80% of the corresponding thickness of the region of low density. In particular, the extension in distal direction of the protrusion(s) corresponds to 15%-70% or to 20%-50% of the corresponding thickness.

In embodiments including a plurality of protrusions, the protrusion region includes gaps between the protrusions.

Within this text, "gaps" means the overall space separating a protrusion from other protrusions rather than a distance between protrusions.

The gaps can extend to the distal surface of the first object body. In particular, the protrusions can be arranged on the distal surface of the first object body in a manner that flat regions of the distal surface are formed between the protrusions.

The flat regions can form stopping surfaces as described below.

As mentioned above, the surfaces of the first object defining the gaps can be arranged to compress the first object, in particular the region of low density, prior to liquefying the thermoplastic material.

In particular, the surfaces are arranged such that a global compression and an additional local compression results, wherein the local compression occurs around the protrusion and guarantees the critical compression needed for liquefaction of the thermoplastic material.

Further, the surfaces effect a stabilization of the bonding process due to the fact that a steadily increasing counterforce to the applied mechanical pressing force is generated. This also helps avoiding an unintentional piercing of the second object or the region of low density and compensating for density variations in the second object or the region of low density.

The total volume of the protrusion region can be given by the portion of the distal surface of the first object body including protrusions and an extension of the protrusion region in distal direction. For example, the extension of the protrusion region in distal direction can be the extension of the protrusions along the axis perpendicular to the distal surface, wherein all protrusions have the same extension, and the portion of the distal surface including protrusions forms a base of the protrusion region, such that the total volume of the protrusion region is given by the product between the portion of the distal surface and the extension.

In an embodiment, the total volume consists of the volume of the plurality of protrusions and of the volume of the gaps (this means the total volume of the space mentioned above) within the protrusion region, wherein the volume of the gaps is larger than the volume of the protrusions. In other words: The ratio between the volume of the gaps and the volume of the protrusions is larger than 1, in particular larger than 2, for example 3, 4, 5. In many embodiments, the ratio is smaller than 10.

In an embodiment, the distal surface of the first object body includes a functional region, this means a region that has a function different from bonding the first and second object. Hence, the functional region does not include any protrusions.

The functional region is not at all or only at the very end of the bonding in contact with the proximal surface of the second object. Therefore, its mechanical and/or thermal load is reduced significantly compared to regions of the distal surface of the first object body that include protrusions.

For example, the functional region includes a distal mouth of an opening that goes through the first object body. The opening can be a guide for a wire or a sensor and/or it can form a finish of an opening in the second object, for example.

In embodiments the protrusions can consist of the thermoplastic material or the thermoplastic material can be arranged at least partly around a core of a harder material. In this context, a harder material means a material that does not become flowable due to the mechanical pressure force and mechanical excitation applied.

The harder material can be a plastic different from the thermoplastic material or metallic, for example.

In particular, the tip or the part of the ridge of the protrusion(s) being in contact with the second object after arranging the first object relative to the second object can be made of harder material that is not covered by the thermoplastic material.

Alternatively, at least one of the distal end of the protrusions, a step, and an edge can include the thermoplastic material. In such embodiments, the protrusions form so-called energy directors by their shape. This means, that they define one or more spots where the liquefaction of the thermoplastic material sets in.

Energy directors are structures at which the mechanical oscillations and/or pressure force applied are focused and/or couple into the thermoplastic material in an efficient manner.

The first object in any embodiment can include energy directors that differ from the energy directors possibly generated by the, for example tapered, step-like or edgy, shape of the protrusions, for example by further tips and ridges that are arranged on the side of the protrusions.

In embodiments in which the first object provided includes the protrusions at its distal end, the method can include the step of arranging the first object relative to the second object such that the protrusions are in physical contact with the proximal surface.

In addition, the step of applying the mechanical pressing force can include applying a mechanical pressing force of a strength such that the protrusions penetrate through the region of low density and other regions optionally arranged proximally of the region of low density.

The effect of protruding the region of low density before applying a pressure suitable for liquefaction of the thermoplastic material is generated and/or before applying the mechanical oscillations is a bonding area that extends into the second object, i.e., which is not restricted to the surface area of the second object, only.

This effect can be increased further by applying a mechanical pressing force of a strength such that the protrusions penetrate into a region of high density.

In particular, the step of applying the mechanical pressing force includes applying a first mechanical pressing force and a second mechanical pressing force, wherein the first mechanical pressing force is smaller than the second mechanical pressing force or equal to it.

For example, the first mechanical pressing force has a strength such that the distal end of the first object, for example the protrusions, penetrate the region of low density of the second object. The second mechanical pressing force can have a strength such that the distal end of the first object, for example the protrusions, penetrate into the region having a higher density.

The second mechanical pressing force can be adapted to guarantee a well-controlled penetration, e.g., in terms of penetration speed, into the region having the higher density.

Generally, the second mechanical pressing force sets in prior to the mechanical excitation capable to liquefy the thermoplastic material.

The increase from the first mechanical pressing force to the second mechanical pressing force can be continuously or step-like.

In an embodiment, the method includes further the steps of:
  providing a third object including a third object proximal surface and a third object distal surface;
  arranging the third object relative to the second object such that the third object distal surface is in physical contact with the proximal surface of the second object;
  forcing at least a portion of the first object through the third object from its proximal surface to its distal surface prior to the step of applying the mechanical excitation capable to liquefy the thermoplastic material and to cause the flowable portion of the thermoplastic material to penetrate into the structures of the second object.

However, it is a further insight of the invention that both protrusion(s) including the thermoplastic material in a solid state and protrusion(s) consisting of the thermoplastic material can be used to pierce third objects of various materials and dimensions by optimizing the mechanical pressing force, the mechanical excitation and the onset of the mechanical excitation relative to the onset of the mechanical pressing force.

In an embodiment, the third object can include or consist of a sheet material without pre-drilled bores and the method can include the step of piercing the sheet material before the mechanical pressing force and the mechanical excitation capable to liquefy the thermoplastic material is applied. However, this does not imply that no mechanical pressing force and/or mechanical excitation is applied during the step of piercing the metal sheet.

The sheet material to be pierced can be a flange arranged to fix the third object to the second object.

The sheet material can be arranged relative to the first and second object such that a first protrusion of the first object pierces the sheet material before bonding the first object to the second object and such that a second protrusion does not get in contact with the sheet material during the method.

In particular, the sheet material can be a metal sheet.

Experiments have shown that piercing of titanium sheets of a thickness (strength) of up to 0.3 mm and aluminium sheets of a thickness of up to 0.5 mm can be pierced, at least.

In an embodiment with or without providing a third object, the method can include a step of using the mechanical excitation to adjust the penetration behaviour of the protrusion(s).

If the mechanical excitation used in combination with a pressure acting on the thermoplastic material that is not capable to liquefy the thermoplastic material, the penetration depth of the protrusion(s) into the second object can be adjusted.

If the mechanical excitation used in combination with the pressure acting on the thermoplastic material is capable to liquefy the thermoplastic material, the thermoplastic material can be liquefied and pressed into the second object in a continuous manner. This can lead to a layer-like region in the second object or a head-like structure on the distal surface of the second object and hence to a more reliable bond.

Additionally, the method according to this embodiment can include the step of compressing portions of the second object locally and/or globally to reach the critical density needed to liquefaction of the thermoplastic material.

In an embodiment, the first object includes at least one protrusion of a first kind including the thermoplastic material and at least one protrusion of the second kind including the thermoplastic material. The shape of the protrusion of the first kind can be such that the flowable portion of the thermoplastic material penetrates into the structures of the second object and the shape of the protrusion of the second kind is such that a flowable portion of the thermoplastic material penetrates into structures of the third object during the step of applying the mechanical pressing force and the mechanical excitation capable to liquefy the thermoplastic material.

For example, the dimensions, in particular the length and thickness, of the protrusion of the first kind and the dimensions of the protrusion of the second kind can be adapted to each other and to the thickness of the second and third object, such that their liquefaction sets in at the desired positions in second and third object, respectively.

In particular, the third object can have the same density profile as the second object. In this case, the length of the protrusion of the first kind and the length of the protrusion of the second kind can be adapted to the distance of the regions of low density from the proximal surface of the third object.

A depth of the bonding area in the second object can be adjusted by the time duration of the mechanical pressing force applied prior to applying the mechanical excitation and/or the strength of the mechanical pressing force.

The first object provided can include a mark indicating the penetration depth of the first object into the second object prior to the step of applying both the mechanical pressing force and the mechanical excitation capable to liquefy the thermoplastic material.

The depth of the bonding area in the second object corresponds to a maximum penetration depth of the thermoplastic material of the first object into the second object after resolidification. The maximum penetration depth is measured along the axis along which the first object is forced into the second object.

Often, the maximum penetration depth is measured along an axis normal to the proximal surface of the second object or—as the case may be—normal to the portion of the proximal surface defining the bonding location.

In embodiments, the step of applying mechanical pressure may be carried out until abutting surface portions of the first and second objects (or the first and third object, as the case may be) lie against each other.

In particular, a first object including a stopping surface is provided. For example, the stopping surface is a surface arranged to lie flatly on the second (third) object after bonding the first object to the second object.

Such a stopping surface can define a maximum penetration depth of the thermoplastic material of the first object into the second object.

If the first object includes a protrusion, the protrusion protrudes distally from the stopping surface.

If the first object includes the mark indicating the penetration depth of the first object into the second object prior to liquefaction of the first object, the stopping surface is arranged proximally of the mark.

Measures that have the effect of a well-defined depth of the bonding area are advantageous in the case of a second object including a distal surface that has to be unaffected by the method of bonding the first object to the second object.

A decorative layer, a so-called "A-surface" or any other surface that is visible for the user after bonding are examples of surfaces that have to be unaffected by the bonding method.

In an embodiment, the method further includes the steps of providing the third object including the third object proximal surface and the third object distal surface, arranging the third object relative to the second object such that at least a portion of the third object distal surface is in physical contact with the proximal surface of the second object, and forcing at least a portion of the protrusion through the third object from its proximal face to its distal face.

In such embodiments, the third object is in particular at least one of:

A metal sheet including a through bore. The through bore can form a region that is bent in the distal direction.

The bent region can lead to a local compression of the second object during a step of pressing the bent region into the second object.

The trough bore is designed such that there is a protruding portion in the second object after bonding the first object to the second object, this means after attaching the third object to the second object by bonding the first object to the second object. This also means that the protrusion can lead to a (further, as the case may be) local compression of the second object in the region of the opening.

The method can include the further step of applying a lateral compressing force to a portion of the protrusion and to generate a melting zone at a contact surface between the portion of the protrusion and the third object.

For example, the bent region can be elastically deformable and the through bore that forms the bent region can have a diameter that is smaller than a diameter of the protrusion. Hence, the elastically deformable, bent region can be deformed by pushing the protrusion through the opening. This deformation can generate the lateral compressing force to the portion of the protrusion.

A foil, wherein the foil is designed to be penetrable by the protrusion. In particular, it can be provided as a perforated foil. Alternatively, the foil can have a thickness and a strength such that it can be penetrated by the protrusion during the method.

Optionally, the foil can include or be made of a thermoplastic material, such that a weld between the foil and the protrusion can be formed.

One can envisage to provide a third object that is not a foil and that is penetrable by the protrusion and/or includes thermoplastic material, nevertheless.

A third object that includes a thickness and a density profile such that the protrusion can penetrate the third object during the step of applying the mechanical pressing force and the mechanical excitation but without causing the thermoplastic material of the protrusion to liquefy within or at a surface of the third object.

Yet in another embodiment of the method including the further steps of providing the third object, the first object provided includes a first object body including the proximal surface of the first object body, the third object provided includes the third object proximal surface and the third object distal surface, and the method includes the further step of arranging the third object relative to the first object such that the third object distal surface is in physical contact with the proximal surface of the first object body.

Optionally, the third object can be arranged and fixed on the first object such that the third object is not in direct contact with the second object.

The third object can be glued on the proximal surface of the first object body.

In an embodiment, the second object provided includes a distal surface and the first object provided as well as the step of applying the mechanical pressing force and the mechanical excitation can be such that the distal surface is unaffected by the method.

In particular, the mechanical excitation can be applied to the distal surface of the second object and a force for advancing the at least one protrusion into the region of low density can be applied to the first object. Such an arrangement of mechanical excitation and force for advancing the protrusion(s) into the second object can be used to generate a density profile in the region of low density, in which the maximal densification is generated at the distal end of the protrusions and not at the distal surface of the second object.

The distal surface of the second object can be the distal surface of the region of low density. For example, the second object can consist of the region of low density at least at positions at which the first object is to be bond to the second object.

The force for advancing the at least one protrusion into the region of low density can be or cause the mechanical pressing force needed for liquefying the thermoplastic material.

In particular, the depth of the bonding area is smaller than a thickness of the second object that is defined as the distance between its proximal and distal surface, wherein any compressing effects that can cause the thickness of the second object to decrease during bonding of the first object to the second object are considered.

However, this does not imply that the protrusions have a length smaller than the thickness of the second object. In other words, the protrusions can have a length along the axis along which the first object is forced into the second object that is larger than the thickness of the second object. This is because of penetration of thermoplastic material into structures of the second object and hence in directions that are different from the axis.

In embodiments in which the distal surface of the second object is formed by a layer different from the proximal surface and/or a core layer, the depth of the bonding area can be such that the bonding area is not in contact with the layer forming the distal surface. In particular, the method of bonding the first object to the second object does not rely on any physical property of the layer.

The above mentioned stopping surface, mark, time duration of the mechanical pressing force applied prior to applying the mechanical excitation as well as any combination of them are examples of first objects and embodiments of the method adapted such that the distal surface is unaffected by the bonding.

The use of mechanical oscillations with an amplitude not sufficient to cause liquefaction of the thermoplastic material in combination with the mechanical pressing force used to force the first object into the second object can help to reduce at least one of the mechanical pressing force needed for forcing the first object into the second object, the mechanical load on the distal surface, and the stress induced into the second object and on the distal surface of the second object.

In an embodiment, the second object provided includes a thermoplastic material capable to liquefy when exposed to mechanical pressure and mechanical excitation as applied in the method. The step of applying the mechanical excitation can then include an at least partial liquefaction of the thermoplastic material of the second object such that a weld is formed by the liquefied thermoplastic material of the second object and liquefied thermoplastic material of the first object after resolidification of the thermoplastic materials.

The meltability of the second object can be such that the structure of the second object changes.

For example, the second object can include thermoplastic fibers, e.g., as disclosed above. Then, the thermoplastic fibers can melt together in the region around the protrusion(s) due to the impact of mechanical pressing force and mechanical excitation applied. In other words: the thermoplastic fibers connect in the region.

Such a change of the structure of the second object reinforces, in particular strengthens and stiffens, the bonding location between the first and second object. In other words: the quality of the bonding between the first and the second object can be increased by the composition of the second object, in particular by the composition of the region of low density.

At least one of the following features can be advantageous in order to promote the change in the structure of the second object:

- A high concentration of thermoplastic materials, for example thermoplastic fibers, in the region of the second object that becomes the bonding location.
- The melting point of the thermoplastic material of the second object is similar to or lower than the melting point of the thermoplastic material of the first object.
- Such a weld can also be formed in the third object.

In an embodiment in which the second object includes, for example, natural or synthetic fibers that are embedded in a plastic, the plastic can be the thermoplastic material of the second object.

For example, the second object can be produced by a method including the steps of:

- Providing fibers of a first kind and fibers of a second kind, wherein the fibers of the first kind have a melting temperature that is lower than the melting temperature of the fibers of the second kind.
- Mixing the fibers of the first and second kind, such that an assembly of fibers of the first and second kind is generated.
- Heating the assembly of fibers of the first and second kind to such a temperature that the fibers of the first kind meld at least partly and embed the non-melting fibers of the second kind.

In an embodiment of the method in which a weld between the first and the second object is formed, the weld can be formed between the thermoplastic material of the first object and the fibers of the first kind (that flowed together), between the thermoplastic material of the first object and the fibers of the second kind, or between the thermoplastic material of the first object and both the fibers of the first and second kind.

Between which components the weld is formed and where in the assembly of the first and second object it is formed depends on the physical properties (in particular melting temperature and compatibility) of the components and the shape and relative arrangement of the first and second object.

In an embodiment, the fiber of the first kind includes or consists of Polypropylene.

The first object can be a glass fiber reinforced plastic (e.g., Polypropylene) connector, for example.

If the first object is a glass fiber reinforced plastic (e.g., Polypropylene) connector and the fibers of the first kind consist of the same plastic (e.g., Polypropylene), the location of the weld can be arranged easily by defining the location of maximum heating, e.g., by shape of the coupling-out face, the shape of the coupling-in face and/or the use of energy directors.

The weld can be formed in addition to the interpenetration of liquefied thermoplastic material of the first object into the structures of the second object.

In an embodiment, the second object is provided within a mold that is adapted to a desired shape of the second object. The step of applying the mechanical pressing force and the mechanical excitation can be carried out on the second object supported by the mold. This can avoid a deformation of the distal surface of the second object due to pressure applied during the bonding of the first object to the second object.

The invention further concerns a device suitable for being bond to an item by the method in any embodiment. Thereby, the device corresponds to the first object and the item corresponds to the second object.

The device can include any feature disclosed in relation to the first object.

The device extends between a proximal end and a distal end and includes a device body that forms a proximal surface and a distal surface. The device includes a plurality of protrusions that protrude from the distal surface.

The device further includes thermoplastic material in a solid state. In particular, the protrusions include the thermoplastic material at outer surfaces.

The protrusions can include a core of a harder material (as described above) around which the thermoplastic material is arranged.

Alternatively, the protrusions, the protrusions and the device body or the device consist of the thermoplastic material.

Each protrusion can taper towards one or more point, i.e. being a tip or multi-tip, or towards a line, i.e., being ridge-like, wherein the line can be straight or bent.

The protrusions can taper continuously or step-like.

The protrusions can form energy directions structures by their overall shape, for example by being tapered or by including steps and/or they can include a structure that serve as an energy director exclusively.

In an embodiment, the device includes a stopping surface generated by the portion of the distal surface that does not support the protrusions.

In particular, the protrusions protrude essentially normal to the distal surface such that the stopping surface runs essentially perpendicular to an axis along which the protrusions extend, for example taper.

In particular, the stopping surface is formed by the portion of the distal surface between the protrusions. However, one can also envisage to arrange the protrusions such that a protrusion is in direct contact to its neighboring protrusion(s). In this embodiment, the stopping surface is reduced to a line running between the protrusions.

In an embodiment, the device is a connector. For example, the device further includes an element of a connecting device and/or the device body is such that a further object can be attached, for example bonded or anchored in the device body.

The element can be an element of a mechanical and/or electrical connecting device.

In particular, the connector can be equipped to attach a further object to the proximal end of the connector, wherein the connector is boned to the item at its distal end.

For example, the element of the connecting device is arranged on the proximal surface such that a counter element of the connecting device that is arranged on the further object can engage with it.

The connector can include a proximal functional structure. This means a functional structure arranged on or in the proximal surface of the device body.

The proximal functional structure may be a connecting structure defining a connecting location, especially a connecting location defined with respect to all dimensions (x, y, z).

The functional structure (the connecting location if the functional structure is a connecting structure) may be off-center with respect to an insertion axis so that the orientation of the connector around its insertion axis (generally the proximodistal axis that may be central with respect to the device body and/or protrusion region) determines the position and orientation of the connecting location. In this, the functional structure is, for example, different from a fastening hole (with our without a thread) coaxial with the axis, from a coaxial peg or threaded bar protruding towards proximally, from a head, etc., or any other conventional fastening structure of a known fastener.

The method may include bonding the connector relative to the second object in a well-defined x, y and z position, and in a well-defined orientation.

To this end, one or more of the following measures may be implemented:

The tool by which the mechanical pressing force and, as the case may be, the mechanical excitation is applied includes a position control that stops the process when the connector has reached a well-defined z position.

The connector has the stopping surface, this means a distally facing abutment face, and the process stops in a condition in which the stopping surface rests against the proximal surface of the second object, or against a corresponding proximally facing structure of the second object, or a mechanical resistance against a further forward movement of the connector towards the second object has reached a certain value (force control), or the proximal surface of the device body (or a portion of it) is flush with a portion of the proximal surface of the second object.

The connector has a not rotationally symmetric (about the insertion axis) guiding structure cooperating with a corresponding structure of the tool to define the orientation.

The coupling-in face of the connector can include or form the guiding structure.

The coupling-out face of the tool, in particular of the sonotrode, can include or form the corresponding structure.

The connector has a distal guiding structure that is not rotationally symmetric about the insertion axis and that cooperates with an according not rotationally symmetric positioning hole of the second object.

More in general, the functional structure can be part of a functional portion that further can include a distally facing abutment structure, wherein the mechanical pressing force or a mechanical pressing force is applied until the abutment structure abuts against the proximal surface of the second object or a portion of the proximal surface. Such abutment structure may be the distal surface of a plate-like device body, or it may be constituted by another feature of the functional portion. The abutment portion defines a separation plane between the distal protrusion(s) and the proximal functional portion.

In particular, the connector can include the proximal functional structure in combination with the protruding region including a plurality of protrusions, this means a plurality of separated boding locations.

In an embodiment, the device or more generally the first object can include a cutting structure. In particular, the protrusion(s) can be formed to include the cutting structure.

A device (first object) as used in any embodiment of the method described above includes natural oscillations. These natural oscillations can effect adversely the device, in particular the device body (first object body) when the mechanical excitation used to liquefy the thermoplastic material are mechanical oscillations of a frequency that allow excitation of a natural oscillation. In other words, destructive natural oscillations can be excited in the device.

In embodiments of the device (of the first object respectively), the device includes features capable to avoid or damp destructive natural oscillations. For example, the device includes at least one of:

A damping element arranged at the distal surface of the device body. In particular, the damping element is designed to get in contact with the second or third object during the method.

A fixation element including fixation element connection means and a connecting element including connection element connection means. The fixation element connection means and the connection element connection means are adapted to each other in a manner that the connection element connection means can be rigidly connected to the fixation element connection means at least when the fixation element is fixed to the item.

A method that includes the step of providing a first object including the fixation element and the connecting element can include a second step of applying a mechanical pressing force and a mechanical excitation after the step of applying the mechanical pressing force and the mechanical excitation used to form the positive-fit connection between the first and second object. In this case, the positive-fit connection is formed between the fixation element and the second object. The second step of applying a mechanical pressing force and a mechanical excitation yields a bond between the fixation element and the connecting element, in particular by use of the fixation element connection means and the connection element connection means. The fixation element and the connecting element can be designed so that no destructive natural oscillations are excited in the connecting element during the second step of applying a mechanical pressing force and a mechanical excitation. However, one can also envisage other means not including thermoplastic material to bond the connecting element to the fixation element, for example snap locks, bayonet locks, clamp devices.

A plurality of protrusion regions that are separate from each other.
  It has been found that the frequency of natural oscillations of the device body (the first object body) can be tuned away from the frequency of the mechanical excitation needed and applied to cause liquefaction of the thermoplastic material by arranging a plurality of distinct protrusion regions on the distal surface of the first object body. In particular, the frequency of the natural oscillations can be tuned by the distance between the distinct protrusion regions, the number of distinct protrusion regions and the areas that the distinct protrusion regions cover on the distal surface of the first object body.
  Further, the energy of the mechanical excitation needed to liquefy the thermoplastic material can be reduced by arranging a plurality of distinct protrusion regions on the distal surface of the first object body rather than a large, non-interrupted protrusion region. This reduces the energy needed liquefy the thermoplastic material and can therefore avoid that an excited natural oscillation becomes destructive.

A device body being non-homogenous in its physical properties.
  This features includes device bodies that include voids (openings). In particular, the voids can be such that the shape of the device body is adapted to the shape of the coupling-out face of the sonotrode.

Natural oscillation of the kind described above, destructive deformations, this means deformations that lead to material failure due to stress, and the combination thereof can be generated in a third object that is to be fixed to the second object by the first object.

In particular, this is the case when the third object is rigid, for example a metal sheet, and/or if the third object does not include openings for the protrusion(s) of the first object or openings that are not adapted to the protrusion(s). An opening can be non-adapted to a protrusion by having a smaller diameter than a diameter of the protrusion or by being not a through bore, wherein a length of the protrusion is larger than a depth of the opening.

Uncontrolled material failure of the third object during the method can effect adversely the reliability of an item including the third object that is bond to the second object by the first object as such material failure can be the origin of a failure of the item. For example, cracks can enlarge and propagate during use of the item.

Destructive natural oscillation and destructive deformations can be avoided by designing the first object appropriately. In particular, the first object can include at least one of the following features:
  The first object includes an arrangement of protrusions that is capable to damp natural oscillations of the third object and/or that is capable to prevent the third object from deforming at critical positions.
    The protrusions can be of a same length, this means they can extend equally to the distal direction.
    In an embodiment, the first object can include a first row of protrusions and a second row of protrusions. The rows can follow a straight or bent line. The rows can run parallel to each other.
  The distal surface of the first object can include regions that are offset from each other in the distal direction.
    For example, the region between a first and second row can be offset from another region on the distal surface of the first object.
  The first object can include a damping element arranged at the distal surface of the first object. In particular, the damping element can be designed to get in contact with the third object during the method.
    The protrusions of a row can form the damping element. However, a single protrusion can be enough to damp natural oscillations. The exact design of the damping element depends on various parameters, such as the size of the first object, the size and material of the third object, etc.

In this text the expression "thermoplastic material being capable of being made flowable e.g., by mechanical vibration" or in short "liquefiable thermoplastic material" or "liquefiable material" or "thermoplastic" is used for describing a material including at least one thermoplastic component, which material becomes liquid (flowable) when heated, in particular when heated through friction i.e., when arranged at one of a pair of surfaces (contact faces) being in contact with each other and vibrationally moved relative to each other, wherein the frequency of the vibration has the properties discussed hereinbefore. In some situations, for example if the first object itself has to carry substantial loads, it may be advantageous if the material has an elasticity coefficient of more than 0.5 GPa. In other embodiments, the elasticity coefficient may be below this value, as the vibration conducting properties of the first object thermoplastic material do not play a role in the process. Especially, since the profile body may have a relatively small extension in the proximodistal direction and since therefore the method is also suitable for fixing a relatively thin first or second object to the second or first object (including the possibility of both objects being thin), the approach of the invention may also work for thermoplastic materials that are poor vibration conductors, such as thermoplastic materials with a low modulus of elasticity and/or with elastomeric properties. This is especially the case since the shape of the profile body may ensure that the contact with the respective object is essentially line-shaped. This has a high energy concentrating effect, making a local liquefaction possible even if the thermoplastic material has strong damping properties.

Thermoplastic materials are well-known in the automotive and aviation industry. For the purpose of the method according to the present invention, especially thermoplastic materials known for applications in these industries may be used.

A thermoplastic material suitable for the method according to the invention is solid at room temperature (or at a temperature at which the method is carried out). It preferably includes a polymeric phase (especially C, P, S or Si chain based) that transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than of the liquid phase. The thermoplastic material will generally include a polymeric component that is not cross-linked covalently or cross-linked in a manner that the cross-linking bonds open reversibly upon heating to or above a melting temperature range. The polymer material may further include a filler, e.g., fibers or particles of material which has no thermoplastic properties or has thermoplastic properties including a melting temperature range which is considerably higher than the melting temperature range of the basic polymer.

In this text, generally a "non-liquefiable" material is a material that does not liquefy at temperatures reached during the process, thus especially at temperatures at which the thermoplastic material of the first object is liquefied. This does not exclude the possibility that the non-liquefiable material would be capable of liquefying at temperatures that are not reached during the process, generally far (for example, by at least 80° C.) above a liquefaction temperature of the thermoplastic material or thermoplastic materials liquefied during the process. The liquefaction temperature is the melting temperature for crystalline polymers. For amorphous thermoplastics the liquefaction temperature (also called "melting temperature" in this text) is a temperature above the glass transition temperature at which the becomes sufficiently flowable, sometimes referred to as the 'flow temperature' (sometimes defined as the lowest temperature at which extrusion is possible), for example the temperature at which the viscosity drops to below $10^4$ Pa*s (in embodiments, especially with polymers substantially without fiber reinforcement, to below $10^3$ Pa*s)), of the thermoplastic material.

For example, non-liquefiable material may be a metal, such as aluminium or steel, or a hard plastic, for example a reinforced or not reinforced thermosetting polymer or a reinforced or not reinforced thermoplastic with a melting temperature (and/or glass transition temperature) considerably higher than the melting temperature/glass transition temperature of the liquefiable part, for example with a melting temperature and/or glass transition temperature higher by at least 50° C. or 80° C.

Specific embodiments of thermoplastic materials are: Polyetherketone (PEEK), polyesters, such as polybutylene terephthalate (PBT) or Polyethylenterephthalat (PET), Polyetherimide, a polyamide, for example Polyamide 12, Polyamide 11, Polyamide 6, or Polyamide 66, Polymethylmethacrylate (PMMA), Polyoxymethylene, or polycarbonateurethane, a polycarbonate or a polyester carbonate, or also an acrylonitrile butadiene styrene (ABS), an Acrylester-Styrol-Acrylnitril (ASA), Styrene-acrylonitrile, polyvinyl chloride (PVC), polyethylene, polypropylene, and polystyrene, or copolymers or mixtures of these.

In embodiments in which both, the first and the second object include thermoplastic material and no welding is desired, the material pairing is chosen such that the melting temperature of the second object material is substantially higher than the melting temperature of the first object material, for example higher by at least 50°. Suitable material pairings are, for example, polycarbonate or PBT for the first object and PEEK for the second object.

In addition to the thermoplastic polymer, the thermoplastic material may also include a suitable filler, for example reinforcing fibers, such as glass and/or carbon fibers. The fibers may be short fibers. Long fibers or continuous fibers may be used especially for portions of the first and/or of the second object that are not liquefied during the process.

The fiber material (if any) may be any material known for fiber reinforcement, especially carbon, glass, Kevlar, ceramic, e.g., mullite, silicon carbide or silicon nitride, high-strength polyethylene (Dyneema), etc.

Other fillers, not having the shapes of fibers, are also possible, for example powder particles.

Mechanical vibration or oscillation suitable for the method according to the invention has preferably a frequency between 2 and 200 kHz (even more preferably ultrasonic vibration having a frequency between 10 and 100 kHz, or between 20 and 40 kHz) and a vibration energy of 0.2 to 20 W per square millimeter of active surface. The vibrating tool (sonotrode) is e.g., designed such that its contact face oscillates predominantly in the direction of the tool axis (longitudinal vibration) and with an amplitude of between 1 and 100 μm, preferably around 30 to 60 μm. Such preferred vibrations are e.g., produced by ultrasonic devices as e.g., known from ultrasonic welding.

In this text, the terms "proximal" and "distal" are used to refer to directions and locations, namely "proximal" is the side of the bond from which an operator or machine applies the mechanical vibrations, whereas distal is the opposite side. A broadening of the connector on the proximal side in this text is called "head portion", whereas a broadening at the distal side is the "foot portion".

BRIEF DESCRIPTION OF THE DRAWINGS

Hereinafter, embodiments of the invention are described referring to drawings. The drawings are all schematic and not to scale. In the drawings, the same reference numbers refer to same or analogous elements. The drawings are used to explain the invention and embodiments thereof and are not meant to restrict the scope of the invention. Terms designating the orientation like "proximal", "distal", etc. are used in the same way for all embodiments and drawings.

The drawings show:

FIGS. 17a-17e Further embodiments of the first object including a structure for promoting local compression of the second object;

FIG. 18 A sectional view of an object attached to the second object by use of the first object, a further object and an embodiment of the method;

FIGS. 19a and 19b A sectional view of a third object before and after its attachment to the second object by use of the first object;

FIGS. 25a and 25b An exemplary embodiment of a second object designed for protecting edges of the first object;

FIGS. 26a-26e Sectional views of the attachment of a third object to the second object by use of the first object at different stages of the bonding procedure;

FIGS. 27a-27d Sectional views of the attachment of another third object to the second object by use of the first object at different stages of the bonding procedure;

FIG. 28 An exemplary embodiment of a first object including a plurality of protrusions, wherein a volume of the plurality of protrusions is limited;

FIGS. 29a and 29b A sectional view of a first object being bonded to a further type of the second object before and after bonding;

FIGS. 32a and 32b Sectional views of a first object being bonded to a second object by a method including the step of providing an adhesive;

FIGS. 33a and 33b An exemplary embodiment of a first object being a connector;

DETAILED DESCRIPTION OF THE INVENTION

Figure 1:
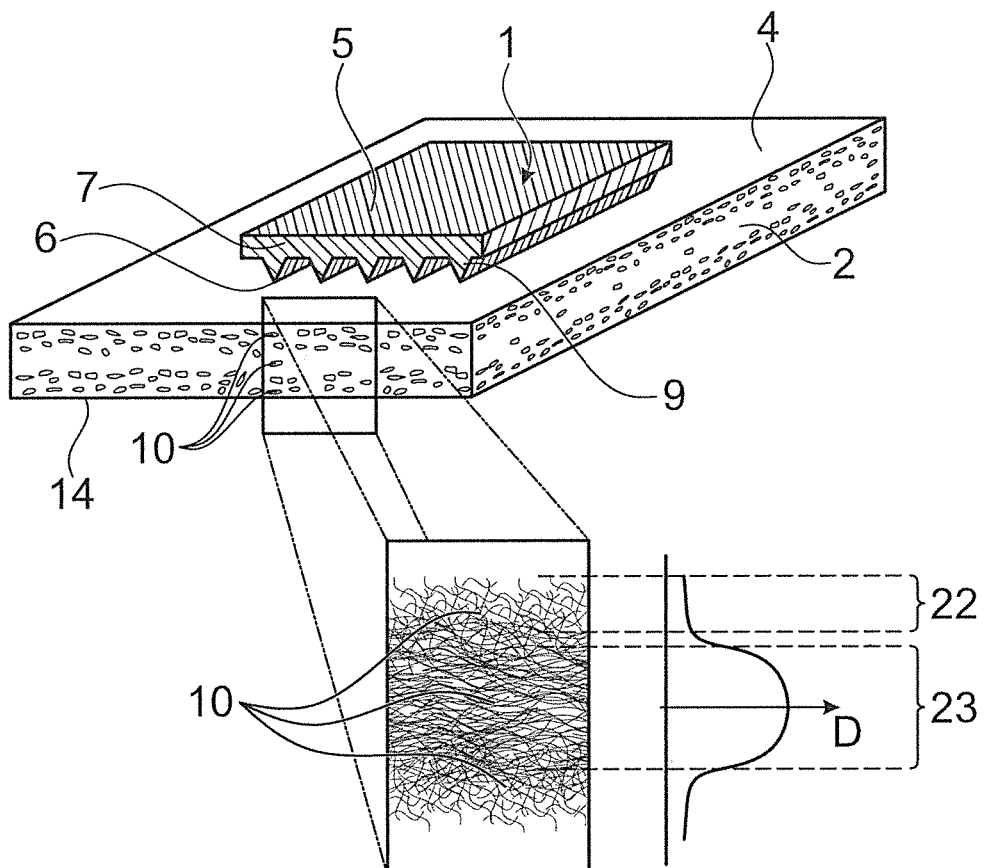
FIG. 1 An assembly of a first and second object before bonding the first object to the second object.

A method according to the invention includes providing a first object 1, providing a second object 2 and arranging the first object relative to the second object such that the first object 1 is in physical contact with a proximal surface 4 of the second object 2 and such that an assembly of the first and second object is formed. An exemplary embodiment of such an assembly is shown in FIG. 1.

In the embodiment shown, both the first object 1 and the second object 2 expand over an extended area. The first object 1 can be of the same size as the second object. However, it is also possible that the first object 1 covers the proximal surface 4 of the second object 2 partly and/or locally, only.

The second object 2 and/or the first object 1 can be non-plane. In particular in configurations in which the second object 2 expands over a larger area than the first object 1, the second object 2 can be non-plane, for example by having a shape adapted to a shape of a surface that has to be covered by the second object 2, whereas the first object 1 is plane. The plane first object 1 can then be bonded to a plane proximal surface region of the second object 2 or the first object 1 can be deformed during the bonding process such that its shape becomes adapted to the shape of the second object 2.

In the embodiment shown, the first object 1 expands between a proximal end 5 and a distal end 6 and consists of thermoplastic material.

The first object 1 includes tapered protrusions 9 in the shape of ridges at its distal end 6, in the embodiment shown in FIG. 1.

The ridges protrude from a body 7 of the first object 1 (also called first object body or device body), the body 7 forming the proximal end 5 of the first object 1.

The body 7 and/or elements 15 of a connecting device attached or attachable to the body 7 can be equipped for connecting a further object to the first object 1.

The second object 2 includes an increasing density in a direction normal to the proximal surface 4 and it includes structures 10, for example pores, into which liquefied material can penetrate.

The increasing density can be due to a change in the composition of the second object 2 along the direction and/or due to a decrease in the structures, for example.

Due to such changes, the second object 2 includes a region 22 of a density that is lower than the density of a region 23 that is arranged distally of the region 22 of low density.

The region 22 of a density that is lower than the density of a region 23 arranged distally of it is also called the proximal region 22, whereas the region 23 arranged distally of the proximal region 22 is also called the further region 23.

In the embodiment shown in FIG. 1, the second object 2 includes a plurality of fibers that are at least partly embedded in a plastic (enlarged part of FIG. 1). The portions of the fibers that are not embedded in the plastic form a soft surface layer. The soft surface layer has a density that is lower than the density of the second object 2 in regions where the fibers are embedded in the plastic.

Hence, both the composition and the density of structures 10 change in the direction normal to the proximal surface 4. The soft surface layer corresponds to the region 22 of low density and the regions with the fibers embedded in the plastic corresponds to region 23 of high density.

The density profile of second object 2 of FIG. 1 is shown next to the enlarged part of the second object 2. The second object 2 can include further density regions, for example a second region of low density forming a proximal surface of the second object 2 or a transition region that extends between a region of low and high density.

As pointed out above, the region of high density can include a plurality of structures, voids, openings, etc. Further, it can be compressible, for example compressible to a critical density and/or in a manner that the region of high density provides a critical compressive strength. The term "critical" relates to a density and/or compressive strength needed for the liquefaction of the thermoplastic material in the method.

Figure 2:
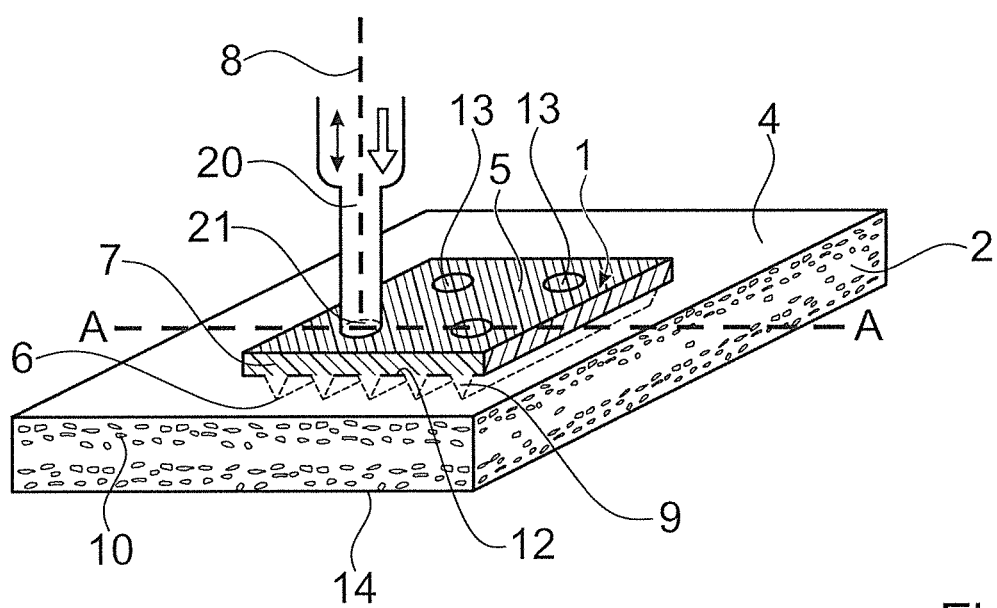
FIG. 2 The first object and the second object during the bonding process.

FIG. 2 shows the assembly of the first and second object during the step of applying a mechanical pressing force (indicated by an arrow in FIG. 2) and mechanical oscillations (indicated by a doubled-headed arrow) along an axis 8 that is essentially perpendicular to the proximal surface 4 of the second object 2.

The mechanical pressing force as well as the mechanical oscillations are applied by a sonotrode 20 including a coupling-out face 21 that is in physical contact with a proximal surface 4 of the first object 1.

In the embodiment shown, the coupling-out face 21 is designed to expose a portion of the first object 1 to mechanical oscillations and/or the mechanical pressing force, only. Hence, well-defined, local bonding locations 13 are generated during the bonding process. Four bonding locations 13 are shown in FIG. 2. However, the number of bonding locations 13 depends on the shape and size of the first object 1, the shape and material of the second object 2, and the demands on the bond (e.g., its strength), for example.

An advantage of the bonding method shown is that the number and arrangement of bonding locations 13 can be adapted easily and even during the bonding by applying the sonotrode 20 to positions on the proximal surface of the first object 1.

In the embodiment shown, the mechanical pressing force is directed along the axis 8 of the mechanical oscillations, too. However, the mechanical pressing force sets in prior to the mechanical oscillations. This has the effect of the protrusions 9 penetrate through the region 22 of low density before being liquefied, at least. By doing so, the bonding of the first and second object is not restricted to the proximal surface 4 only, but relies on structures 10 within the second object 2. In other words: Deep anchoring in contrast to surface anchoring as established by adhesives for example is generated.

The density profile of the second object 2 can be such that there is no need to start applying the mechanical pressing force prior to the mechanical oscillations. In this case, liquefaction of the thermoplastic material 3 sets in as soon as the density of the second object has reached a value that allows compression of the thermoplastic material 3 to such an extent that liquefaction sets in.

The second object is shown in a schematic way in FIG. 2, only. The second object shown in FIG. 2 can correspond to the second object shown in FIG. 2, 3 or 10-13, in particular.

Figure 3A:
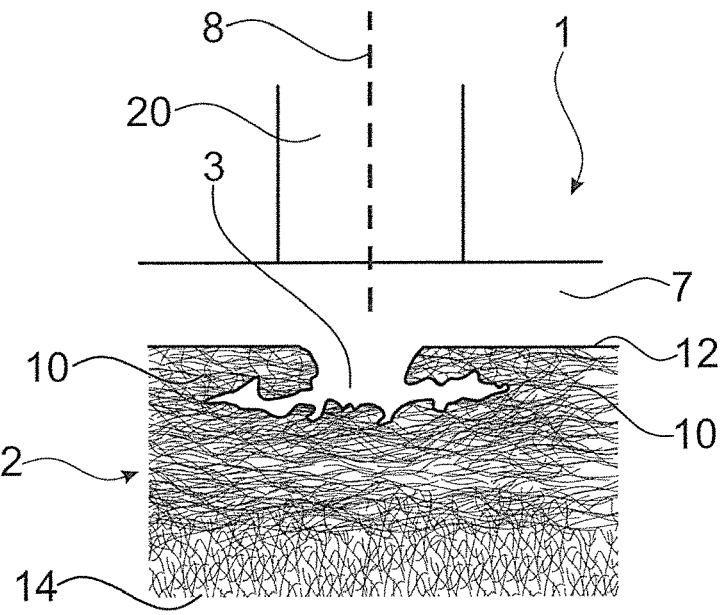
FIG. 3a A sectional view of an exemplary bonding location.

FIG. 3*a* shows a sectional view along the AA-axis shown in FIG. 2 and for a second object 2 as shown in FIG. 1.

The combined effect of mechanical pressure and mechanical oscillation has caused the portions of the thermoplastic material 3 of the protrusion 9 in contact with the region 23 of high density to liquefy and to penetrate into the structures 10 of the second object 2. This results in a positive-fit connection, in particular in a positive-fit connection with respect to the axis 8 of the oscillation (i.e. a positive-fit preventing a relative movement of the first and second objects normal to the proximal surface 4) between first and second object after resolidification of the liquefied thermoplastic material 3.

Figure 3B:
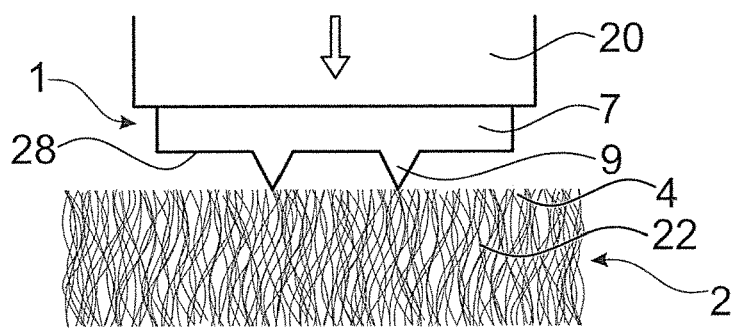
FIGS. 3b-3d A sectional view of another exemplary bonding location at three stages of the bonding process.
Figure 3C:
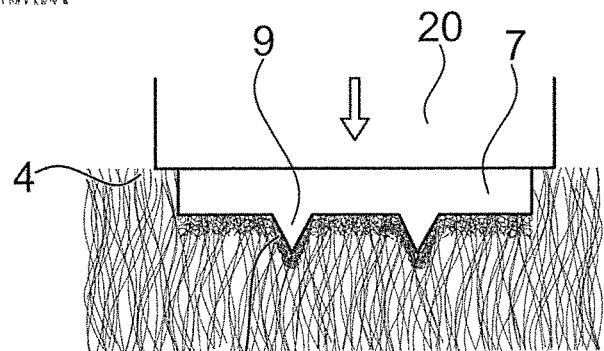
Figure 3D:
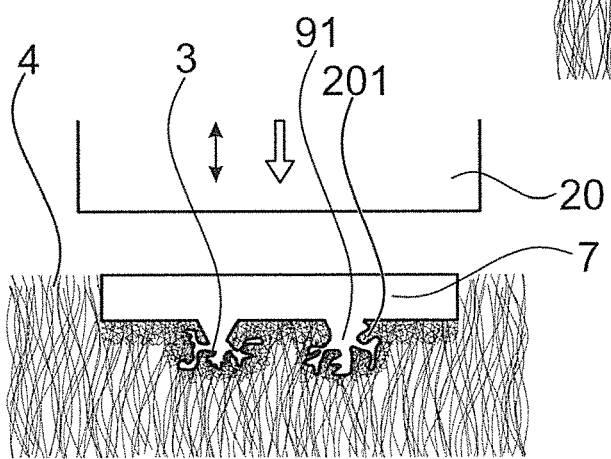

FIGS. 3*b*-3*d* show sectional views of the establishment of a bonding between the first object 1 and a second object 2 with a constant density profile in the direction perpendicular to the proximal surface 4 of the second object 2.

FIG. 3*b* shows the situation before pushing the protrusions 9 of the first object 1 into the second object 2.

FIG. 3*c* shows the situation during the step of pushing the protrusions 9 and the body 7, if the density of the second object is such that the body can be pushed into the second object without destroying the first or second object and/or their properties, in the second object 2.

The penetration of the protrusions 9 and, as the case may be, the body 7 compresses the second object 2 locally around the distal end of the protrusions 9, at least. This leads to the density profile needed to liquefy the thermoplastic material 3 of the protrusions 9 by applying the mechanical pressing force and the mechanical excitation.

FIG. 3*d* shows the situation after the step of stopping the mechanical excitation. Liquefied thermoplastic material 3 has penetrated into the structures 10 of the second object 2.

The liquefied thermoplastic material 3 can penetrate regions of the second object 2 that are not compressed or slightly compressed only. In this case, the bonding of the first to the second object goes even deeper into the second object 2 than given by a protruding portion 91 that guarantees a deep-effective anchoring.

Figure 4:
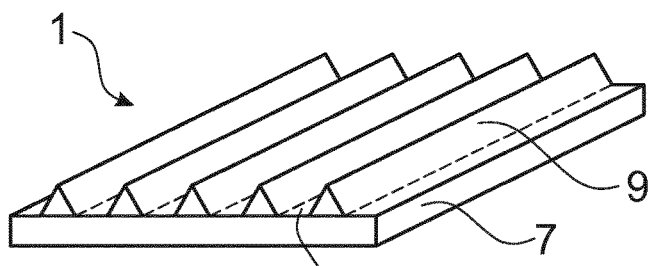
FIGS. 4 and 5 Exemplary embodiments of the first object.

FIG. 4 shows an embodiment of the first object 1 similar to the one shown in FIGS. 1 and 2 as it is provided in the method for bonding the first object 1 to the second object 2.

Figure 5:
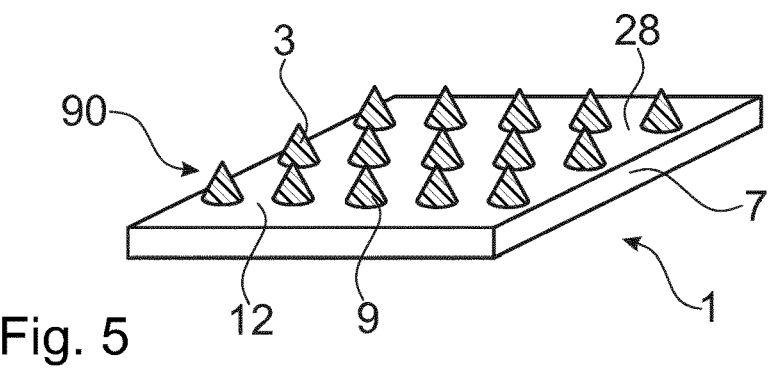

One can envisage protrusions 9 other than the ones shown in FIG. 4. FIG. 5 shows an exemplary embodiment of a first object 1, wherein the protrusions 9 are given by a plurality of tips.

The protrusions 9 protrude from a distal surface 28 of the body 7 of the first object 1. They are arranged in a protrusion region 90 that is located distally of the distal surface 28 of the body 7 of the first object 1.

The first object 1 further includes a proximal surface 29 of the body 7 of the first object 1 (hidden in FIGS. 4 and 5, see FIGS. 6, 8 and 9), the proximal surface forms the proximal end 5 of the first object 1 during and after the method.

The method shown in FIGS. 1-3 can be used for bonding an element 15 of a connecting device to the second object 2. This can be done by a first object 1 including such an element 15.

The first object 1 can include one or more elements 15 of a connecting device. For example, a plurality of elements 15 can be arranged on the proximal surface of the first object 1 according to FIG. 4 or 5.

Figure 6:
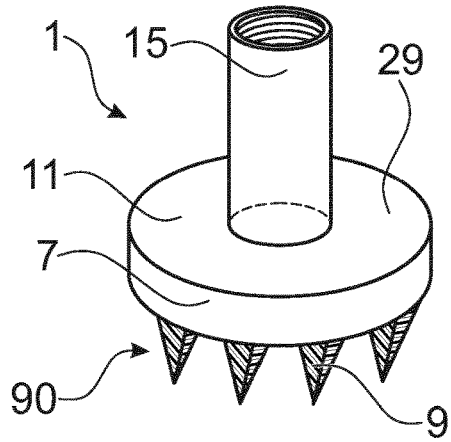
FIGS. 6 and 7 An exemplary embodiment of a first object including an element of a connection device.
Figure 7:
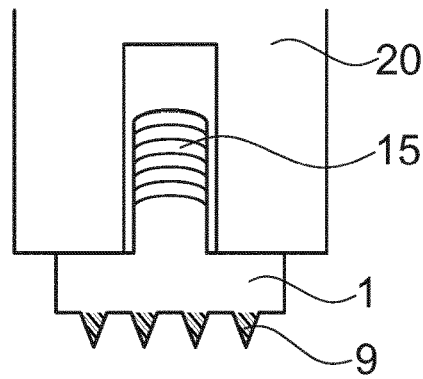

FIG. 6 shows an exemplary embodiment of the first object 1 including an element 15 of a connection device. FIG. 7 shows a sectional view of the first object 1 with applied sonotrode 20.

In the embodiment shown, the element 15 of the connection device is a rod including an inner thread.

The first object 1 includes a coupling-in face 11 that is arranged on the proximal surface of the first object 1 around the protruding element 15, in the embodiment shown.

The distal end of the sonotrode 20, i.e., the end of the sonotrode 20 including the coupling-out face 21, is adapted to the first object 1 by including an opening into which the rod can be inserted such that it is not loaded during the bonding process.

In the embodiment of FIG. 6, the protrusions 9 are ridge-like, again. However, the first object 1 can include protrusions that are differently shaped, such as tips.

The first object 1 can include one, two, three or four tips, for example. A small number of protrusions 9 can be sufficient in embodiments in which the first object 1 is small and/or defines one bonding location 13 by itself, as shown in FIG. 7.

Again, the protrusions 9 are arranged in a protrusion region 90 distally of the distal surface 28 of the body 7 of the first object 1.

The area of the coupling-out face 21 can be equal to or larger than the area of the proximal surface, in particular if the first object 1 defines one bonding location 13 by itself.

Figure 8:
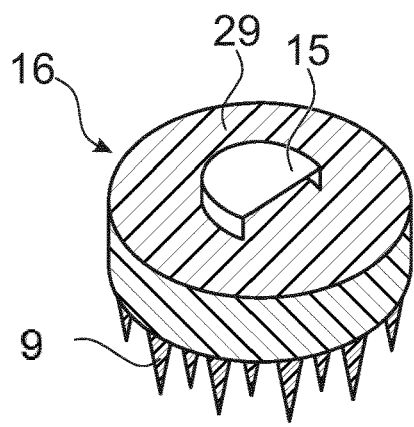
FIGS. 8 and 9 An exemplary embodiment of a first object forming the element of the connection device.
Figure 9:
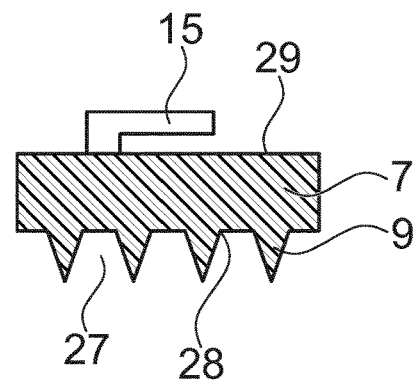

FIGS. 8 and 9 shows a schematic view and a sectional view of a first object 1 that is in fact a connector 16. In other words, the first object 1 includes an element of a latching mechanism mounted on a thermoplastic device that is capable of being bonded to the second object 2 by any embodiment of the bonding method.

FIG. 9 shows a sectional view of the first object 1. In the exemplary embodiment shown, the protrusions 9 are separated from each other by gaps 27 that extend down to the proximal surface 29 of the body 7 of the first object 1.

In the embodiment shown, the protrusions 9 are arranged and designed such that flat regions of the proximal surface 29 extend between them. The flat surfaces can act as stopping surfaces.

Figure 10:
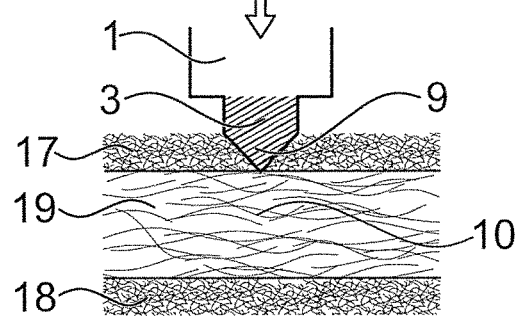
Figure 12:
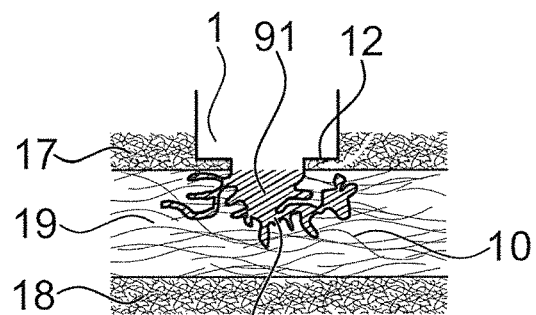
Figure 11:
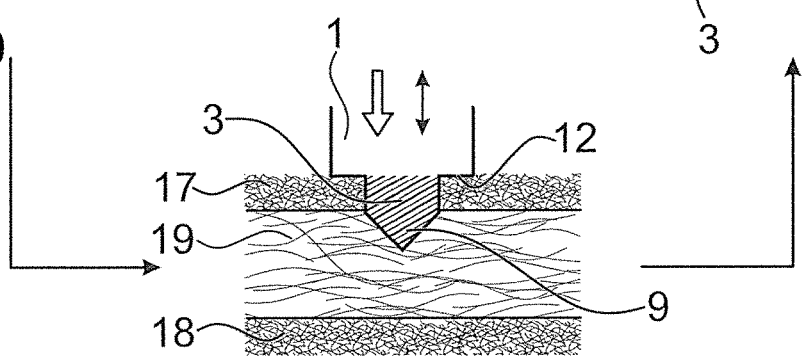

FIGS. 10-12 shows an embodiment of the method in which the first object 1, e.g., a first object 1 according to FIGS. 4-9, penetrates into the region of high density before the liquefaction of the thermoplastic material 3 sets in.

In FIGS. 10-13, the second object includes a proximal surface layer 17, a distal surface layer 18 and a core layer 19, wherein the density of the distal and proximal surface layer is lower than a density of the core layer 17. However, the method described in the following is also suitable for a second object 2 with a density profile that is generated differently, for example for the second object 2 according to FIG. 1.

For example, the proximal and distal surface layers include or essentially consist of a damping material, whereas the core layer 17 consists of the damping material embedded in another material or it is composed by materials other than the damping material. The other materials are denser than the damping material and they can show a higher mechanical stability than the damping material.

FIG. 10 shows the situation after the step of applying to the first object 1 a first mechanical pressure force (indicted by the small arrow on top of FIG. 10) that is smaller than a second mechanical pressure force applied to the first object 1 in a subsequent step of the method. No mechanical oscillations have been applied, so far.

The protrusions 9 of the first object 1 have penetrated through the proximal surface layer 17 but not into the core layer 19.

FIG. 11 shows the situation during the step of applying the second mechanical pressure force (indicted by the large arrow on top of FIG. 11). No mechanical oscillations have been applied, so far.

The protrusions 9 have penetrated into the core layer 19 and are capable to penetrate into the core layer 19, further. This means, the movement of the first object 1 relative to the second object 2 along the penetration axis is not prevented by any element of the first or second object.

In particular, an optionally present stopping surface does not yet generate a counter force to the pressure force applied such that a further penetration of the first object 1 into the second object 2 is prevented.

If the stage shown in FIG. 11 is established, the mechanical oscillations (indicated by the doubled-headed arrow) are applied.

FIG. 12 shows the situation after the bonding process. Thermoplastic material 3 has penetrated into structures 10 of the core layer 19 and forms a positive-fit connection between the first and second object, in particular a positive-fit connection normal to the penetration direction of the first object 1.

However, the protrusion 9 has not disappeared completely, for example by being "smeared out" during the method. Rather the protruding portion 91 resists at the position at which the protrusion 9 was before applying the mechanical oscillations. This leads to a deep effective anchoring, for example.

The stopping surface 12 generated a counterforce to the second mechanical pressure force in a final phase of the bonding process, wherein the counterforce was such that the movement of the first object 1 towards the distal surface layer 18 was limited. Hence, a maximum penetration depth of the first object 1 into the second object 2 is defined by the stopping surface 12 and the length of the protrusions 9 normal to the stopping surface.

In the embodiment shown, the stopping surface 12 is a surface of the first object 1 that expands normal to the penetration direction of the first object 1, i.e. normal to the axis 8 of the mechanical oscillations.

In the embodiment shown, the length of the protrusions 9 is such that a distal surface 14 of the second object 2 is neither in contact nor affected by the thermoplastic material 3. Further, the density of the core layer 19 (the region 23 of high density) at any bonding location 13 at least is such that liquefaction of the thermoplastic material is possible without need for a further material or surface being involved.

The core layer shown 19 includes a material or consists of a composite that generates the mechanical stability of the second object 2. The second object 2 can be bendable, in particular elastically bendable. Nevertheless, the material or composite of the core layer 19 is such that the thermoplastic material 3 can liquefy at an interface between the thermoplastic material 3 and the material or composite of the core layer 19 under the effect of mechanical oscillations and the mechanical pressure force. In particular, the material or composite includes the rigidity needed for the liquefaction.

In particular, the physical properties of the distal layer 18 are neither needed nor involved in the liquefaction of the thermoplastic material 3.

Figure 13:
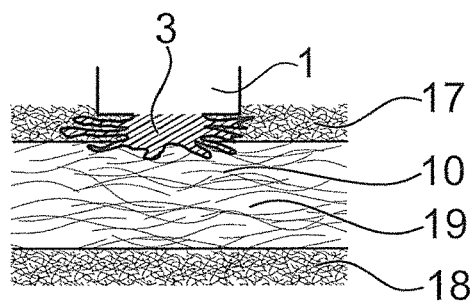
FIGS. 10-13 An exemplary embodiment of the method of bonding the first object to a second object including an increasing density along an axis of forcing the first object into the second object.

FIG. 13 shows the bonding establish by a method according to FIGS. 10-12 but without applying the second mechanical pressure or with simultaneous application of the second mechanical pressure force and the mechanical oscillations.

The penetration depths of the thermoplastic material 3 is limited to the proximal surface region 17 and adjacent regions of the core layer 19.

Figure 14:
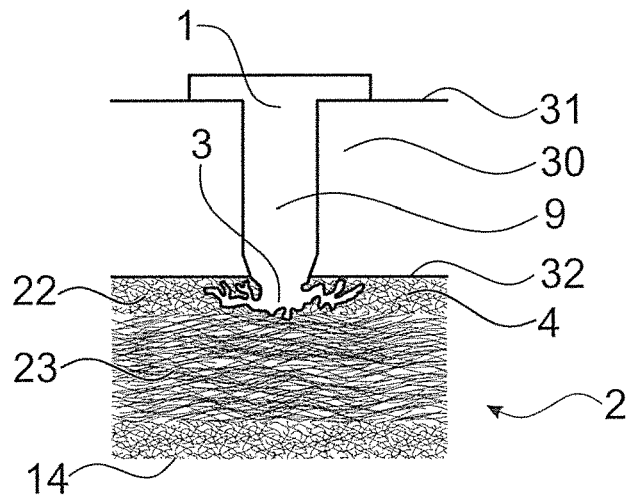
FIGS. 14 and 15 A sectional view of a third object attached to the second object by use of the first object and an embodiment of the method.
Figure 15:
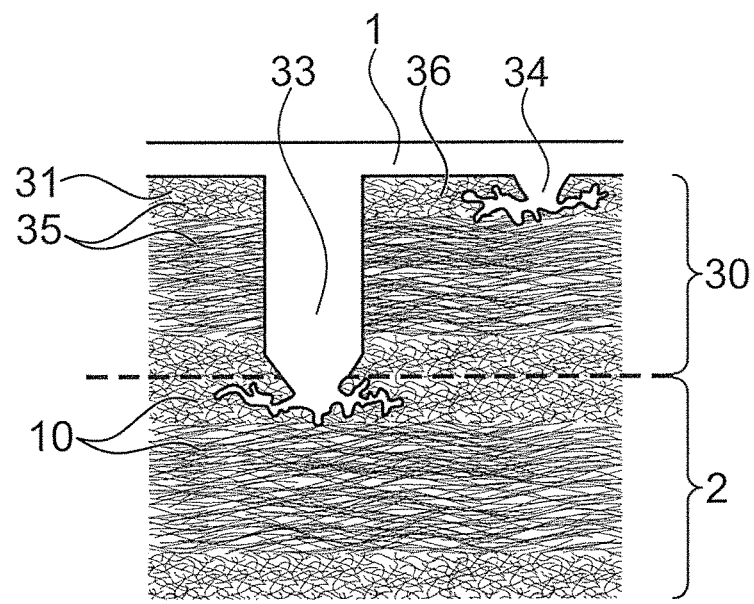

FIGS. 14 and 15 show sectional views through an assembly of a first object, second and third object, wherein the third object 30 is attached to the second object 2 by the first object 1 and wherein the first object 1 is bonded to the second object 2 by an embodiment of the method.

The third object 30 includes a third object proximal surface 31 and a third object distal surface 32. The third object 30 is arranged relative to the second object 2 such that its distal surface 32 is in physical contact to the proximal surface 4 of the second object 2.

In the embodiment shown in FIG. 14, the third object 30 can have any density profile from the third object proximal surface 31 to the third object distal surface 32 that can be penetrated by the protrusion(s) 9 of the first object 1.

In particular, the third object 30 can have any density profile described in respect of the second object 2.

Hence, it is possible that the first object 1 is bonded to the third object 30 by the use of the corresponding steps of the method and corresponding structures 35 of the third object 30.

In the embodiment shown in FIG. 15, the third object 30 includes a region 36 of low density at its proximal surface 31, too. Further, the first object 1 includes a protrusion 33 of a first kind and a protrusion 34 of a second kind.

The protrusion 33 of the first kind has a length and a diameter such that the distal end of the protrusion 33 of the first kind penetrates the region 22 of low density of the second object 2 at least partly and such that the distal end of the protrusion 33 of the first kind penetrates into structures 10 of the second object 2 during the bonding process.

The protrusion 34 of the second kind has a length and a diameter such that the distal end of the protrusion 34 of the second kind penetrates the region 36 of low density of the third object 30 at least partly and such that the distal end of the protrusion 34 of the first kind penetrates into structures 35 of the third object 30 during the bonding process.

In particular, the diameter of the protrusion 33 of the first kind is larger than the diameter of the protrusion 34 of the second kind.

FIGS. 16 and 17*a*-17*e* show exemplary embodiments of the first object 1.

Figure 16:
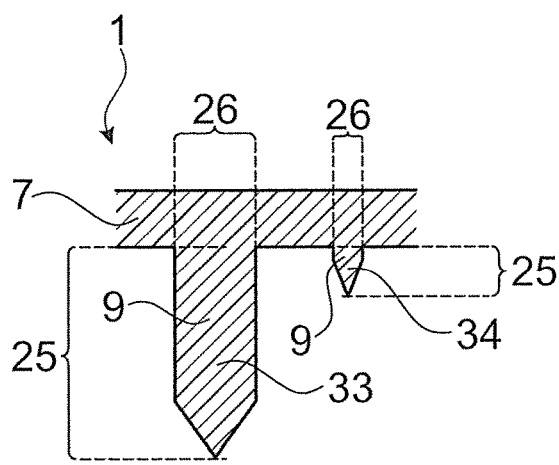
FIG. 16 A further embodiment of the first object.

The embodiment shown in FIG. 16 corresponds to the embodiment provided in a method leading to the assembly of the first, second and third object as shown in FIG. 15.

Figure 21A:
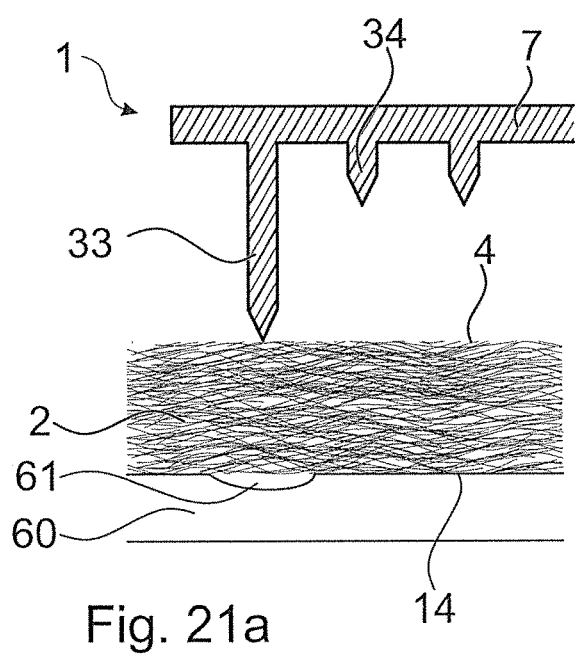
FIGS. 21a and 21b A sectional view of an exemplary embodiment of a first object including protrusions of different length before and after its attachment to a second object.
Figure 21B:
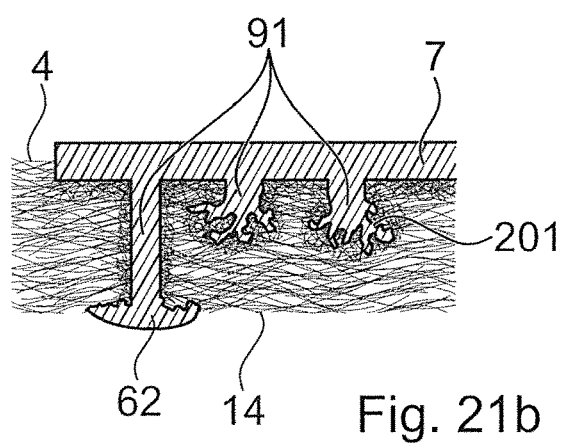
Figure 22:
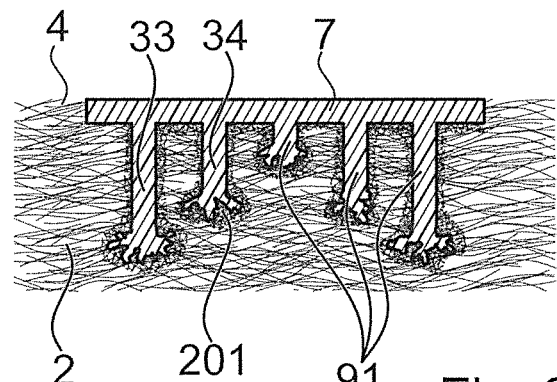
FIGS. 22 and 23 Sectional views of further exemplary embodiments of a first object including protrusions of different length after its attachment to a second object.
Figure 23:
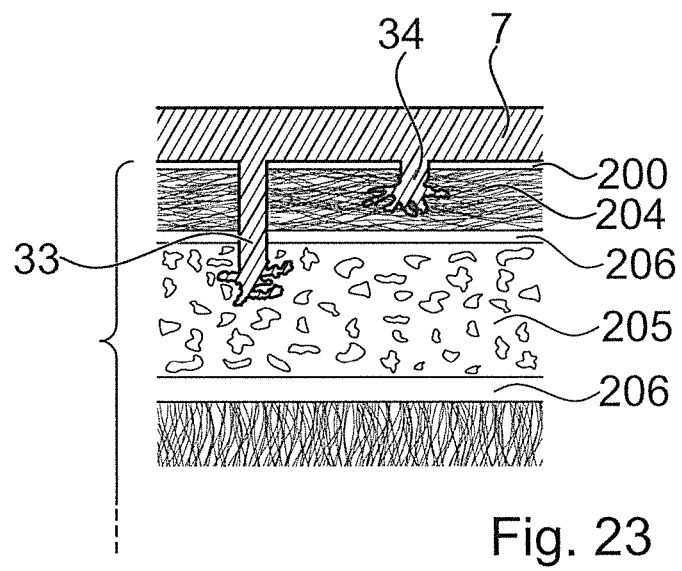

FIGS. 21-23 show other configurations in which embodiments of the first object 1 according to FIG. 16 can be used.

There is no need for cross-sectional areas of the protrusion 33 of the first kind and the protrusion 34 of the second kind that are identical and/or that are circular.

However, in many embodiments of the first object 1 shown in FIG. 16, the cross-sectional area of the protrusion 33 of the first kind is larger than the cross-sectional area of the protrusion 34 of the second kind.

FIG. 16 indicates a thickness 26 of the protrusions 9 and their extension 25 in distal direction. The extension is equal to the distance of the most distal point of the protrusion to the distal surface 28 of the body 7 of the first object 1. The embodiments of the first object 1 shown in FIGS. 17*a-e* do not only increase locally the density of the second object 2 by the protrusion displacing material of the second object 2 (for example as shown in FIGS. 3*b*-3*d*) but also by including structures 24 that are designed and arranged specifically to promote local compression of the second object 2, in particular of the region 22 of low density.

Further, the structures 24 shown are designed and arranged to pull down fibrous material of the second object 2 and/or to felt such material further and/or to embed the protrusions 9 including such structures 24 better in the material of the second object 2, for example for distributing any load over a larger area.

Figure 17A:
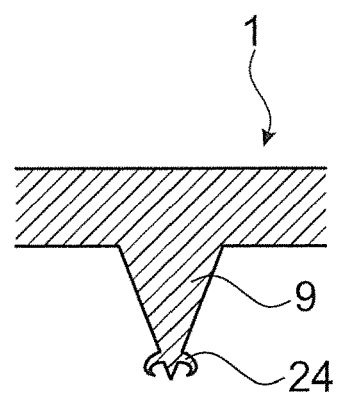
Figure 17B:
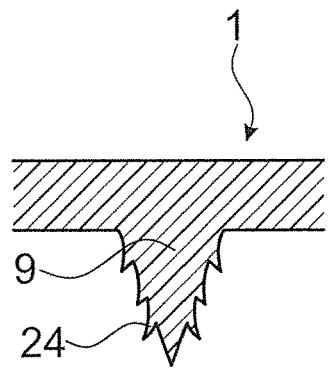

The embodiments of the first object 1 shown in FIGS. 17*a*, 17*b* and 17*e* include so-called barbs 24, i.e., structures that have a shape and are arranged at the protrusion 9 such that they are capable to increase the density of the second object 2 faced by the protrusion 9 in function of the penetration depth of the protrusion 9.

The barbs can be arranged at a distal end of the protrusion 9, as shown in FIG. 17*a*. This leads to a local compression of the second object 2 that favours the liquefaction of the thermoplastic material 3 arranged around the distal end of the protrusion.

Alternatively or in addition, the barbs 24 can be arranged at the lateral side of the protrusion 9. As examples, FIG. 17*b* show drag down barbs that are small compared to the size of the protrusion 9 and FIG. 17*e* show catching barbs that have a size such that they contribute to the overall shape of the protrusion.

There is no need for a homogenous distribution of the barbs 24 at the lateral side. Rather, the barbs 24 can be arranged such that the liquefaction of the thermoplastic material 3 sets in at certain positions on the protrusion 9 and/or that the penetration of the second object 2 by liquefied thermoplastic material is restricted along a specific direction.

Figure 17C:
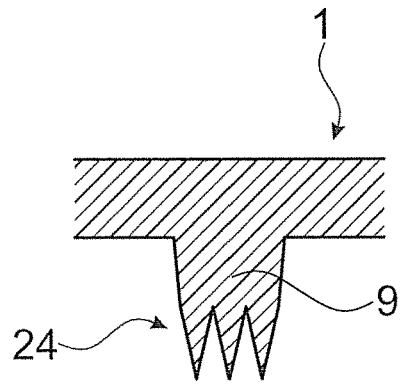

In FIGS. 17*c* and 17*d*, the structure 24 designed and arranged to promote local compression of the second object 2 is given by the shape of the distal end of the protrusion, in particular by having multiple tips that cause catching of fibers, for example.

In particular, barbs are suitable for use in fibrous second objects 2 where they can collect fibers during penetration and hence increase the density of fibers around the protrusion 9.

The barbs can be made of the thermoplastic material 3 or a harder material.

Barbs made of the thermoplastic material 3 can increase the embedding of the protrusion 9 and the protruding portion 91 respectively, further.

Barbs can also be arranged at the protrusion 33 of the first kind and/or at the protrusion 34 of the second kind.

The first object 1 shown in FIGS. 14-17 can further include at least one element 15 of a connecting device.

The first object 1 shown in FIGS. 14-17 can be a connector as described above.

FIG. 18 shows a sectional view of the result of an embodiment of the method in which an object 100 different to the first and second object is attached to the second object by connecting a further object 40 to the first object 1.

In the embodiment shown, the first object 1 is a reinforcement element.

The further object 40 is a fixing element, such as a nail, that has a distal end 41 in the shape of a tip. The further object 40 including further an attachment location 42 that is arranged to penetrate the object 100 to be attached to the second object 2 and to penetrate into the body 7 of the first object 7.

The first object 1 is bonded to the second object 2 by the method in any one of the embodiments described previously. In particular, the first object 1 is bonded to the second object 2 by a method that results in the protruding portion 91 being present in the second object after the step of stopping the mechanical excitation and letting the thermoplastic material solidify.

FIG. 19a shows a sectional view of a third object 30 before its attachment to the second object 2 by bonding the first object 1 to the second object 2. In the embodiment depicted, the third object includes thermoplastic material in the regions at which the third object 30 is pierced by the protrusions 9, at least. For example, the third object 30 shown in FIG. 19 can be a thermoplastic foil.

FIG. 19b shows a sectional view of the third object 30 attached to the second object 2. A weld 203 is formed between the first object 1 and the third object 30 during the method of bonding the first object 1 to the second object 2. This is a result of the third object 3 including thermoplastic material in the regions at which it is pierced by the protrusion.

The thermoplastic material of the third object 30 as well as the thermoplastic material 3 of the first object 1 arranged at the proximal end of the protrusions 9 and/or the neighbouring thermoplastic material of the distal surface 28 of the body 7 are such that they liquefy under the mechanical pressing force and mechanical excitation applied. However, one can envisage that the condition for liquefaction of the thermoplastic material(s) is only met after compression of the second object 2 by pushing the body 7 into the second object 2.

FIG. 19b shows a mechanism that is able to increase the quality of the bond between the first and second object further. Although shown in combination with establishing a weld 203 between the first and the third object, the mechanism can be used in any embodiment of the method—independent of the presence of a third object 30.

An embodiment including the mechanism has a second object 2 that includes thermoplastic material in the region(s) at which a bond between the first and the second object is established. The thermoplastic material is capable to liquefy or at least soften under the impact of the mechanical pressure and mechanical excitation applied during the method of bonding the first object 1 to the second object 2. In a variant of the embodiment, the thermoplastic material can only be liquefied/soften after its compression by pushing the protrusions 9 and/or the body 7 into the second object 2.

Due to the liquefaction or soften, the second object 2 includes a region 202 with changed structural properties after the step of letting the (in this case "all") thermoplastic material resolidify. A higher density and/or material of the second object 2 that is better interlinked are examples of the changed structural properties.

Figure 20A:
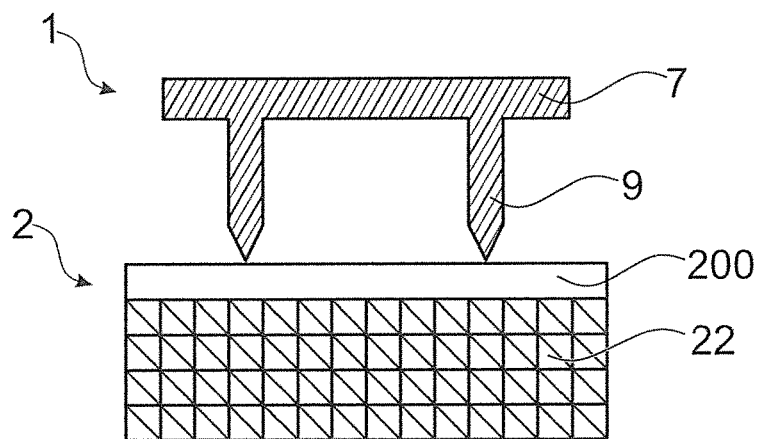
FIGS. 20a and 20b A sectional view of a first object before and after its attachment to a second object including a rigid proximal top layer.
Figure 20B:
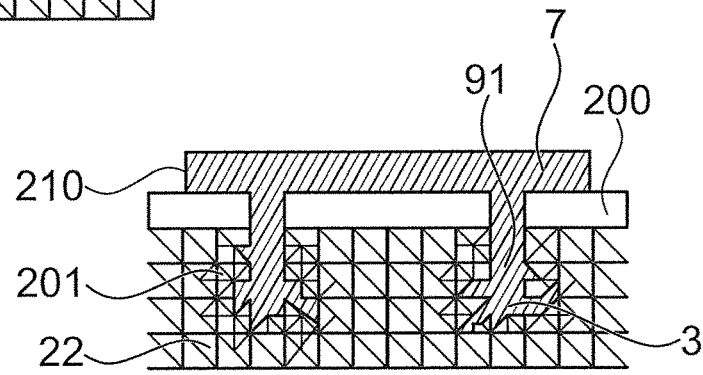

FIGS. 20a and 20b show the bonding of a first object 1 to a second object 2 including a proximal top layer 200 that is not part of the region 22 of low density.

For example, the proximal top layer 200 is the rigid cover layer of a hollow core board (HCB).

FIG. 20a shows the situation after positioning the first object 1 relative to the second object 2. The protrusions 9 of the first object 2 are designed to penetrate the proximal top layer 200 without deforming significantly. Further, they can include a distal tip or edge.

FIG. 20b depicts the situation after bonding the first object 1 to the second object 2. Shown is the case in which the unaffected layer arranged distally of the proximal top layer 200 is not dense enough to lead to a liquefaction of the thermoplastic material 3 within a time frame that is practical in professional use. Again, it is the establishment of a compressed region 201 that makes the bonding of the first object 1 to the second object 2 possible.

FIGS. 21-23 show embodiments of the method including protrusions that are adapted in length, for example adapted to a thickness of the second object 2, to a layered structure of the second object 2, to the mechanical properties of the body 7, to the shape of the body, and/or fabrication steps following the bonding of the first object 1 to the second object 2.

FIGS. 21a and 21b show an embodiment in which the first object 1 includes a protrusion 33 of a first kind and a protrusion 34 of a second kind, wherein the protrusion 33 of the first kind is longer than the protrusion 34 of the second kind.

The protrusion(s) 33 of the fist kind has a length that is longer than the thickness of the second object 2 in direction of penetration of the protrusion 33 of the first kind into and through the second object 2.

In this case, the method includes the further step of providing an anvil 60 including a deformation recess 61. The deformation recess 61 is positioned such that the distal end of the protrusion 9 engages with the deformation recess 61 after penetrating the second object 2. The distal end of the protrusion 9 can then be deformed in a distal head 62 by applying mechanical pressure and mechanical excitation to the first object 1 or to the anvil 60.

The protrusion(s) 34 of the second kind has a length that allows for bonding the first object 1 to the second object 2 within the second object 2 and according to any embodiment of the method, e.g., by the method including establishing a compressed region 201.

An arrangement of the protrusions in which the protrusions 33 of the first kind are arranged close to ending, this means lateral, edge 210 of the body 7 and the protrusions 34 of the second kind are arranged radially inside the protrusions 33 of the first kind can be advantageous in configurations in which for example:

The body 7 of the first object 1 is not stiff enough to remain in position over a larger area and/or over time;

The second object 2 is deformed after bonding the second object 2 to it in preliminary but enduring manner.

FIG. 22 shows a further arrangement of protrusions 9 of different length after bonding the first object 1 to the second object 2. In the embodiment shown, the length of the remaining protruding portions 91 correlate with the length of protrusions.

The embodiment shown in FIG. 22 is an example of a first object 1 including protrusions that are optimized in terms of material costs and forces acting on the bond between the first and second object in a specific application. The embodiment shown is particularly suitable for applications in which the bonded first and second item are bent, this means applications that cause bending forces.

FIG. 23 shows an embodiment in which the second object 2 includes a layered structure. Again, the first object 1 includes a protrusion 33 of a first kind and a protrusion 34 of a second kind. The length of the protrusions is adapted such that the bond is formed either in a first region 204 of low density or in a second region 205 of low density that is arranged more distally than the first 204 region of low density.

FIG. 23 shows a simple arrangement of the layers forming the second object 2. However, the length and arrangement of protrusions 33 of the first kind, protrusions 34 of the second kind and—as the case may be—of protrusions of further kinds can be adapted to more complex arrangement of layers. In particular, the layers do not need to run parallel to each other, to be constant in thickness and/or to expand over the whole expansion of the second object 2. For example, layers, such as layers of low density, can be arranged locally, this means only at positions at which the bonding of the first object 1 to the second object 2 has to occur.

Further, there is no need that the second object 2 includes a rigid proximal top layer 200 or rigid layers 206 between regions of low density.

In principle, there is no need for any rigid layer 206 or any region of a density that gives the second object 2 load bearing capacity. In this case, the method can include the step of providing a support 63 during the method of bonding the first object 1 to the second object 2, at least. This configuration is shown in FIG. 24.

Figure 24:
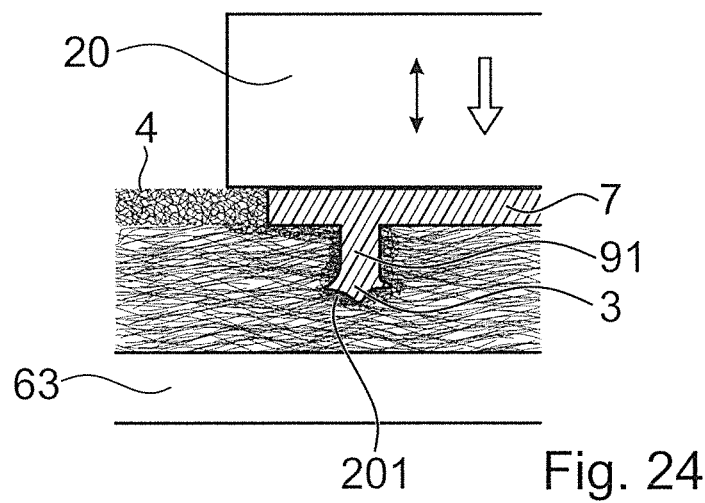
FIG. 24 An exemplary embodiment of the method including a support for the second object.

FIG. 24 shows the situation immediately after the liquefaction of the thermoplastic material 3 has set in. If the second object 2 includes no region of high density at all, a compressed region 201 needs to be established before liquefaction of the thermoplastic material 3 sets in.

The anvil 60 is an example of such a support 63. However, the support 63 can also be given by an item to which the second object 2 is attached.

FIG. 25*a* shows an application of a method in which the mechanical pressing force and the mechanical excitation are applied locally to the first object 1 and in which the step of applying the mechanical pressing force and the mechanical excitation is repeated several times at different positions on the first and second object 1. Hence, there are several bonding locations 13 that are not arranged on a single plane and that cannot be addressed in a single step of applying the mechanical pressing force and the mechanical excitation.

In the application shown, the first object 1 is a protection for an edge or corner of the second object 2.

FIG. 25*b* shows a sectional view of the first object 1 according to FIG. 25*a* attached to the second object 2. A first bonding location 13 is arranged at a first side of the second object 2 and a second bonding location 13 is arranged at a second side of the second object 2, which is non parallel to the first side.

In the embodiment shown, the first object 1 is pushed into the second object 2 in a manner that the distal surfaces 28 of the body 7 are at the same level as the corresponding surfaces of the second object 2. This arrangement of first and second object is not specific for the application shown in FIGS. 25*a* and 25*b* but can be realized in any embodiment of the method including a second object 2 with a proximal surface 4 that allows for pushing in the first object body 7.

In many embodiments, the corresponding surfaces of the second object 2 are the proximal surfaces 4.

An effect of pushing the body 7 into the second object 2 such that the distal surface(s) 28 of the body 7 is/are at the same level as the corresponding surface(s) of the second object 2 is a global compression of the second object 2 in the region in which the body 7 is pushed into the second object 2, at least. The resulting compressed region 201, in particular in combination with the local compression caused by the protrusions 9, can be a requirement for efficient liquefaction of the thermoplastic material 3, as described above in detail.

FIGS. 26 and 27 show embodiments of a method including the further steps of providing a third object 30 and attaching the third object 30 to the second object 2 by bonding the first object 1 to the second object 2 according to any embodiment of the method of bonding the first object 1 to the second object 2.

In the embodiment shown in FIGS. 26 and 27, the third object 30 includes a through bore 230 defining an opening 231 in a distal side of the third object 30.

The embodiments of the third object 30 shown in FIGS. 26 and 27 include the optional feature of a region 232 around the through bore 230 that is bent in distal direction. Consequently, the distal opening 231 in total or at least a part of it is displaced in distal direction with respect to portions of the third object 30 that are not arranged in close proximity of the through bore 230.

The method shown in FIGS. 26 and 27 includes the step of bringing the distal surface 32 of the third object 30 in contact with the proximal surface 4 of the second object 2 and pushing the bent region 232 into the second object 2. By doing so, the bent region 232 establishes the compressed region 201 in a region of the second object 2 that is located in proximity of the bent region. Optionally, the third object 30 can be pressed further towards the second object 2 such that a global compressed region 201 as indicated in FIG. 26*b* results.

In particular, the bent region has a mechanical stability such that it can take the load generated during the step of pushing the bent region 232 into the second object 2.

In embodiments of the method, in which a bent region 232 is pushed into the second object 2, the method can include the further step of providing a pushing- and holding down device. In other words: the third object 30 and/or the bent region 232 is not pushed into the second object 2 by a pressing force applied to the first object, but by a pressing force applied to the third object 30 by the use of the pushing- and holding down device.

The compressed region 201 located in proximity of the bent region 232 is further compressed in the subsequent step of pushing the protrusion 9 through the distal opening 231 into the second object 2. This kind of establishing a compressed region 201 or increase the density of a compressed region 201 has been described in detail, already. However, it is important to note, that the establishment or increase is not or not only the result of liquefied material penetrating into the second object 2 but of a solid portion of the protrusion 9 penetrating into the second object 2 before its liquefaction. The portion of the protrusion 9 is transformed into the protruding portion 91 during the step of liquefying the thermoplastic material 3.

Hence, it is the compression resulting from pushing the protrusion 9 into the second object in combination with the compression resulting from pushing the bent region 232 into the second object 2 that establishes the density profile needed to liquefy the thermoplastic material 3 of the protrusion 9 during the step of applying the mechanical pressing force and the mechanical excitation and to bond first object 1 to the second object 2.

However, one can envisage to provide a third object 30 without bent region 232 and to design the protrusion in a manner that the compressed region 201 established by pushing the protrusion 9 into the second object 2 is sufficient to establish the density profile needed to cause liquefaction of the thermoplastic material 3 during the step of applying the mechanical pressing force and the mechanical excitation.

In FIGS. 26*a* to 26*d*, the third object 30 is a metal sheet, for example an aluminum sheet, including the optional feature of the region 232 around the through bore 230 that is bent in distal direction. Further, the bent region 232 is designed such that it can be deformed elastically. In particular, the rim 233 forming the distal opening 231 includes notches 234 extending in proximal direction, this means towards the portions of the third object 30 that are not part of the bent region 232. An embodiment of such a resulting bent region 232 in shown in FIG. 26*e*.

In embodiments including an elastically deformable bent region 232, a diameter of the protrusion 9 can be larger than a diameter of the bent region 232. Hence, an elastic deformation in the sense of a widening of the bent region 232 and the rim 233 is established. This is indicated by two black arrows in FIG. 26*b*.

Figure 26C:
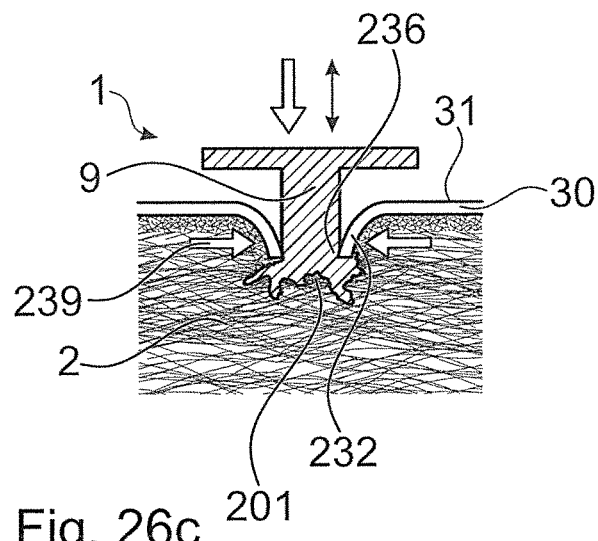

The following two effects are caused after pushing at least a portion of the protrusion 9 through the through bore 230 (FIG. 26*c*): First, the protrusion 9 penetrating the second object 2 effects a further local compression of the compressed region 201 resulting from pushing the bent region 232 into the second object 2. The protrusion 9 penetrating the second object 2 can cause an extension of the compressed region 201, in particular an extension in distal direction. Second, the elastically deformed bent region 232 causes a compressing force 239 on a portion of the protrusion 9. This compressing force is indicated in FIG. 26*b* by two black arrows.

The compressing force 239 leads to a melting zone 236 on the protrusion 9 during the step of applying the mechanical pressing force and the mechanical excitation at the area where the compressing force 239 applies. In other words: thermoplastic material 3 of the protrusion 9 liquefies due to the compressing force 239 and the mechanical pressing force and the mechanical excitation applied during the corresponding step. This causes an embedding of the bent region 232 in the protrusion 9 (more exactly in the protruding portion 91) in addition to the positive-fit connection established by the thermoplastic material that has penetrated the material of the second object 2.

This means, that the method according to FIGS. 26*a*-26*e* includes the further step of embedding the bent region 232 at least partly in the protruding portion 91.

Figure 26D:
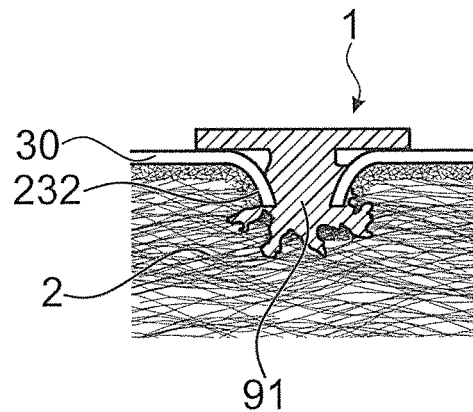
Figure 26E:
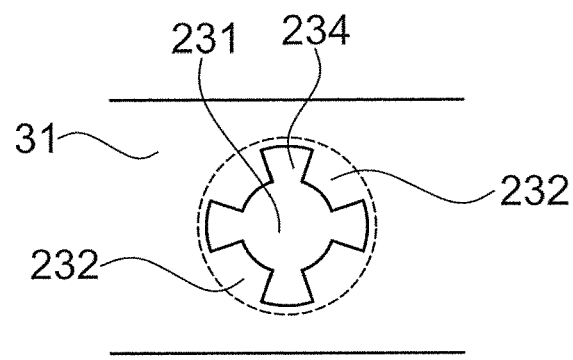

FIG. 26*d* shows a sectional view of an exemplary embodiment of an attachment based on an embodiment of the method including the further step of embedding the bent region 232 at least partly in the protruding portion 91.

Figure 27A:
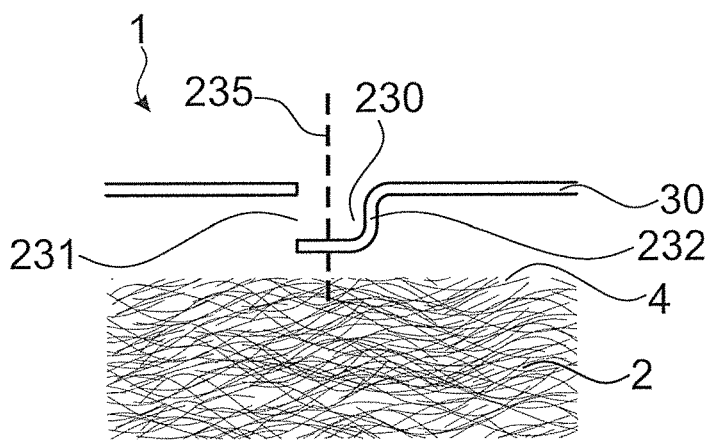
Figure 27B:
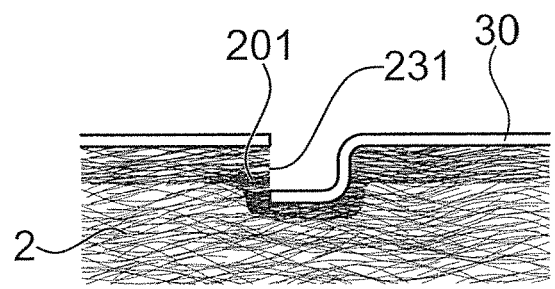

FIGS. 27*a* to 27*c* shows another embodiment of the method including the step of providing a third object with a bent region 232.

In the embodiment shown, the bent region 232 is designed in a manner that the distal opening 231 is a radial opening with respect to an insertion axis 235 along which the first object 1 is moved relative to the second object 2 during the method of bonding the first object 1 to the second object 2.

Again, the compressed region 201 is established by pushing the bent region 232 into the second object 2.

In contrast to the embodiment of FIG. 26, the bent region 232 is not designed to generate a compressing force 239 to the protrusion 9. However, the bent region 232 and the protrusion 9 are designed such that the protrusion 9 deforms towards the distal opening 231 in a step of pressing the protrusion 9 onto a portion of the bent region 232.

In the embodiment shown in FIG. 27, the bent region 232 includes a portion arranged perpendicular to the insertion axis 235. This portion, in particular in combination with a protrusion that deforms when pressed against the portion, can direct the protrusion 9 towards the distal opening 231 in the step of pressing the protrusion 9 onto the portion of the bent region 232.

For example, the protrusion can include a deformation cavity 93 or regions of limited mechanical stability that favor a deformation of the protrusion 9 in a predefined direction.

Alternatively or in addition, the protrusion 9 can include a deformation surface 94 that is designed in a manner that a contact surface between the protrusion 9 and the portion of the bent region 232 is established that favors the deformation of the protrusion 9 in a predefined direction.

FIG. 27*d* shows an exemplary embodiment of such a protrusion 9. However, there is no need that the protrusion 9 includes a portion that is bent towards the distal opening 231 and/or a deformation cavity as long as the portion of the bent region 232 against which the protrusion is pressed has a mechanical stability such that it is able to absorb the mechanical load applied during the method.

For example, the protrusion 9 can straight or tapered and/or rotationally symmetric with respect to the protrusion axis 92.

One can envisage that the portion of the bent region 235 that directs the protrusion 9 towards the opening 231 is not perpendicular (i.e. at 90 degrees) to the insertion axis 235, but at an angle smaller than 90 degrees, for example between 30 and 80 degrees or between 50 and 80 degrees.

A deformation of the protrusion 9 towards the distal opening 231 can include a softening or partial softening of the protrusion 9.

In a variant of the embodiments shown in FIGS. 26 and 27, the third object 30 provided does not include the through bore 230 and the bent region 232 if present. Rather, the through bore 230 and the bent region 232, if present, are produced in a further step of the method. This further step is performed after the step of bringing the distal surface 32 of the third object 30 in contact with the proximal surface 4 of the second object 2, in particular.

FIG. 28 shows an exemplary embodiment of a first object 1 including a plurality of protrusions 9, wherein the summarized volume of all protrusions 9 fulfills a condition for the volume.

In many embodiments including a plurality of protrusions 9, the protrusions are arranged in a subarea of the area formed by the distal surface 14 of the second object. The subarea defines a base 211 of the protrusion region 90. In FIG. 28, the base 211 is the area within the dashed line that on the distal surface 14.

The total volume of the protrusion region 90 can be calculated from the base 211 and a value or function corresponding to or approximating the extension 25 of the protrusions 9 in distal direction.

In many embodiments (but not all, FIGS. 15, 16, 21-23 for example), the protrusions 9 have an equal extension 25 in distal direction. In other words: they have an equal length. In this case, the value corresponding to the extension 25 of the protrusions 9 is their length.

The protrusions 9 within the protrusion region 90 are separated by gaps 27, this means void space. This space fills the volume of the protrusion region 90 not covered by the protrusions 9.

The volume condition fulfilled by the exemplary embodiment shown in FIG. 28, but also by many other embodiments of the first object 1, is the following: The volume of the protrusions 9 is half of the volume of the void space or less. In other words: The volume of the protrusions 9 corresponds to ⅓ or less of the total volume of the protrusion region 90, for example ¼, ⅕ or less than ⅕, such as ¹⁄₁₀.

FIG. 29 shows an embodiment of the method in which the (or a) region 23 of high density forms the proximal region of the second object 2 and the region 22 of low density is arranged distally of the region 23 of high density.

Further, the optional feature of a support 63 that can be present during bonding the first object 1 to the second object 2 only, or an item to which the second object 2 is or will be attached, or an integral part of the second object 2.

FIG. 29*a* shows the situation before bonding the first object 1 to the second object 2. FIG. 29*b* shows the situation after bonding the first object 1 to the second object 2.

FIGS. 29a and 29b depict an embodiment of the second object 2 in which the region 23 of high density is compressible, too. This is indicated by the doubled headed arrow that visualized the local compression of the region 23 of high density caused by the impact of the first object 1 that has been pushed through the region 23 of high density and that has been anchored in the region 22 of low density.

The region 23 of high density is such that it is deformable, in particular compressible. This allows for pushing in the first object 1 in a manner that it does not protrude from the proximal surface 4 of the second object after bonding. Further, it results in a compression of the region 22 of low density that is in addition to the compression effected by the protrusion 9 penetrating the region 22 of low density. Again, it is this compressed region 201 that leads to an efficient liquefaction of the thermoplastic material 3.

In the embodiment shown, there is no need that the protrusion 9 gets in contact with the support 63 thanks to the compression of the region 22 of low density.

In the embodiment of FIG. 29, the body 7 of the first object 1 is reduced to a head.

FIG. 30 shows a sectional view of a first object 1 bonded to yet another type of the second object 2. According to this embodiment, the second object 2 provided is characterized by a proximal top layer 200 arranged on a region 22 of low density, wherein the region 22 of low density is arranged on a region 23 of high density that is capable to give mechanical stability to the second object 2.

Such configurations including a proximal top layer arranged on a region 22 of low density arranged on a region 23 of high density can be found in items that must be rigid and comfortable to touch. Sometimes, such items are also called "softtouch" or items having a "softtouch surface".

In embodiments, the proximal top layer is leather, artificial leather or a foil, and the region 22 of low density includes or consists of foam or another porous and resiliently deformable material. The region 23 of high density can then be any kind of a support.

An example of a "softtouch item" having the structure described is a dashboard, for example a car dashboard.

As an example, FIG. 30 shows a first object 1 being a display element that is bonded to a second object 2 being a dashboard having the structure described previously.

Figure 30A:
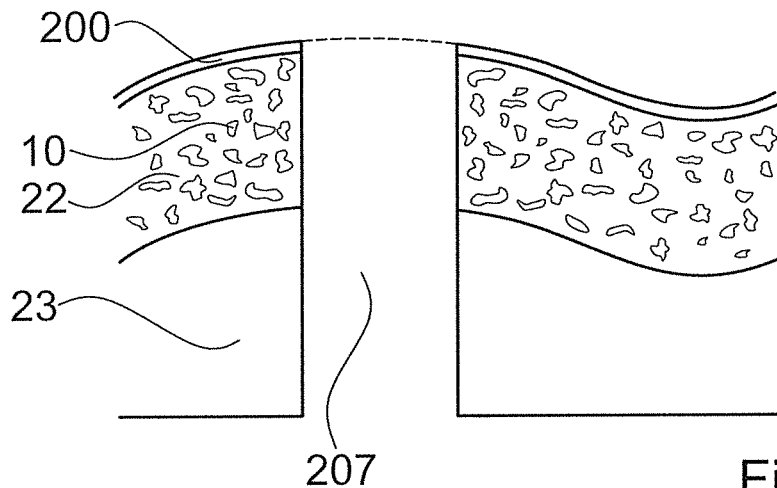
FIGS. 30a and 30b A sectional view of yet another type of a second object and a first object being bonded to this type of second object before and after bonding.

FIG. 30a shows the second object 2 (the dashboard) as provided, this means including the proximal top layer 200 and the region 22 of low density which is arranged on the region 23 of high density. The second object 2 provided includes further a feedthrough 207 designed to accommodate the first object 1 (the display element) and wires 209 that may be present.

Figure 30B:
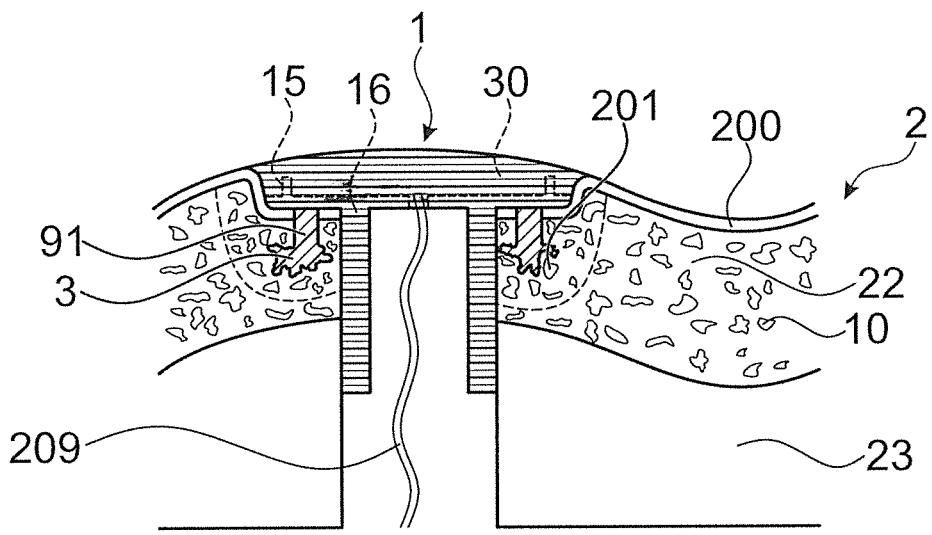

FIG. 30b shows the situation after insertion of the first object (the display element) into the second object 2 (the dashboard). The bonding method and the mechanism including a compressed region 201, a protruding portion 91 and liquefied thermoplastic material 3 that has penetrated into structures 10 of the region 22 of low density (e.g., the foam) is the same as described previously.

Instead of mounting the first object 1 (the display element, for example) as a whole, one can also envisage to bond a connector 16 to the second object 2 first and the actual element to be attached to the second object 2 in a subsequent step. This embodiment is indicated in FIG. 30b by dashed lines.

In this embodiment and using the example of the display element to be mounted to the dashboard again, the first object 1 is the connector 16 and the display element is a third object 30 to be mounted to second object 2, this means to the dashboard, by the use of the first object 1.

For example, the connector 16 includes an element 15 for attaching the display element (the third object 30) to the connector 16, for example by a clamping mechanism.

The protrusions 9 can be designed to penetrate the proximal top layer 200 without need for a preceding perforation of the proximal top layer 200. In particular, the protrusions 9 can be designed to penetrate the proximal top layer 200 without becoming flowable.

It goes without saying that the first object 1 attached to the second object 2 characterized by the proximal top layer 200 arranged on the region 22 of low density can be any embodiment of the first object 1 disclosed, for example a connector. In this case, the second object 2 does not include any features that are specific for mounting the display element. For example, it does not include the feedthrough 207.

Figure 31:
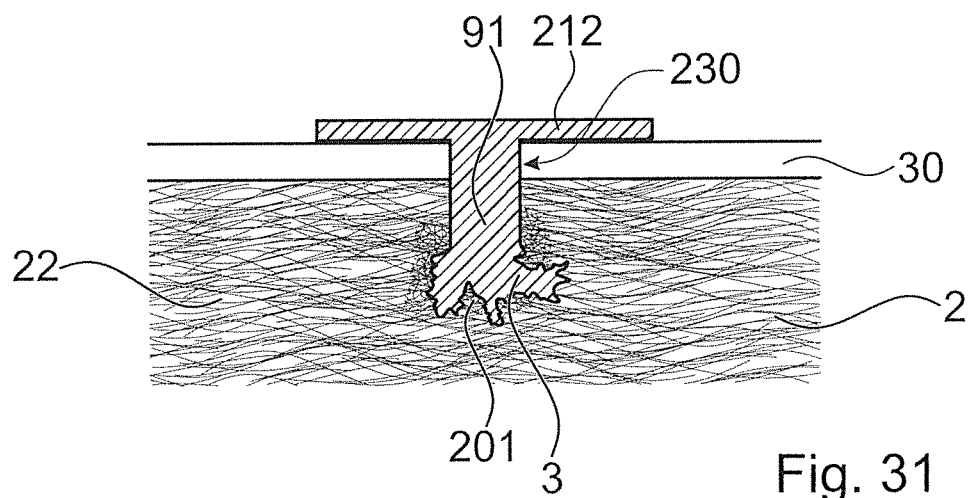
FIG. 31 A sectional view of a further third object being bonded to the second object by the use of a first object.

FIG. 31 shows a sectional view of a third object 30 being attached to the second object 2 including a region 22 of low density by a first object 1, wherein the first object 1 includes a head 212 and a protrusion 9 that is arranged distally of the head 212.

The third object 30 can include a pre-drilled opening or the third object 30 and the protrusion 9 can be designed such that the protrusion can penetrated the third object 30 in a step of pressing the first object 1 towards the third object 30.

The head 212 is designed in a manner that a portion of the third object 30 is clamped between the head 212 and the second object, in particular the proximal surface 4 of the second object 2.

Again, bonding of the first object 1 to the second object 2 is established by the generation of a compressed region 201 during the step of pushing the protrusion 9 into the second object 2.

FIGS. 32a and 32b shows an embodiment of the method including the further step of providing an adhesive 240 prior to the step of pushing the protrusion(s) 9 into the second object 2.

FIG. 32a shows the situation after providing the adhesive 240 on the proximal surface 4 of the second object 2.

In this embodiment, the first object 1 can include, as an optional feature, a retention protrusion 213 arranged in the region of the lateral end of the body 7. The retention protrusion 213 protrudes from the distal surface 28 of the body 7 into the distal direction.

The retention protrusion 213 is designed to prevent the adhesive 240 to be pressed laterally beyond the lateral extension of the first object 1, in particular the first object body 7. In other words: the retention protrusion 213 is designed to prevent a reduction of the amount of adhesive contributing to the bonding of the first object 1 to the second object 2 during the bonding process.

In particular, the retention protrusion 213 prevents a contamination with adhesive 240 of areas of the proximal surface 4 of the second object 2 that are external areas after the bonding process.

The retention protrusion 213 as well as the protrusions 9 can define retention openings 214 in which adhesive can accumulate.

FIG. 32b shows the situation after bonding the first object 1 to the second object 2 by the method including the further step of providing an adhesive 240.

The adhesive 240 is pressed into the second object 2 during the step of pressing the first object 1 into the second object 2. Hence, a zone 241 penetrated by adhesive 240 is generated around the protrusions 9, at least. In this zone 241, the material forming the region of low density 22 is augmented by the adhesive. For example, the region of low density 22 includes fibers that are stuck together due to the presence of the adhesive.

Hence, the further step of providing the adhesive 240 is a further approach to improve the quality, in particular the mechanical stability and reliability, of the first object 1 being bonded to the second object 2 by the method.

FIGS. 33*a* and 33*b* show another exemplary embodiment of a first object 1 being a connector 16.

The connector 16 shown includes the protrusion region 90 with a plurality of protrusions 9 and a connecting structure defining a connecting location defined with respect to all dimensions (x, y, z). The connecting structure in the depicted embodiment is constituted by a connector peg 250 that is one-piece with the protrusions 9 and the body 7.

The connecting structure—the connector peg 250 in the shown embodiment—is especially such that it is arranged laterally. This means that the arrangement of the connecting structure 250 is not symmetrical with respect to the insertion axis 235 but is off-center with respect to the axis 235. The insertion axis 235 is the axis along which generally the pressing force is applied during insertion and along which the movement during insertion will take place at least predominantly. The insertion axis 235 is generally a characteristic axis of the first object, such as a rotation axis, a central axis and/or it coincides with the protrusion axis. The latter can be the case when the first object 1 includes a single protrusion 9 or a central protrusion 9. Thus, the axis is especially defined by the protrusion and/or the overall shape of the first object 1.

Thereby, the position of the connecting location depends on the angle of rotation around the axis 235. Hence, when the connector is positioned relative to the second object 2 and anchored therein, not only the position but also its orientation may have to be defined.

An example of an according connecting structure may, for example, be a structure (like the peg) that protrudes away from the protrusion(s) into a defined direction, such as a pivot of a hinge or similar, a structure for clipping another item onto, an anchor for a thread connection, etc.

The connector 16 of FIGS. 33*a* and 33*b* includes a plate-like body 7 defining the distally facing stopping surface 12. From the body 7 towards proximally, the connector includes a base wall 253 from which the connector peg 250 protrudes laterally. The base wall is arranged off-center with respect to the axis 235. Further, the connector includes a plurality of reinforcing walls 254 extending perpendicularly to the base wall 253 and enhancing the mechanical stability with respect to forces acting on the connector peg.

The distally facing stopping surface defines the z position of the connecting structure after the process in that the pressing force is applied until the stopping surface 12 abuts against the proximal surface 4 of the second object 2.

The connector 16 in the embodiment of FIGS. 33*a* and 33*b* may, for example, be a mount of a rear parcel shelf of an automobile.

The sonotrode 20 used for anchoring the connector may be shaped to be adapted to the shape of the connector. Especially, as shown in FIG. 33*a*, the connector may be shaped to impinge, from proximally, on the body 7 by engaging between the reinforcing walls 254 and the base wall 253. In addition or as an alternative, it would also be possible to provide a protruding collar 255 of the connector 16, as shown in dotted lines in FIG. 33*a*. The arrangement with the sonotrode engaging between the walls directly on the body 7, with the sonotrode having indentations for reinforcing wall(s) if necessary, though, features the advantage that the pressing force and vibration (more generally the mechanical excitation) are coupled straight into the protrusions.

In embodiments that include a connecting location the position and/or orientation of which depends on the orientation of the connector around its axis 235, it may be necessary to guide the orientation of the connector during the anchoring process, because due to the vibration input (more generally the mechanical excitation) the connector may be subject to some uncontrolled twisting movements during insertion. In the embodiment of FIGS. 33*a* and 33*b*, the base wall 253 and/or the reinforcing walls 254 may be used for this, together with a corresponding shape of the sonotrode, whereby the orientation of the sonotrode defines the orientation of the connector.

The exemplary embodiment of FIGS. 33*a* and 33*b* includes further the optional feature of a cutting structure 252 that is designed to penetrate a proximal top layer, for example.

The embodiment of FIG. 33, but also of FIG. 7, for example, includes using a sonotrode adapted to the geometry of the first object 1 being a the connector. This is not always necessary. One can envisage embodiments of a first object 1 being a connector in which the body 7 forms a generally flat coupling surface for a generic sonotrode.

The connector can include at least one process controlling abutment protrusion if the number and/or arrangement and/or dimensions of the protrusions 9 are such that the connector cannot be held in a desired position relative to the second object at the beginning of applying a mechanical pressing force and—as the case may be—the mechanical excitation. This abutment protrusion(s) together with the protrusions can give a stable standing to the connector when the connector is brought into contact with the proximal surface of the second object. In other words: the connector position is well-defined and stable.

An abutment protrusion of this kind may, during the subsequent process, collapse or melt away. It does not necessarily have to penetrate into the volume of the second object.

In addition to stabilizing the connector during an initial stage of the process, it can also dampens undesired bending vibrations when the body 7 has a substantial lateral extension.

FIGS. 34-39 show various exemplary embodiments of the protrusion region 90 of the first object 1 and the device, respectively.

Figure 34:
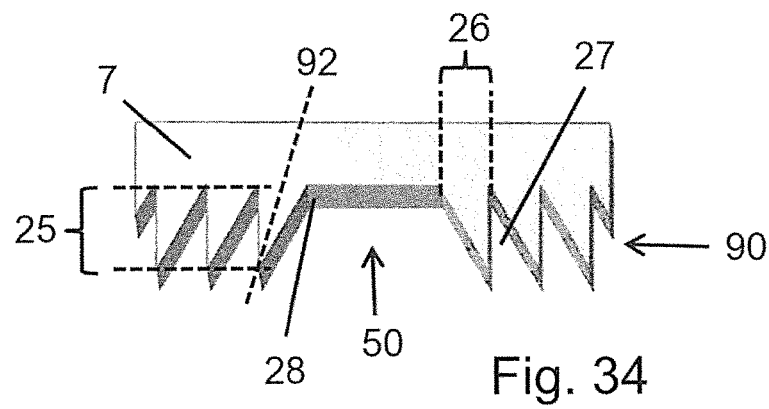
FIGS. 34-39 Various exemplary embodiments of the protrusion region of the first object and the device, respectively.

In the exemplary embodiment shown in FIG. 34, the protrusions 9 include a protrusion axis 92 that does not run parallel to the normal of the distal surface 28 of the body 7 of the first object 1.

The protrusion axis 92 running not parallel to the normal defines a direction into which the protrusion 9 deforms during the method in any one of the embodiments disclosed.

A further consequence of the protrusion axis 92 that does not run parallel to the normal of the distal surface 28 of the body 7 of the first object 1 is that the length of the protrusion is larger than the extension 25 of the protrusion in distal direction.

Figure 38:
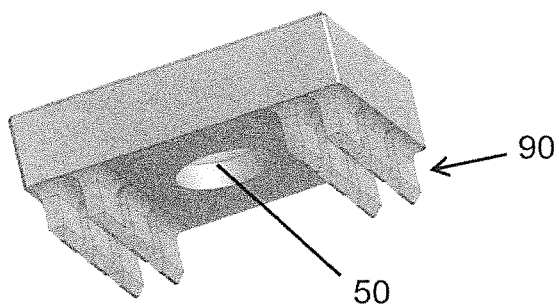
Figure 39:
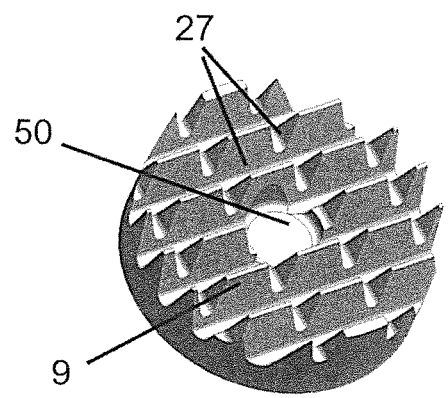

At least the following features are shown in the exemplary embodiments of the first object 1 depicted in FIGS. 34-39:
  The functional region 50. In the embodiments of FIGS. 38 and 39, the functional region is given by the distal mouth of a through bore that extends from the proximal surface 29 to the distal surface 28 of the body 7 of the first object 1.

A first object 1 including a through bore can be applied for stabilising or fixing the edge of the feedthrough established, e.g., punched into the second object 2.

The gaps 27 between the protrusions 9, wherein the volume of the gaps and the volume of the protrusions have the ratio described above.

An extension 25 of the protrusion 9 in distal direction and a thickness 26 of the protrusion 9 that are such that the ratio between the extension 25 and the thickness 26 is as described above, this means at least 1, in particular between 1 and 5, for example between 1.5 and 4 or between 2 and 3.

FIGS. 40-43 show perspective views of various exemplary embodiments of the first object 1 and the device, respectively.

Various connection elements 15 of a connecting device are shown in addition to the features related to the protrusion region 90. The elements are arranged on the proximal surface 29 of the body 7 of the first object 1.

The embodiments shown include a connection location 51 at which the elements 15 of the connecting device are connected to the first object 1. In the embodiments shown, the connection location 51 includes and is restricted to a portion of the proximal surface 29 of the body 7 of the first object 1 that is opposite to the functional region 50 arranged on the distal surface 28 of the body 7 of the first object 1.

Figure 40:
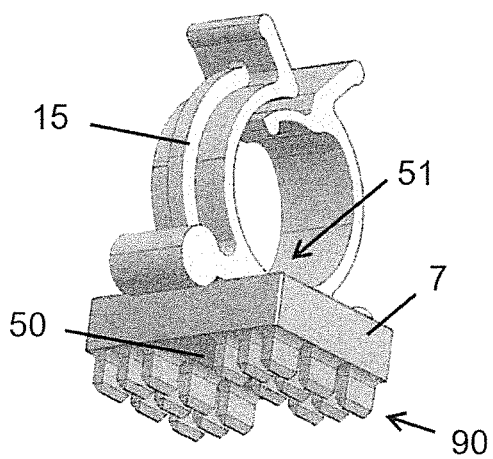
FIGS. 40-43 Various exemplary embodiment of the first object and the device, respectively.
Figure 41:
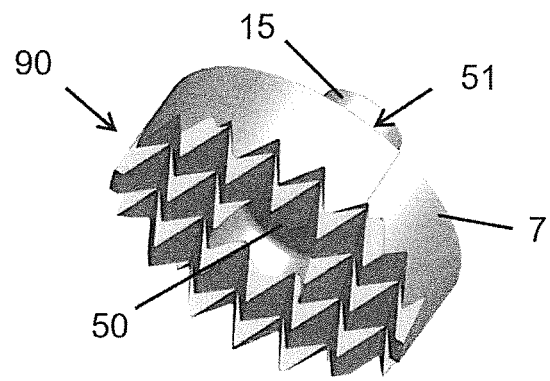

The connection element 15 of the first object 1 shown in FIG. 40 is suited for attaching cables and/or wires to the first, and hence to the second, object.

Figure 42:
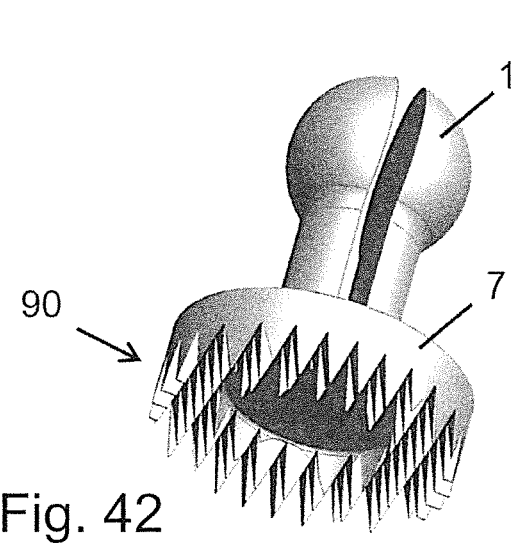

The connection element 15 of the first object 1 shown in FIG. 42 is an example of a connection element suited for screwing an item to the first, and hence to the second, object. The connection element shown can include a longitudinal opening that goes through to the distal surface 28 of the body 7 the first object 1.

The connection element 15 of the first object 1 shown in FIG. 42 is suited for attaching plate- and/or sheet-like items to the first, and hence to the second, object.

Figure 43:
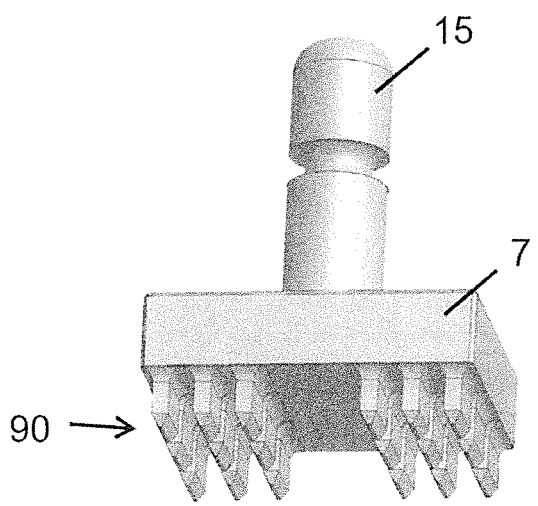

The connection element 15 of the first object 1 shown in FIG. 43 is an example of a connection element for clip solutions.

First objects 1 as shown in FIGS. 34-43, for example, are bonded to the second object 2 by the use of a sonotrode 20 that is applied at the portion of the proximal surface 29 of the first object 1 not covered by the connection element 15 or any element of a connecting device, usually. Further, the mechanical excitation, this means the mechanical oscillations, are preferably applied along the axis 8 that runs at an angle, in particular normal, to the proximal surface 29.

In this case, the coupling-out face 21 of the sonotrode 20 extends preferably over an area of the proximal surface 29 of the first object 1 during the step of applying the mechanical pressing force and the mechanical excitation that is comparable with the opposite area covered by protrusions 9 on the distal surface 28 of the first object 1. For example, the area in contact with the coupling-out face 21 covers at least 80% of the area covered by protrusions on the distal surface 28 of the first object 1. For example, it extends over an area that is 0.8 to 2 times the area covered by protrusions 9, in particular 0.8 to 1.5, 0.8 to 1.2 or 0.8 to 1 times. In other words: the radial extension of the area of the proximal surface 29 is at least 80% of, in particular larger than, the radial extension of the area covered by protrusions on the distal surface 28 in any radial direction.

The coupling-out face 21 can protrude over the body 7 of the first object 1.

FIGS. 44-49 show exemplary embodiments of first objects 1 that include features capable to prevent the generation of natural oscillation in the first object body 7 of a strength that can be destructive for the first object body 7.

Figure 44:
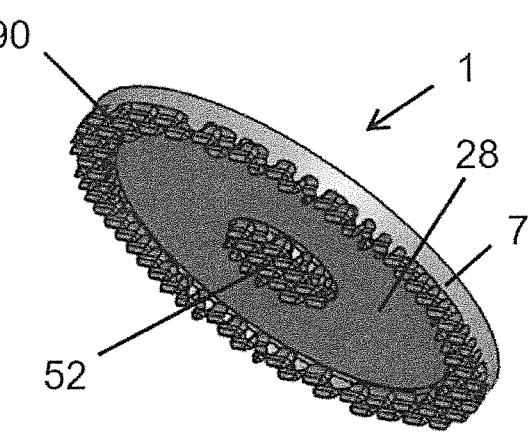

The embodiment according to FIG. 44 includes a damping element 52 arranged at the distal surface of the first object body.

The damping element 52 gets in contact with the proximal surface 4 of the second object 2 or—as the case may be—with the proximal surface 31 of the third object 3 during the method of bonding the first object 1 to the second object 2. Thereby, natural oscillation generated in the first object body 7 during the step of applying the mechanical excitation to liquefy the thermoplastic material 3 can be damped due to the physical contact generated between the damping element 52 and the second 2 or—as the case may be—the third object 3.

In the embodiment shown, the damping element 52 includes thermoplastic material, too. In other words, the damping element 52 is not only capable to damp the natural oscillation but also to enhance the bonding between the first and second (or third) object.

Figure 45:
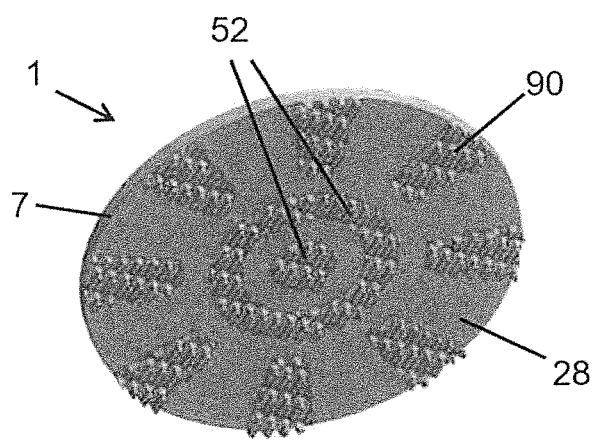
FIGS. 44-46 Three exemplary embodiments of the first object equipped for preventing the generation of destructive natural oscillations.
Figure 46:
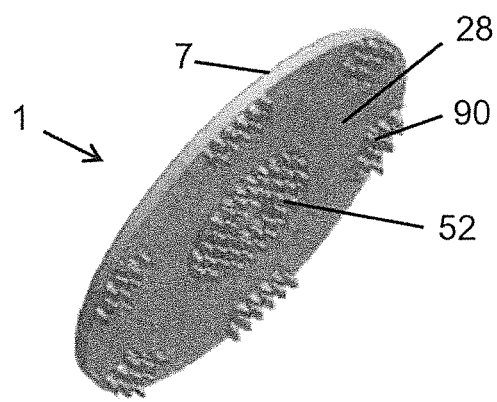

The embodiments according to FIGS. 45 and 46 include a plurality of distinct protrusion regions 90 that are designed to minimize the energy of the mechanical excitation needed to liquefy the thermoplastic material.

Further, FIGS. 45 and 46 each show a set of protrusion regions capable to tune away the frequency of the natural oscillations of the first object body 7 from the frequency applied to cause liquefaction of the thermoplastic material.

At least one of the protrusion regions 90 can be arranged to act as a damping element 52 too, as shown in FIGS. 45 and 46. However, it is not mandatory that one protrusion region of the plurality of protrusion regions is designed and arranged as a damping element 52.

Figure 48:
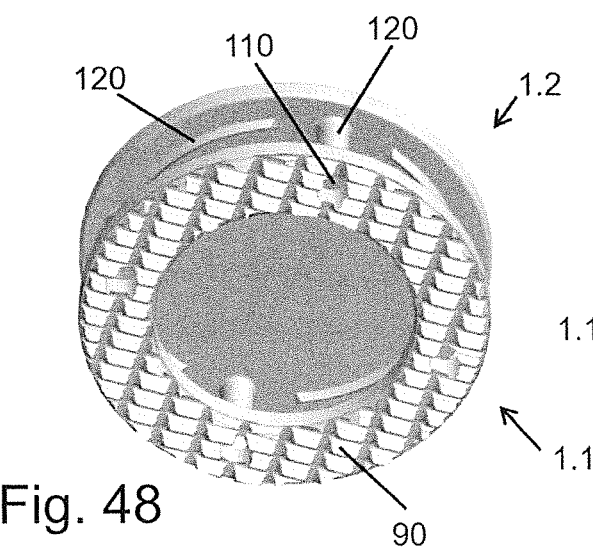
Figure 47:
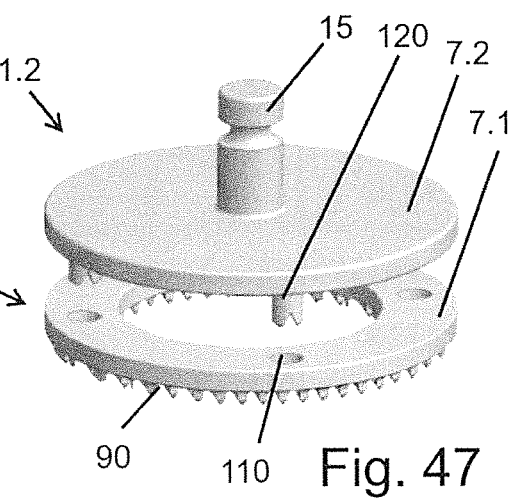

FIGS. 47 and 48 show a first object 1 including a fixation element 1.1 designed to be bonded to the second object 2 by a method according to the invention and a connecting element 1.2 designed to be bonded to the fixation element 1.1.

The fixation element 1.1 includes a fixation element connection means 110 and the connecting element 1.2 includes a connecting element connection means 120 that are adapted to one another in a manner that the bond between the fixation element 1.1 and the connecting element 1.2 can be established.

In the embodiment shown, the fixation element connection means 110 is a through hole in the body 7.1 of the fixation element 1.1 and the connecting element connection means 120 is a protrusion with a diameter adapted to a diameter of the through hole.

The protrusion 120 includes thermoplastic material and is designed in a manner that it can be bonded to the second object 2 after being pushed through the through hole 110 in the body 7.1 of the fixation element 1.1.

In addition or alternatively, the protrusion 120 includes thermoplastic material and is designed in a manner that it can weld to thermoplastic material of the fixation element 1.1, in particular of thermoplastic material 3 of the protrusions 9 designed to bond the fixation element 1.1 to the second object 2 by the method.

One can also envisage other means for bonding the connecting element 1.2 to the fixation element 1.1, for example clamping means, clipping means and/or the elements of a bayonet lock.

Figure 49:
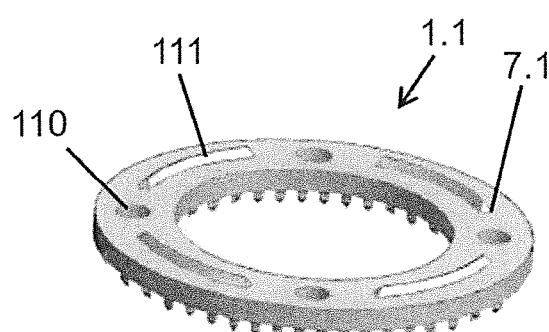
FIGS. 47-49 Exemplary embodiments of first objects including a fixation element and a connecting element.

FIG. 49 shows the fixation element 1.1 of a first object 1 including a fixation element 1.1 and a connecting element 1.2 in detail.

The body 7.1 of the fixation element 1.1 and of the corresponding connecting element 1.2 includes thermoplastic material. The fixation element 1.1 includes a fixation element energy director 111 and the connecting element 1.2 includes possibly a connecting element energy director 120. Such energy director (111 and 120) define a region where thermoplastic material of the fixation element 1.1 and of the connecting element 1.2 liquefies in a further step of applying a mechanical pressing force and mechanical excitation.

The further step causes a connection (in particular, a weld) between the fixation element 1.1 and the connecting element.

In particular, the further step is applied after the step of applying the mechanical pressing force and the mechanical excitation causing liquefaction of thermoplastic material of the protrusion(s). This means, the further step is applied after bonding the fixation element 1.1 to the second object 2.

An advantage of a method including two steps of applying mechanical pressing force and mechanical excitation, a first one for bonding the fixation element 1.1 to the second object 2 and a second one for bonding the connection element 1.2 to the fixation element 1.1, is at least one of the following:
- The energy acting on portions of the first object 1 that bear the element of a connecting device 15 can be reduced;
- The coupling-out face 21 of the sonotrode 20 can be adapted to the shape of the fixation element 1.1 and/or the shape of the connection element 1.2;
- Any issue based on a frequency of a natural oscillation of the first object body 7 close to the frequency of the mechanical excitation needed during bonding the first object 1 (this means the fixation element 1.1) to the second object 2 can be avoided.

Figure 50:
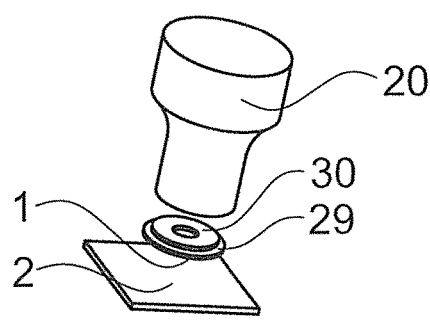
FIGS. 50 and 51 An alternative fixation of the third object to the second object by the first object.
Figure 51:
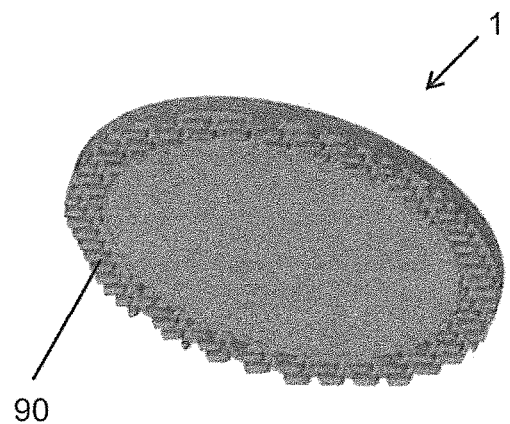

FIGS. 50 and 51 show a further method for fixing a third object 30 to the second object 2 by the first object 1.

According to this method (FIG. 50) the third object 30 is glued on the proximal surface 29 of the first object body 7.

A first object 1 designed for use in the method according to FIGS. 50 and 51 includes a proximal surface 29 that extends over a wide area. FIG. 51 shows such a first object 1. In particular, the first object body 7 forms an area on which the third object 30 can be fixed.

In addition, the first object 1 designed for use in the method according to FIGS. 50 and 51 can include any one of the features for preventing destructive natural oscillations presented with respect to FIGS. 44-48.

First objects 1 in any of the embodiments discussed above, for example as shown in FIGS. 1-5, 14, 16, 17, 20, 26a, 28, 29a, 31 and 34-43, can be used to attach a third object 30 to the second object 2.

In particular, the third object 30 can be a sheet material, for example a metal sheet.

The attachment of the third object 30 can include the at least local compression of the second object 2, wherein the compression is in a manner that the critical density and/or the critical compressive strength is generated.

Figure 52:
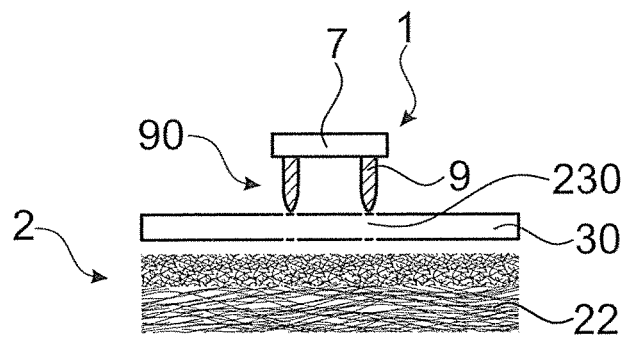
FIGS. 52 and 53 Sectional views of the attachment of a third object to the second object by the use of a first object.

FIG. 52 shows a sectional view of the arrangement and design of a first object 1, a second object 2 and a sheet material 30, wherein the sheet material 30 is to be fixed to the second object 2 by the first object 1.

The sheet material 30 shown includes through bores 230 that are adapted in shape and number to the protrusion(s) 9 of the first object 1.

For example, the protrusions 9 can be ridges as shown in FIGS. 1 and 5, for example. In this case, the sheet material 30 can include through bores 230 in the shape of longitudinal slits.

For example, the first object 1 can include a protrusion region 90 as shown in FIGS. 5, 28, 34, 36 and 37 for example. In this case, the sheet material 30 can include through bores 230 with a round or rectangular footprint.

Figure 35:
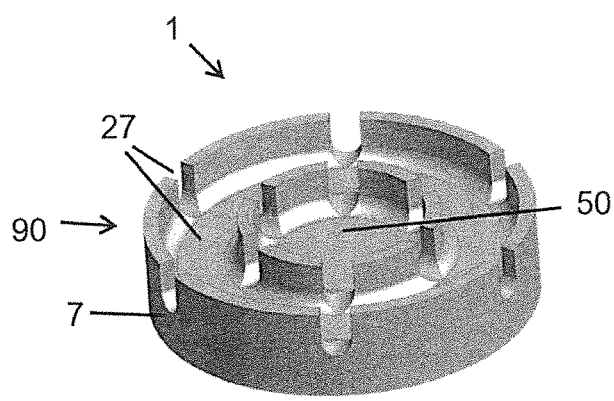
Figure 36:
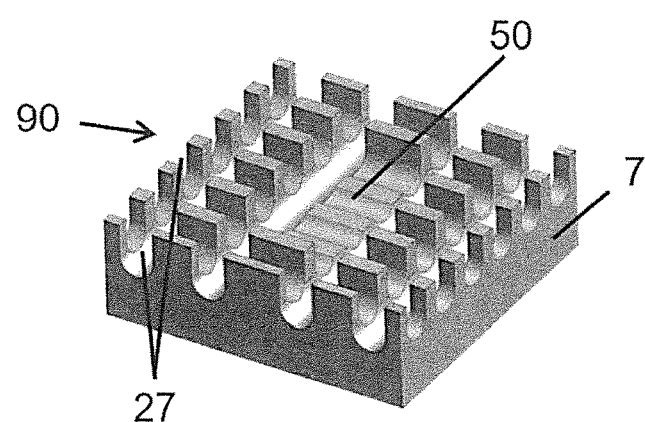
Figure 37:
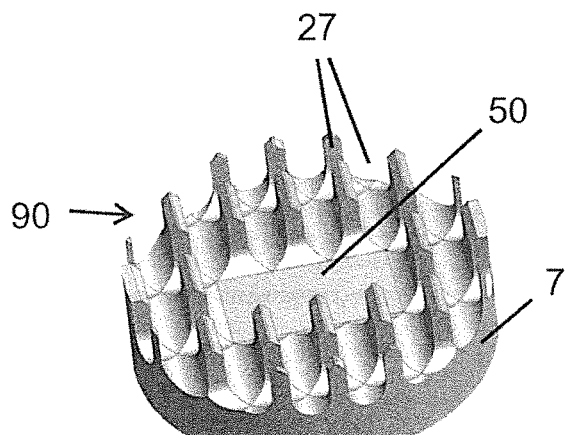

For example, the first object 1 can include a protrusion region 90 as shown in FIG. 35, for example. In this case, the sheet material 30 can include through bores 230 in the shape of circular slits.

The through bores 230 can be such that a position of the sheet material 30 relative to the first object 1 can be adjusted. In the case of a first object 1 including a protrusion region 90 with a plurality of protrusions 9 that are arranged along a line, the sheet material 30 can include per line of protrusions 9 a through bore 230 in the shape of a longitudinal slit.

Figure 53:
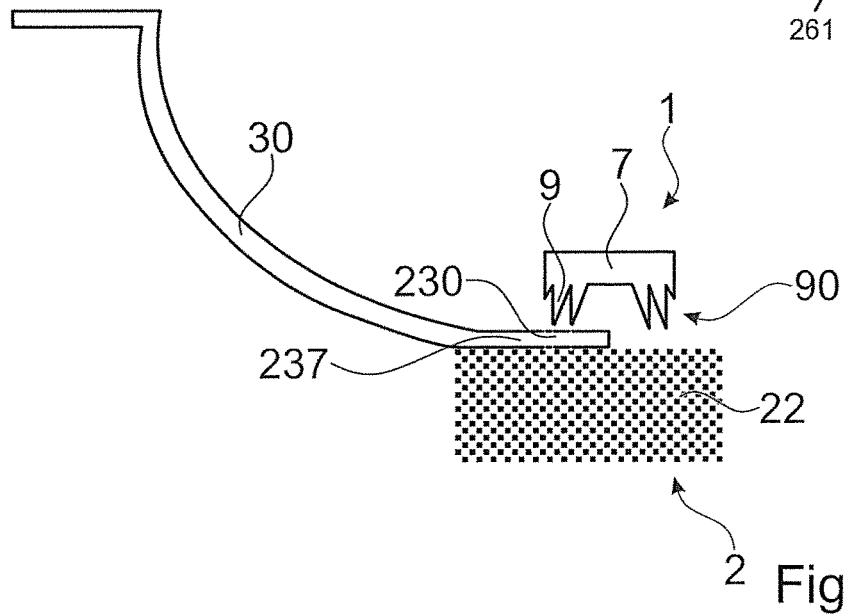

FIG. 53 shows a sectional view of a further arrangement and design of a first object 1, a second object 2 and a sheet material 30, wherein the sheet material 30 is to be fixed to the second object 2 by the first object 1.

According to this exemplary arrangement, the first object 1 can include at least two protrusions 9 and the corresponding method includes the step of arranging the first object 1, the second object 2 and the third object 30 such that at least one protrusion 9 is arranged beyond a radial end of the material sheet and at least one protrusion 9 is in contact with the proximal end of the third object 30.

Third object 30 can include a through bore 230 of the kind described with respect to FIG. 52 and the first object 1 can be arranged relative to the second object such that at least one protrusion engages with the through bore 230.

In the embodiment shown, the third object 30 includes a flange 237 designed for being positioned on the second object and for being attached to the second object by the first object. The flange 237 includes the through bore 230.

In particular, the first object 1 can be as shown in FIGS. 1-5, 20, 28 and 34-43, for example.

In the embodiment of FIG. 53, the third object is a metal sheet. If the third object 30 is a metal sheet, the metal sheet 30 is or can be heated during the method. This can cause local melting of the second object 2, which leads to a further increase in density of the region of low density 22 and a further reinforcement thereof. In other words, the second object 2 can be transformed locally to a coherent material.

Figure 54A:
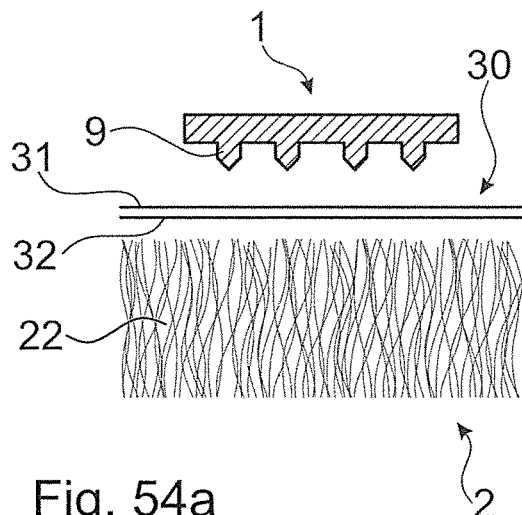
FIGS. 54a and 54b Sectional views of the attachment of a metal sheet without pre-drilled openings to the second object by use of the first object.
Figure 54B:
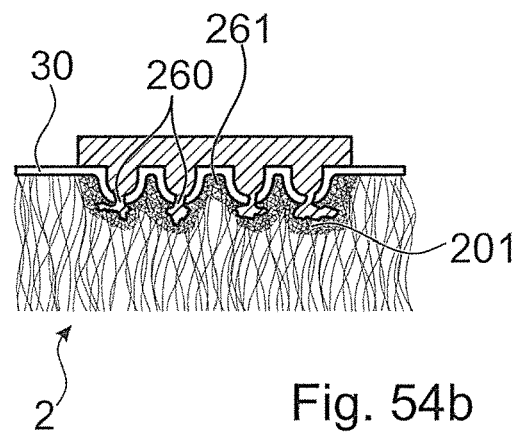

FIGS. 54a and 54b visualize a method for fixing a third object 30 that is a metal sheet to the second object 2, wherein the metal sheet 30 has no through bores 230 for the protrusion(s) 9.

The method includes the further steps of:
- Arranging the first object 1, the second object 2 and the metal sheet 30 relative to each other such that the proximal surface 31 of the metal sheet 30 is in contact with the protrusions 9 and such that the distal surface 32 of the metal sheet 30 is in contact with the second object 2.
- Pressing the first object 1 to the metal sheet 30 such that the first object 1 and the metal sheet 30 are vibrationally coupled to each other.
- Applying the mechanical vibrations to the first object 1 and increasing the pressing force such that the metal sheet 30 deforms into the second object 2.
- Increasing the pressing force further until the protrusion(s) 9 penetrate the metal sheet 30. In other words, a penetration region 260 is generated in the metal sheet 30.

Liquefaction of the thermoplastic material that has penetrated the metal sheet in the compressed region 201 of the second object and/or pressing the liquefied thermoplastic material in the compressed region 201.

This embodiment of the method is appropriate for material sheets in general. However, application of this method to metal sheets 30 has the advantage that the metal sheet heats the second object 2 during the method. This can cause local melting (melting zone 261) of the second object 2, which leads to a further increase in density of the compressed region 201 and to further reinforcement of the region of low density 22. In other words, the second object 2 can be transformed locally to a coherent material.

Figure 55:
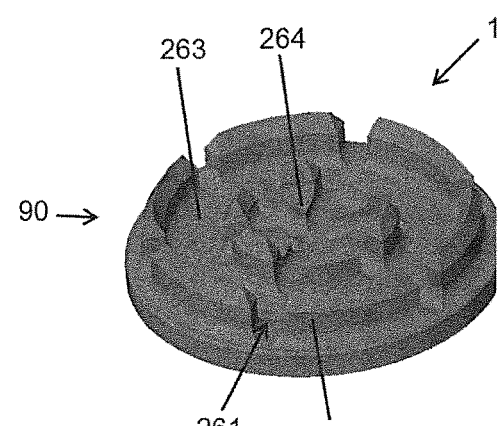
FIG. 55 An exemplary embodiment of a first object that can be used in a method according to FIGS. 54a and 54b.

FIG. 55 shows an exemplary embodiment of a first object that can be used in the method according to FIGS. 54a and 54b. The embodiment shown includes:

A first row of protrusions and a second row of protrusions. In the embodiment shown, the protrusions of the first row have the same length than the protrusions of the second row. Further the protrusions are tapered.

A first region 263 on the distal surface of the first object 1 that is offset in distal direction from a second region 264 on the distal surface. In the embodiment shown, the second region 264 (central region) is more distal than the first region 263 (region between the two rows of protrusions).

In particular, the more distal region is arranged to damp natural oscillations during the method, in particular during a final phase of the method when the energy coupled into the objects is highest.

A channel 262 for material flow.

A first object as shown in FIG. 55 can help to avoid destructive natural oscillations and destructive deformations of the third object 30, in particular if the third object is a metal sheet 30.

Figure 56:
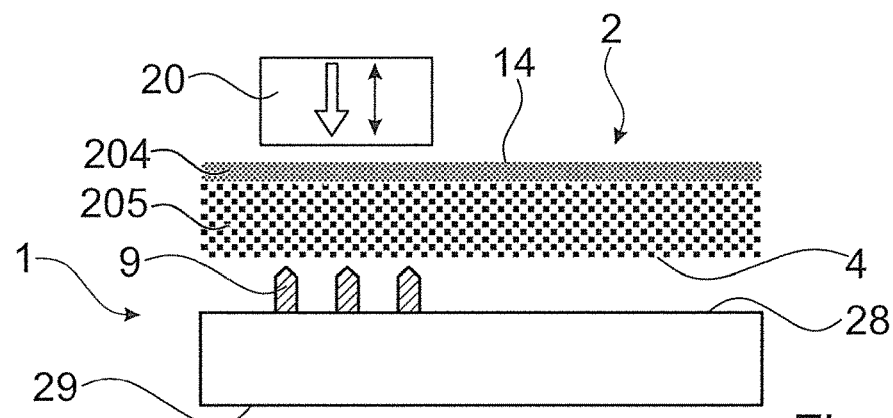
FIG. 56 A basic arrangement of the first and second object before bonding the first object to the second object by applying a sonotrode to the second object.

FIG. 56 shows a sectional view of a basic arrangement of the first and second object for an embodiment of the method in which the sonotrode 20 is applied to the second object 2.

In the exemplary arrangement shown, the first object 1 is an item to which the protrusions 9 are connected. One can envisage configurations in which the proximal surface 29 of the first object 1 is not or not easily accessible. For example, the item can be a part of a car body.

In particular in such configurations, the second object 2 can be placed relative to the protrusions 9 such that the protrusions 9 are in contact to the portions of the second object 2 that should be penetrated by the protrusions 9 at least partly during the method.

In the embodiment shown in FIG. 56, the second object 2 is a cover including a first region 204 of low density that forms an open laying surface and a second region 205 of low density in which the positive-fit connection between the first and the second object is to be formed. However, this structure is not mandatory for the method/application shown in FIG. 56 (and FIGS. 57a and 57b). The second object 2 can have a more sophisticated structure or it can be homogeneous.

Figure 57A:
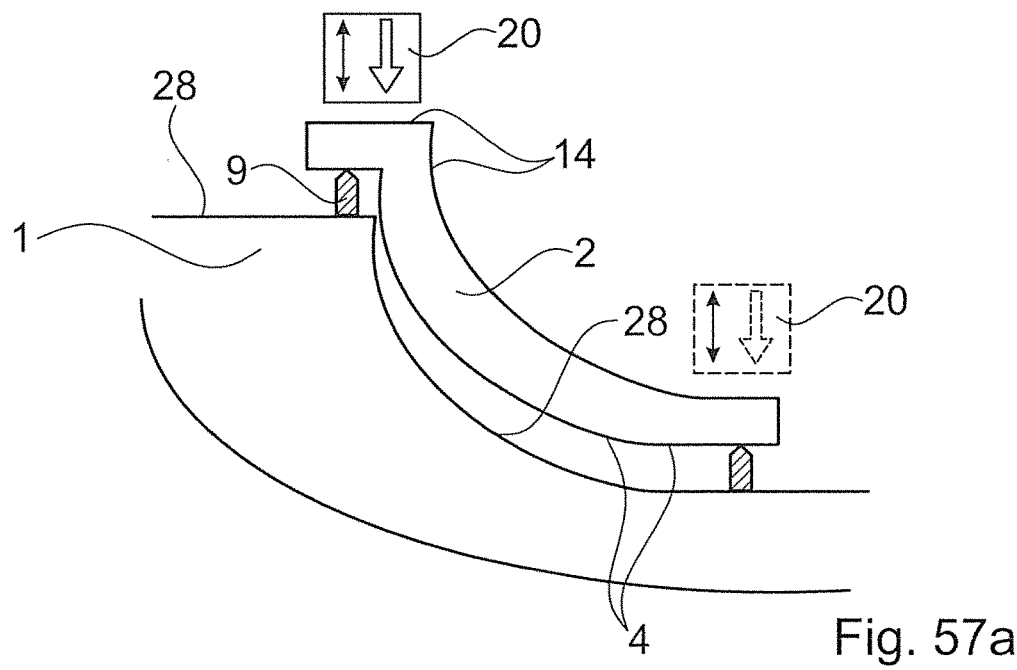
FIGS. 57a and 57b Exemplary application of the method according to FIG. 56 before and after bonding.
Figure 57B:
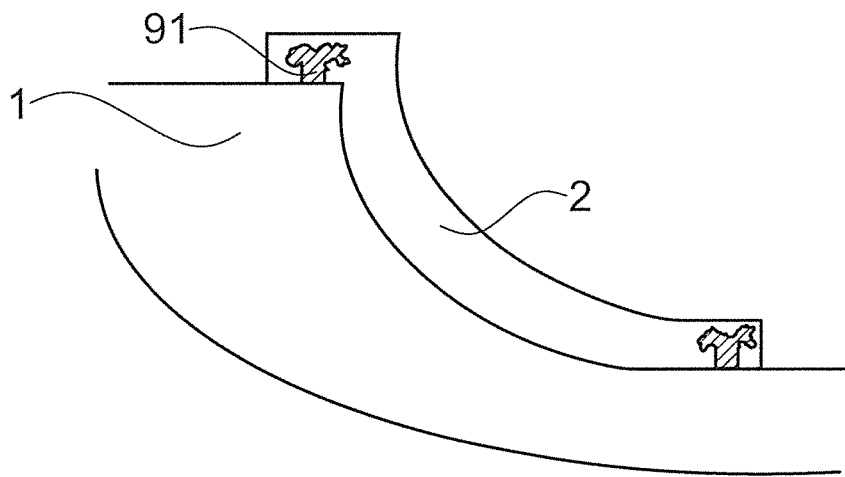

FIGS. 57a and 57b show an exemplary application of the embodiment of the method in which the sonotrode 20 is applied to the second object 2.

FIG. 57a shows the arrangement of first object 1, second object 2 and sonotrode before the step of applying the mechanical pressing force and the mechanical excitation capable to liquefy the thermoplastic material.

FIG. 57b shows the situation after bonding the first object 1 to the second object 2.

FIGS. 57a and 57b show:

A second object 2 that is a cover for the first object 1, for example a part of a car body, wherein the cover is adapted or adaptable in shape to the first object 1.

A plurality of protrusions 9 that are arranged on the first object 1 in a manner that the cover 2 can be reliably fixed to the first object 1.

The item 2 that is arranged on the first object 1 such that bonding locations on the proximal surface 4 of the item 2 are in contact with the protrusions.

The sonotrode 20 that is applied locally and sequentially to regions of the distal surface 14 of the item 2 that correspond to positions of the protrusions 9.

The sonotrode is applied to the item 2 until the item has reached a desired end position relative to the first object 1.

Figure 58:
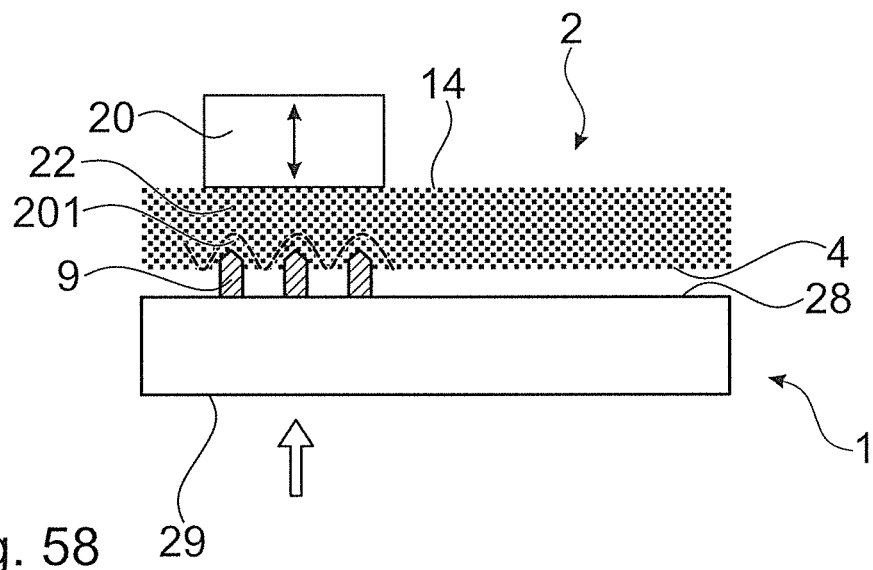
FIG. 58 An embodiment of the method in which the sonotrode is applied to the second object and a force for advancing the protrusion into the region of low density is applied to the first object.

FIG. 58 shows a variation of the method in which the second object 2 is placed between the first object 1 and the sonotrode 20.

According to this variation, any force for advancing the protrusion(s) 9 into the second object 2 is applied to the first object 1 (indicated by the arrow below the first object 1).

The sonotrode 20 is in contact to the distal surface 14 of the second object 2 and couples mechanical oscillations into second object 2. Further, it acts as a support for the second object 2, but it does not push actively the second object 2 towards the first object 1.

This arrangement of applying the sonotrode to the second object 2 and any pushing force to the first object 1 has the effect that a compressed region 201 is generated around the protrusion(s), wherein the compression of the distal surface 14 of the second object 2 is kept minimal.

Figure 59:
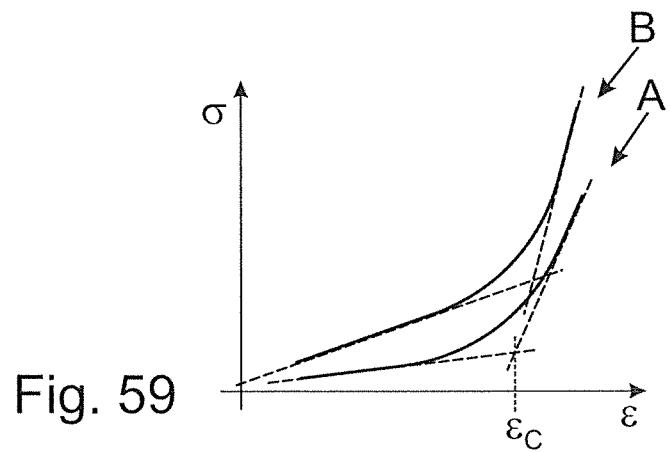
FIG. 59 Two representative stress-strain-curves for a panel formed by an incoherent material.

FIG. 59 shows two stress-strain-curves (A and B) that are representative for the experimental results that led to the surprising finding that various incoherent materials are suitable for use in bonding methods relying on the liquefaction of thermoplastic material by the use of a mechanical pressing force and a mechanical excitation, in particular vibrations.

The relative behaviour of stress-stain curves A and B shows the influence of a changing surface via which load is applied to the material. The indenter of curve B has a larger surface area in contact with the material that the indenter of curve A.

FIG. 59 shows the observed first region in which the stress depends approximately linear on strain, the observed transition region and the observed second region in which the stress depends approximately linear on strain.

The straight lines that approximate the approximately linear dependence in the different regions of linear dependencies are represented as dashed lines.

The strain cc at which the slope of the first region of approximately linear dependency and the slope of the second region of approximately linear dependency cross is a characteristic value of the stress-strain behaviour of the material. The characteristic value can be used to define a minimal compression needed in embodiments of the method in which the positive-fit connection is to be established in the region of low density.

What is claimed is:

1. A method of bonding a first object to a second object, the method comprising:

providing the first object, wherein the first object extends between a proximal end and a distal end and comprises a first object body and at least one protrusion distally of the first object body, wherein the protrusion forms the distal end and comprises thermoplastic material in a solid state, providing the second object comprising a proximal surface, applying a mechanical pressing force and a mechanical excitation capable to liquefy the thermoplastic material to at least one of the first and second objects until a flow portion of the thermoplastic material is flowable, stopping the mechanical excitation and letting the thermoplastic material resolidify to yield a connection between the first and the second object, wherein the second object provided comprises a region of low density, wherein the protrusion penetrates the region of low density at least partly before the thermoplastic material is made flowable, wherein the first object comprises a protruding portion after the step of letting the thermoplastic material resolidify, wherein the protruding portion penetrates the region of low density at least partly, wherein the method comprises a step of changing a compressive strength of the region of low density at least locally such that a critical compressive strength needed for the liquefaction of the thermoplastic material is generated, wherein changing in the compressive strength is increasing the compressive strength from a compressive strength that is below a critical compressive strength needed for liquefaction of the thermoplastic material to a compressive strength that is above the critical compressive strength needed for liquefaction of the thermoplastic material, and wherein the second object comprises synthetic fibers or a thermosetting polymer.

2. The method according to claim 1, wherein the method comprises a step of compressing the region of low density at least locally such that a critical density needed for the liquefaction of the thermoplastic material is generated.

3. The method according to claim 1, wherein the second object provided comprises a density profile that increases as a function of the distance from the proximal surface, and in that the distal end penetrates the region of low density before the thermoplastic material is made flowable.

4. The method according to claim 1, wherein the step of providing the first object comprises providing a first object comprising a protrusion region distally of the first object body, wherein the first object body comprises a distal surface and wherein the protrusion region comprises a plurality of protrusions that comprises the thermoplastic material.

5. The method according to claim 4, wherein the first object comprises at least one protrusion of a first kind comprising the thermoplastic material and at least one protrusion of a second kind comprising the thermoplastic material, wherein an extension in distal direction of the protrusion of the first kind is larger than a corresponding extension in distal direction of the protrusion of the second kind such that the connection established by the protrusion of the first kind is at a different distal position than the connection established by the protrusion of the second kind.

6. The method according to claim 4, wherein the protrusion region further comprises gaps between the protrusions, wherein the distal surface of the first object body forms a base of the protrusion region, wherein the protrusion region has a total volume given by the surface area of said base and by an extension of the protrusion region in distal direction, wherein the total volume consists of the volume of the plurality of protrusions and of the volume of the gaps, wherein the volume of the gaps is larger than the volume of the protrusions.

7. The method according to claim 4, wherein at least one protrusion is at least one of
equipped for deforming in a deformation direction during the step of applying the mechanical pressing force and the mechanical excitation,
equipped for defining a direction into which liquefied thermoplastic material flows during the step of applying the mechanical pressing force and the mechanical excitation, and
comprising a protrusion axis that runs at an angle to the distal surface of the first object body, wherein said angle is not a right angle.

8. The method according to claim 1, wherein the mechanical pressing force and the mechanical excitation are applied locally to at least one of the first and second object and wherein the step of applying the mechanical pressing force and the mechanical excitation and the step of stopping the mechanical excitation and letting the thermoplastic material resolidify is repeated several times at different positions on at least one of the first and second object.

9. The method according to claim 1, further comprising the step of providing a third object comprising a third object proximal surface and a third object distal surface and the steps of:
arranging the third object relative to the second object such that the third object distal surface is in physical contact with the proximal surface of the second object;
forcing at least a portion of the first object through the third object from its proximal face to its distal face prior to the step of applying the mechanical excitation capable to liquefy the thermoplastic material and to cause the flowable portion of the thermoplastic material to penetrate into structures of the second object.

10. The method according to claim 9, wherein the first object comprises at least one protrusion of a first kind comprising the thermoplastic material and at least one protrusion of a second kind comprising the thermoplastic material, wherein the shape of the protrusion of the first kind is such that the flowable portion of the thermoplastic material penetrates into the structures of the second object, and wherein the shape of the protrusion of the second kind is such that a flowable portion of the thermoplastic material penetrates into structures of the third object during the step of applying the mechanical pressing force and the mechanical excitation capable to liquefy the thermoplastic material.

11. The method according to claim 1, further comprising the step of providing a third object comprising a third object proximal surface and a third object distal surface and the steps of:
arranging the third object relative to the second object such that at least a portion of the third object distal surface is in physical contact with the proximal surface of the second object;
forcing at least a portion of the protrusion through the third object from its proximal face to its distal face;
wherein at least one of the following conditions applies:
the third object is a metal sheet comprising a through bore;
the third object is a foil, wherein the foil is designed to be penetrable by the protrusion;
the third object comprises a thickness and a density profile such that the protrusion can penetrate the third object during the step of applying the mechanical pressing force and the mechanical excitation but without causing the thermoplastic material to liquefy within or at a surface of the third object.

12. The method according to claim 1, wherein the first object body comprises a proximal surface of the first object body, the method comprising further the step of providing a third object comprising a third object proximal surface and a third object distal surface and the step of arranging the third object relative to the first object such that the third object distal surface is in physical contact with the proximal surface of the first object body.

13. The method according to claim 12, comprising the further step of gluing the third object distal surface to the proximal surface of the first object body.

14. The method according to claim 1, wherein the method comprises the steps of providing a sonotrode and of arranging the first object, the second object and the sonotrode relative to each other in a manner that the second object is between the first object and the sonotrode and such that the proximal surface of the second object is in contact with the at least one protrusion or gets in contact with the at least one protrusion during the method.

15. The method according to claim 1, wherein the second object comprises a distal surface and wherein the first object provided as well as the step of applying the mechanical pressing force and the mechanical excitation are such that the distal surface of the second object is unaffected by the method.

16. The method according to claim 15, wherein the mechanical excitation is applied to the distal surface of the second object and a force for advancing the at least one protrusion into the region of low density is applied to the first object.

17. The method according to claim 1, wherein the step of providing the second object comprises providing a second object comprising thermoplastic material and wherein said thermoplastic material liquefies at least partly during the step of applying the mechanical excitation such that a weld is formed by said liquefied thermoplastic material and liquefied thermoplastic material of the first object after resolidification of the thermoplastic materials.

18. The method according to claim 1, wherein the second object is provided within a mold that is adapted to a desired shape of the second object and wherein the step of applying the mechanical pressing force and the mechanical excitation is carried out on the second object supported by the mold.

19. The method according to claim 1, further comprising the step of providing a further object, wherein the first object body is designed to form a connection with a further object.

20. The method according to claim 19, wherein the first object body comprises the proximal surface, the distal surface and a connection location, wherein the connection location comprises at least a portion of the proximal surface of the first object body, wherein the first object comprises the protrusion region arranged at the distal surface of the first object body and comprising the functional region that does not comprise any protrusions, and wherein the functional region is opposite of the proximal surface portion comprised by the connection location.

21. The method according to claim 1, wherein the step of applying the mechanical pressing force comprises applying a first mechanical pressing force and a second mechanical pressing force, wherein the first mechanical pressing force is smaller than the second mechanical pressing force or equal to it.

22. A device for being bonded to an item by a method according to claim 1, the device being the first object and the item being the second object, wherein the device extends between a proximal end and a distal end and comprises a device body and at least one protrusion distally of the device body, wherein the protrusion forms the distal end and comprises thermoplastic material in a solid state, wherein the device comprises a structure designed and arranged to promote a local compression of the item that is sufficient for liquefaction of the thermoplastic material when forced into said item.

23. The device according to claim 22, wherein the device is a connector.

24. The device according to claim 22, wherein the device comprises a protrusion of a first kind and a protrusion of a second kind, wherein the protrusion of the first kind is designed for being anchored in the item and the protrusion of the second kind is designed for being anchored in a third object different from the item.

25. The device according to claim 22, wherein the device is a reinforcement element.

26. The device according to claim 22, comprising at least one of the following features capable to avoid destructive natural oscillations:
- a damping element arranged at the distal surface of the device body;
- a fixation element comprising fixation element connection means and a connecting element comprising connection element connection means, wherein the fixation element connection means and the connection element connection means are adapted to each other in a manner that the connection element connection means can be rigidly connected to the fixation element connection means at least when the fixation element is fixed to the item;
- a plurality of protrusion regions that are separate from each other;
- a device body being non-homogenous in its physical properties.

27. The method according to claim 1,
wherein the flow portion of the thermoplastic material penetrates into structures of the second object when being flowable by applying the mechanical pressing force and the mechanical excitation, and
a positive-fit connection between the first and the second object is yielded by stopping the mechanical excitation and letting the thermoplastic material resolidify.

* * * * *